(12) United States Patent
Deshpande et al.

(10) Patent No.: US 12,022,123 B2
(45) Date of Patent: Jun. 25, 2024

(54) SYSTEMS AND METHODS FOR SIGNALING SUBPICTURE INFORMATION IN VIDEO CODING

(71) Applicant: SHARP KABUSHIKI KAISHA, Sakai (JP)

(72) Inventors: Sachin G. Deshpande, Vancouver, WA (US); Jonatan Samuelsson, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 175 days.

(21) Appl. No.: 17/641,659

(22) PCT Filed: Sep. 9, 2020

(86) PCT No.: PCT/JP2020/034186
§ 371 (c)(1),
(2) Date: Mar. 9, 2022

(87) PCT Pub. No.: WO2021/049551
PCT Pub. Date: Mar. 18, 2021

(65) Prior Publication Data
US 2022/0353537 A1 Nov. 3, 2022

Related U.S. Application Data

(60) Provisional application No. 62/911,330, filed on Oct. 6, 2019, provisional application No. 62/905,333, filed (Continued)

(51) Int. Cl.
*H04N 19/70* (2014.01)
*H04N 19/119* (2014.01)
(Continued)

(52) U.S. Cl.
CPC .......... *H04N 19/70* (2014.11); *H04N 19/119* (2014.11); *H04N 19/174* (2014.11); *H04N 19/176* (2014.11); *H04N 19/188* (2014.11)

(58) Field of Classification Search
CPC .. H04N 19/105; H04N 19/119; H04N 19/174; H04N 19/176; H04N 19/188; H04N 19/70
(Continued)

(56) References Cited

U.S. PATENT DOCUMENTS

2022/0182681 A1* 6/2022 Paluri ................. H04N 19/176
2022/0217342 A1* 7/2022 Hannuksela ......... H04N 19/174

OTHER PUBLICATIONS

"Series H: Audiovisual and Multimedia Systems Infrastructure of audiovisual services—Coding of moving video", Advanced video coding for generic audiovisual services, Telecommunication Standardization Sector of ITU, ITU-T H.264(Aug. 2021).
(Continued)

*Primary Examiner* — Kathleen M Walsh
(74) *Attorney, Agent, or Firm* — ScienBiziP, P.C.

(57) ABSTRACT

This disclosure relates to video coding and more particularly to techniques for signaling subpicture information for coded video. In one example, a method of decoding video data comprises: receiving a general constraint information syntax elements; parsing a first syntax element from the general constraint information syntax elements specifying whether a constraint is imposed on the number of slices that being contained in each subpicture; receiving a picture parameter set syntax elements; and parsing a second syntax element from the picture parameter set syntax elements specifying that each sub-picture contains one and only one slice, wherein a value of the second syntax element is constrained according to the first syntax element parsed from the general constraint information syntax elements.

2 Claims, 6 Drawing Sheets

Related U.S. Application Data on Sep. 24, 2019, provisional application No. 62/903,917, filed on Sep. 22, 2019, provisional application No. 62/899,045, filed on Sep. 11, 2019.

(51) Int. Cl.
  *H04N 19/174* (2014.01)
  *H04N 19/176* (2014.01)
  *H04N 19/169* (2014.01)

(58) Field of Classification Search
  USPC .................................................. 375/240.26
  See application file for complete search history.

(56) References Cited

OTHER PUBLICATIONS

"Series H: Audiovisual and Multimedia Systems Infrastructure of audiovisual services—Coding of moving video", High efficiency video coding, Telecommunication Standardization Sector of ITU, ITU-T H.265 (Dec. 2016).

Chen et al., "Algorithm Description of Joint Exploration Test Model 7(JEM 7)", JVET-G1001-v1, Joint Video Exploration Team(JVET) of ITU-T SG 16 WP 3 and ISO/IEC JTC 1/SC 29/WG 11, 7th Meeting: Torino, IT, Jul. 13-21, 2017.

Benjamin Bross et al., "Versatile Video Coding (Draft 1)", JVET-J1001-v2, Joint Video Experts Team(JVET) of ITU-T SG 16 WP 3 and ISO/IEC JTC 1/SC 29/WG 11, 10th Meeting: San Diego, US, Apr. 10-20, 2018.

Benjamin Bross et al., "Versatile Video Coding (Draft 6)", JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.

Sachin Deshpande et al., "On Subpicture Information Signalling", JVET-P0579-v2, Joint Video Experts Team (JVET) of ITU-T SG 16 WP 3 and ISO/IEC JTC 1/SC 29/WG 11, 16th Meeting: Geneva, CH, Oct. 1-11, 2019.

Benjamin Bross et al., "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, Jan. 7-17, 2020.

* cited by examiner

SYSTEMS AND METHODS FOR SIGNALING SUBPICTURE INFORMATION IN VIDEO CODING

CROSS REFERENCE

This Nonprovisional application claims priority under 35 U.S.C. § 119 on provisional Application No. 62/899,045 on Sep. 11, 2019, No. 62/903,917 on Sep. 22, 2019, No. 62/905,333 on Sep. 24, 2019, No. 62/911,330 on Oct. 6, 2019, the entire contents of which are hereby incorporated by reference.

TECHNICAL FIELD

This disclosure relates to video coding and more particularly to techniques for signaling subpicture information for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardize video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10$^{th}$, Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: receiving a general constraint information syntax elements; parsing a first syntax element from the general constraint information syntax elements specifying whether a constraint is imposed on the number of slices that being contained in each subpicture; receiving a picture parameter set syntax elements; and parsing a second syntax element from the picture parameter set syntax elements specifying that each subpicture contains one and only one slice, wherein a value of the second syntax element is constrained according to the first syntax element parsed from the general constraint information syntax elements.

In one example, a device comprising one or more processors configured to: receive a general constraint information syntax elements; parse a first syntax element from the general constraint information syntax elements specifying whether a constraint is imposed on the number of slices that being contained in subpictures; receive a picture parameter set syntax elements; and parse a second syntax element from the picture parameter set syntax elements specifying that each subpicture contains one and only one slice, wherein a value of the second syntax element is constrained according to the first syntax element parsed from the general constraint information syntax elements.

DESCRIPTION OF EMBODIMENTS

Figure 1:
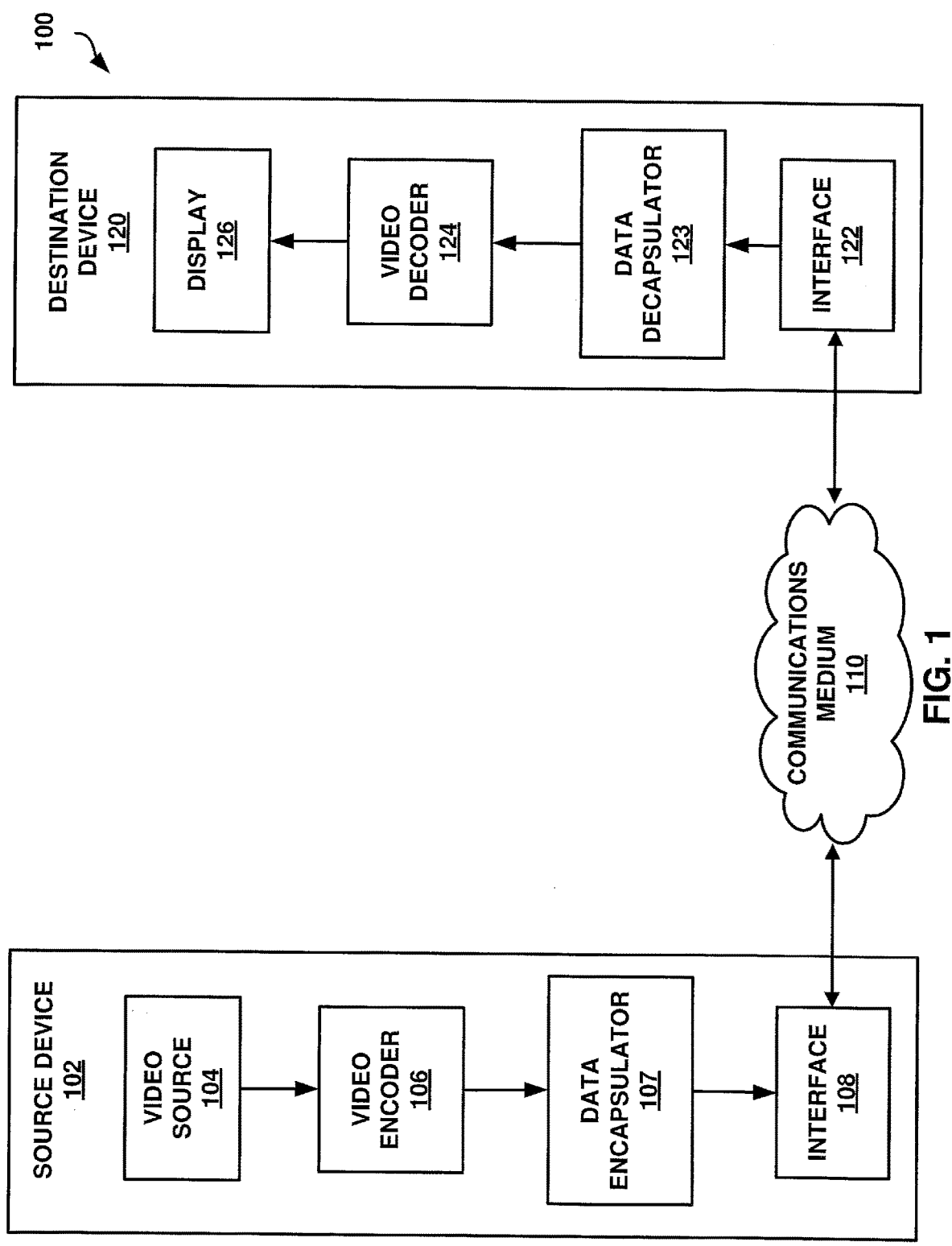
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling subpicture information for coded video data. In one example, techniques for signaling information indicating whether a subpicture is a decoding unit are described. It should be noted that although techniques of this disclosure are described with respect to ITU-T H.264, ITU-T H.265, JEM, and JVET-O2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-O2001. Thus, reference to ITU-T H.264, ITU-T H.265, JEM, and/or JVET-O2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal a flag indicating if a subpicture is a decoding unit.

In one example, a non-transitory computer-readable storage medium comprises instructions stored thereon that, when executed, cause one or more processors of a device to signal a flag indicating if a subpicture is a decoding unit.

In one example, an apparatus comprises means for signaling a flag indicating if a subpicture is a decoding unit.

In one example, a device comprises one or more processors configured to parse a flag indicating if a subpicture is a decoding unit and determine whether a subpicture is a decoding unit based on a value of the parsed flag.

In one example, a non-transitory computer-readable storage medium comprises instructions stored thereon that, when executed, cause one or more processors of a device to parse a flag indicating if a subpicture is a decoding unit and determine whether a subpicture is a decoding unit based on a value of the parsed flag.

In one example, an apparatus comprises means for parsing a flag indicating if a subpicture is a decoding unit and means for determining whether a subpicture is a decoding unit based on a value of the parsed flag.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may be divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-O2001, CTUs are partitioned according a quadtree plus multi-type tree (QTMT or QT+MTT) structure. The QTMT in JVET-O2001 is similar to the QTBT in JEM. However, in JVET-O2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is divided at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

Figure 2:
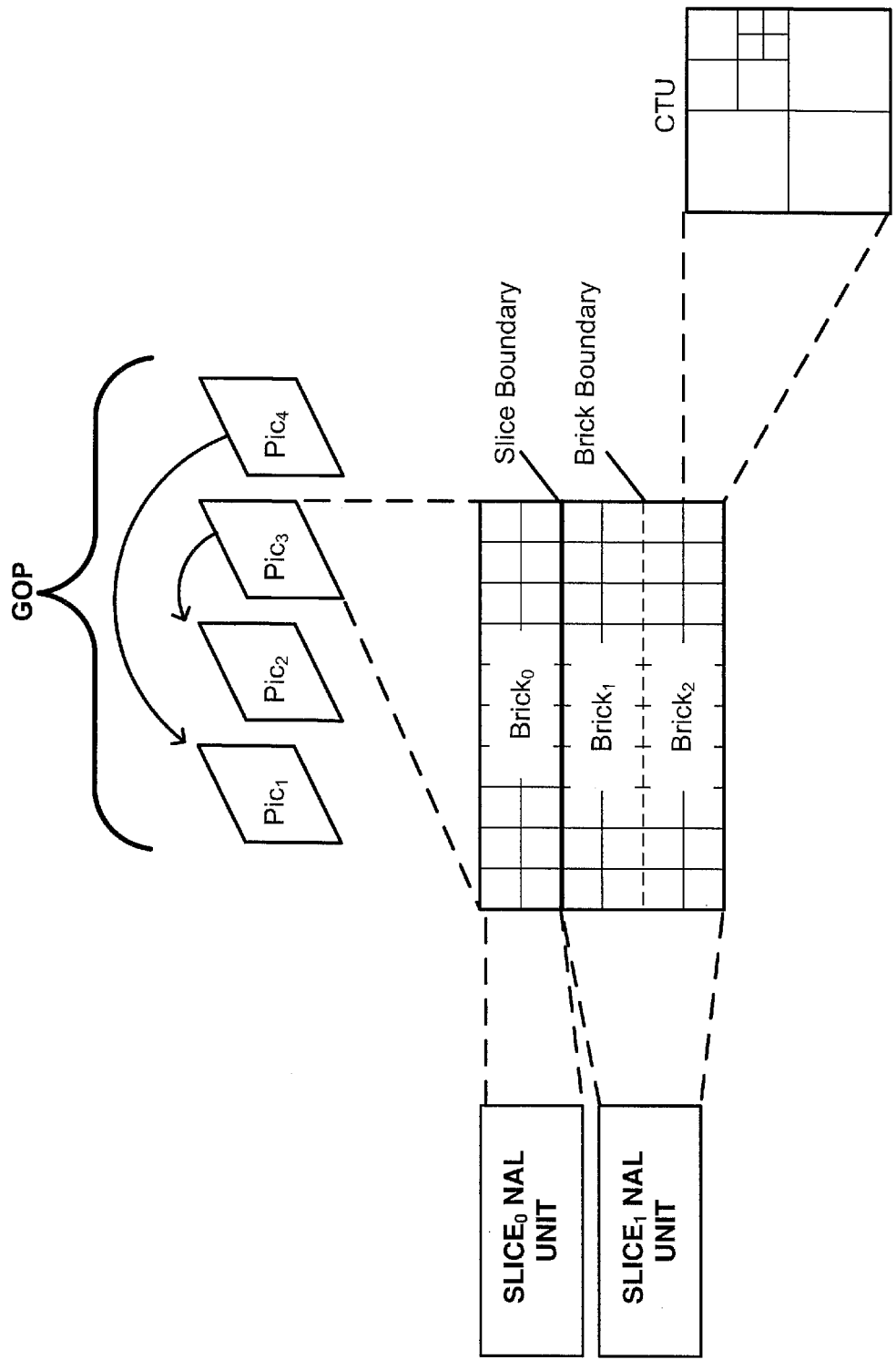
FIG. 2 is a conceptual diagram illustrating coded video data and corresponding data structures according to one or more techniques of this disclosure.

With respect to JVET-O2001, a picture is divided into one or more tile rows and one or more tile columns. In JVET-O2001, a brick is a rectangular region of CTU rows within a particular tile in a picture. In JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. Further, slices are required to consist of either an integer number tiles or an integer number of bricks, instead of only being required to consist of an integer number of CTUs, as in ITU-T H.265. The techniques described herein may be applicable to bricks, slices, tiles, and/or tile rows/columns. FIG. 2 is a conceptual diagram illustrating an example of a group of pictures including slices. In the example illustrated in FIG. 2, $Pic_3$ is illustrated as including two slices (i.e., $Slice_0$ and $Slice_1$). In the example illustrated in FIG. 2, $Slice_0$ includes one brick, i.e., $Brick_0$ and $Slice_1$ includes two bricks, i.e., $Brick_1$ and $Brick_2$. It should be noted that according to JVET-O2001, $Brick_1$ and $Brick_2$ may be included in one tile or each be included in respective tiles. JVET-O2001, further includes the concept of subpictures, where a subpicture contains one or more slices that collectively cover a rectangular region of a picture. Finally, in JVET-O2001, two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice. It should be noted that, in some cases, the techniques described herein may be generally applicable regardless of how a picture is partitioned. That is, for example, in some cases, the techniques described herein may be generally applicable to a rectangular region of a picture, regardless of how the rectangular region is classified. In another example, a subpicture may be a contiguous region in a picture. A picture may consist of one or more subpictures.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they have been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
Further, the following mathematical functions may be used:
Log 2(x) the base-2 logarithm of x;

$$\text{Min}(x, y) = \begin{cases} x; x <= y \\ y; x > y \end{cases};$$

$$\text{Max}(x, y) = \begin{cases} x; x >= y \\ y; x < y \end{cases}$$

Ceil(x) the smallest integer greater than or equal to x.
With respect to the example syntax used herein, the following definitions of logical operators may be applied:
x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.
Further, the following relational operators may be applied:
> Greater than
>= Greater than or equal to
< Less than
<= Less than or equal to
== Equal to
!= Not equal to
Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the symtax element.
tu(v): truncated unary using up to maxVal bits with maxVal defined in the semantics of the symtax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.

As described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. It should be noted that in some cases, an access unit may be required to contain exactly one coded picture. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Referring to the example illustrated in FIG. 2, each slice of video data included in $Pic_3$ (i.e., $Slice_0$ and $Slice_1$) is illustrated as being encapsulated in a NAL unit. In JVET-O2001, each of a video sequence, a GOP, a picture, a slice, and CTU may be associated with metadata that describes video coding properties. JVET-O2001 defines parameters sets that may be used to describe video data and/or video coding properties. In particular, JVET-O2001 includes the following five types of parameter sets: decoding parameter set (DPS), video parameter set (VPS), sequence parameter set (SPS), picture parameter set (PPS), and adaption parameter set (APS). In JVET-O2001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-O2001 enables supplemental enhancement information (SEI) messages to be signaled. In JVET-O2001, SEI messages assist in processes related to decoding, display or other purposes, however, SEI messages may not be required for constructing the luma or chroma samples by the decoding process. In JVET-O2001, SEI messages may be signaled in a bitstream using non-VCL NAL units. Further, SEI messages may be conveyed by some means other than by being present in the bitstream (i.e., signaled out-of-band).

It should be noted that an access unit may be called a layer access unit. As described above, multi-layer extensions enable a video presentation to include a base layer and one or more additional enhancement layers. It should be noted that in ITU-T H.265 a temporal true subset of a scalable layer is not referred to as a layer but referred to as a sub-layer or temporal sub-layer. That is, ITU-T H.265 provides the following definition with respect to sub-layers:

sub-layer: A temporal scalable layer of a temporal scalable bitstream, consisting of VCL NAL units with a particular value of the TemporalId variable and the associated non-VCL NAL units.

It should be noted that JVET-O2001 provides the following definitions with respect to sub-layers:

sub-layer: A temporal scalable layer of a temporal scalable bitstream, consisting of VCL NAL units with a particular value of the TemporalId variable and the associated non-VCL NAL units.

sub-layer representation: A subset of the bitstream consisting of NAL units of a particular sub-layer and the lower sub-layers.

Figure 3:
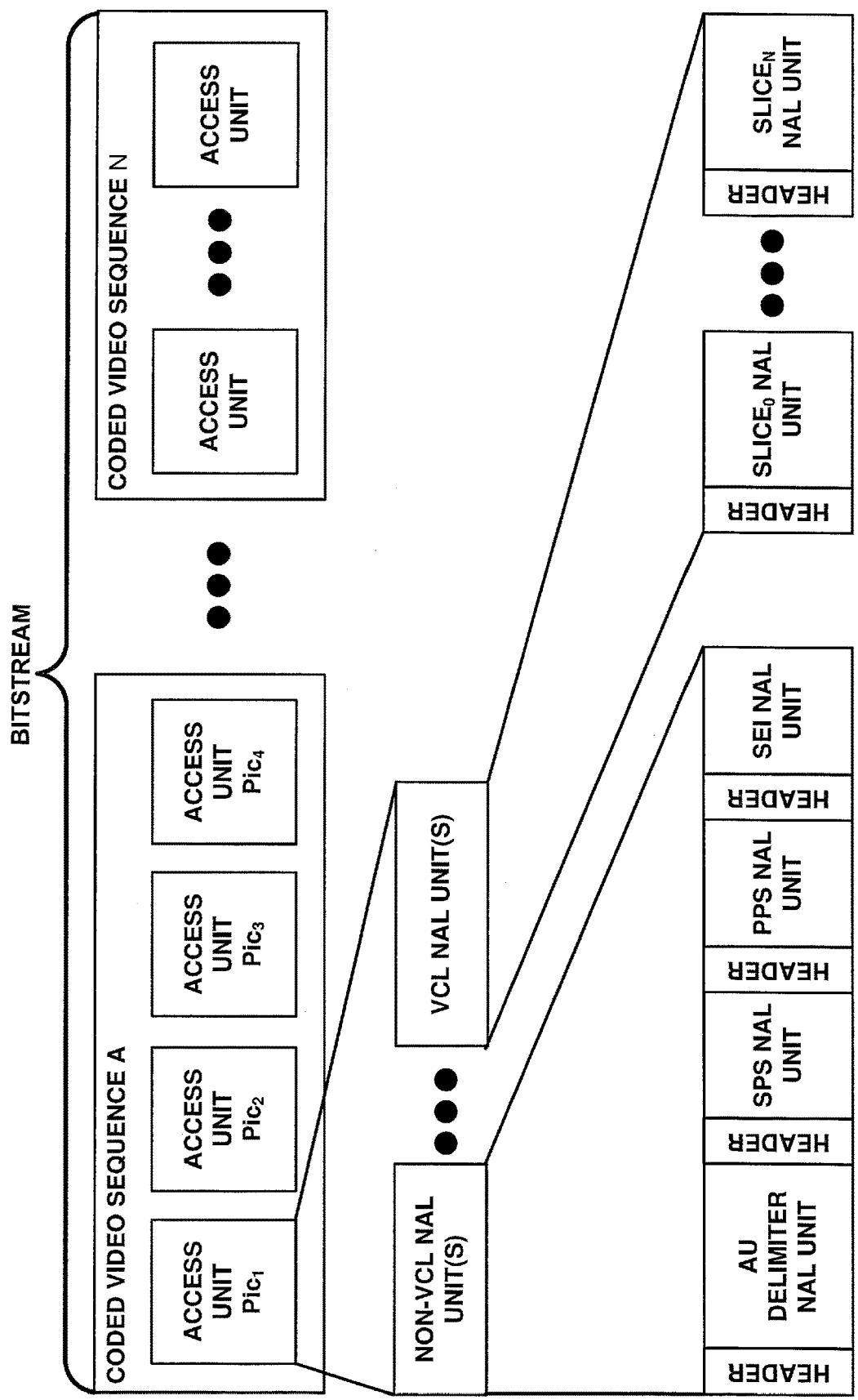
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 3, HEADER is a NAL unit header. JVET-O2001 defines NAL unit header semantics that specify the type of Raw Byte Sequence Payload (RBSP) data structure included in the NAL unit. Table 1 illustrates the syntax of the NAL unit header provided in JVET-O2001.

TABLE 1

|  | Descriptor |
|---|---|
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

JVET-O2001 provides the following definitions for the respective syntax elements illustrated in Table 1.

forbidden_zero_bit shall be equal to 0.

nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.

nuh_layer_id specifies the identifier of the layer to which a VCL NAL unit belongs or the identifier of a layer to which a non-VCL NAL unit applies.

The value of nah_layer_id shall be the same for all VCL NAL units of a coded picture. The value of nah_layer_id of a coded picture or a layer access unit is the value of the nah_layer_id of the VCL NAL units of the coded picture or the layer access unit.

nuh_temporal_id_plus1 minus 1 specifies a temporal identifier for the NAL unit.

The value of nuh_temporal_id_plus1 shall not be equal to 0.

The variable TemporalId is derived as follows:

TemporalId=nuh_temporal_id_plus1−1

When nal_unit_type is in the range of IDR_W_RADL to RSV_IRAP_VCL13, inclusive, TemporalId shall be equal to 0.

When nal_unit_type is equal to STSA_NUT, TemporalId shall not be equal to 0. The value of TemporalId shall be the same for all VCL NAL units of a layer access unit. The value of TemporalId of a coded picture or a layer access unit is the value of the TemporalId of the VCL NAL units of the coded picture or the layer access unit. The value of TemporalId of a sub-layer representation is the greatest value of TemporalId of all VCL NAL units in the sub-layer representation.

The value of TemporalId for non-VCL NAL units is constrained as follows:

If nal_unit_type is equal to DPS_NUT, VPS_NUT, or SPS_NUT, TemporalId is equal to 0 and the TemporalId of the layer access unit containing the NAL unit shall be equal to 0.

Otherwise, when nal_unit_type is not equal to EOS_NUT and not equal to EOB_NUT, TemporalId shall be greater than or equal to the TemporalId of the layer access unit containing the NAL unit.

NOTE When the NAL unit is a non-VCL NAL unit, the value of TemporalId is equal to the minimum value of the TemporalId values of all layer access units to which the non-VCL NAL unit applies. When nal_unit_type is equal to PPS_NUT or APS_NUT, TemporalId may be greater than or equal to the TemporalId of the containing layer access unit, as all PPSs and APSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

nal_unit_type specifies the NAL unit type, i.e., the type of RBSP data structure contained in the NAL unit as specified in Table 2.

NAL units that have nal_unit_type in the range of UNSPEC28 ... UNSPEC31, inclusive, for which semantics are not specified, shall not affect the decoding process specified in this Specification.

NOTE—NAL unit types in the range of UNSPEC28 ... UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
| --- | --- | --- | --- |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 ... 7 | RSV_VCL_4 ... RSV_VCL_7 | Reserved non-IRAP VCL NAL unit types | VCL |
| 8<br>9 | IDR_W_RADL<br>IDR_N_LP | Coded slice of an IDR picture slice_layer_rbsp( ) | VCL |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12<br>13 | RSV_IRAP_VCL12<br>RSV_IRAP_VCL13 | Reserved IRAP VCL NAL unit types | VCL |
| 14 ... 15 | RSV_VCL14 ... RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 ... 27 | RSV_NVCL25 ... RSV_NVCL27 | Reserved non-VCL NAL unit types | non-VCL |
| 28 ... 31 | UNSPEC28 ... UNSPEC31 | Unspecified non-VCL NAL unit types | non-VCL |

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all coded sice NAL units of a picture. A picture or a layer access unit is referred to as having the same NAL unit type as the coded slice NAL units of the picture or layer access unit.

For a single-layer bitstream, the following constraints apply:

Each picture, other than the first picture in the bitstream in decoding order, is considered to be associated with the previous IRAP picture in decoding order.

When a picture is a leading picture of an RAP picture, it shall be a RADL or RASL picture.

When a picture is a trailing picture of an IRAP picture, it shall not be a RADL or RASL picture.

No RASL pictures shall be present in the bitstream that are associated with an IDR picture.

No RADL pictures shall be present in the bitstream that are associated with an IDR picture having nal_unit_type equal to IDR_N_LP.

NOTE—It is possible to perform random access at the position of an IRAP access unit by discarding all access units before the IRAP access unit (and to correctly decode the IRAP picture and all the subsequent non-RASL pictures in decoding order), provided each parameter set is available (either in the bitstream or by external means) when it is referred.

Any picture that precedes an IRAP picture in decoding order shall precede the IRAP picture in output order and shall precede any RADL picture associated with the IRAP picture in output order.

Any RASL picture associated with a CRA picture shall precede any RADL picture associated with the CRA picture in output order.

Any RASL picture associated with a CRA picture shall follow, in output order, any IRAP picture that precedes the CRA picture in decoding order If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

It should be noted that generally, for example with respect to ITU-T H.265, an IRAP is a picture that does not refer to any pictures other than itself for prediction in its decoding process. Typically, the first picture in the bitstream in decoding order must be an IRAP picture. In ITU-T H.265, an IRAP picture may be a broken link access (BLA) picture, a clean random access (CRA) picture or an instantaneous decoder refresh (IDR) picture. ITU-T H.265 describes the concept of a leading picture, which is a picture that precedes the associated IRAP picture in output order. ITU-T H.265 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. ITU-T H.265 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. BLA pictures may also be followed by RASL pictures. These RASL pictures are always discarded for BLA pictures and discarded for CRA pictures when they are nondecodable, i.e., when a decoder that starts its decoding process at a CRA point. The other type of picture that can follow an IRAP picture in decoding order and precede it in output order is the random access decodable leading (RADL) picture, which cannot contain references to any pictures that precede the IRAP picture in decoding order.

With respect to Table 2, it should be noted that JVET-O2001 provides the following definitions:

clean random access (CRA) picture: An IRAP picture for which each VCL NAL unit has nal_unit_type equal to CRA_NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be decodable, as they may contain references to pictures that are not present in the bitstream.

coded layer video sequence start (CLVSS) picture: A coded picture that is an IRAP picture with NoIncorrectPicOutputFlag equal to 1 or a GDR picture with NoIncorrectPicOutputFlag equal to 1.

gradual decoding refresh (GDP) picture: A picture for which each VCL NAL unit has nal_unit_type equal to GDR-NUT.

instantaneous decoding refresh (IDR) picture: An IRAP picture for which each VCL NAL unit has nal_unit_type equal to IDR_W_RADL or IDR_N_LP.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

inter-layer reference picture (ILRP): A picture in the same access unit with the current picture, with nuh_layer_id less than the nuh_layer_id of the current picture, and is marked as "used for long-term reference".

intra random access paint (IRAP) picture: A coded picture for which each VCL NAL unit has nal_unit_type in the range of IDR_W_RADL to CRA_NUT, inclusive.

NOTE—An IRAP picture does not refer to any pictures other than itself for inter prediction in its decoding process, and may be a CRA picture or an IDR picture. The first picture in the bitstream in decoding order must be an IRAP or GDR picture. Provided the necessary parameter sets are available when they need to be referred, the IRAP picture and all subsequent non-RASL pictures in the CVS in decoding order can be correctly decoded without performing the decoding process of any pictures that precede the IRAP picture in decoding order.

leading picture: A picture that that is in the same layer as the associated IRAP picture and precedes the associated IRAP picture in output order.

long-term reference picture (LTRP): A picture that is marked as "used for long-term reference".

random access decodable leading (RADL$_4$) picture: A coded picture for which each VCL NAL unit has nal_unit_type equal to RADL_NUT.

NOTE—All RADL pictures are leading pictures. RADL pictures are not used as reference pictures for the decoding process of trailing pictures of the same associated IRAP picture. When present, all RADL pictures precede, in decoding order, all trailing pictures of the same associated IRAP picture.

random access skipped leading (RASL$_4$) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

short-term reference picture (STRP): A picture with nuh_layer_id equal to the nuh_layer_id of the current picture and that is marked as "used for short-term reference".

step-wise temporal sub-layer access (STSA) picture: A coded picture for which each VCL NAL unit has nal_unit_type equal to STSA_NUT.

NOTE—An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sub-layer containing the STSA picture, from the immediately lower sub-layer. STSA pictures must have TemporalId greater than 0.

trailing picture: A non-IRAP picture that follows the associated IRAP picture in output order and that is not an STSA picture.

NOTE—Trailing pictures associated with an IRAP picture also follow the IRAP picture in decoding order. Pictures that follow the associated IRAP picture in output order and precede the associated IRAP picture in decoding order are not allowed.

As provided in Table 1 and described above, a NAL unit may include a sequence parameter set (SPS). Table 3 illustrates the syntax structure of the SPS provided in JVET-O2001.

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   inter_layer_ref_pics_present_flag | u(1) |
|   sps_idr_rpl_present_flag | u(1) |

TABLE 3-continued

| | Descriptor |
|---|---|
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| } | |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag || sps_dmvr_enabled_flag) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
|   if( sps_cclm_enabled_flag && chroma_format_idc = = 1 ) | |
|     sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |

TABLE 3-continued

|  | Descriptor |
|---|---|
| sps_affine_enabled_flag | u(1) |
| if( sps_affine_enabled_flag ) { |  |
|   sps_affine_type_flag | u(1) |
|   sps_affine_amvr_enabled_flag | u(1) |
|   sps_affine_prof_enabled_flag | u(1) |
| } |  |
| if( chroma_format_idc = = 3 ) |  |
|   sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) |  |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { |  |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { |  |
|     sps_ladf_qp_offset[ i ] | se(v) |
|     sps_ladf_delta_threshold_minus1[ i ] | ue(v) |
|   } |  |
| } |  |
| sps_scaling_list_enabled_flag | u(1) |
| general_hrd_parameters_present_flag | u(1) |
| if( general_hrd_parameters_present_flag ) { |  |
|   num_units_in_tick | u(32) |
|   time_scale | u(32) |
|   sub_layer_cpb_parameters_present_flag | u(1) |
|   if( sub_layer_cpb_parameters_present_flag ) |  |
|     general_hrd_parameters( 0, sps_max_sub_layers_minus1 ) |  |
|   else |  |
| general_hrd_parameters( sps_max_sub_layers_minus1, sps_max_sub_layers_minus1 ) |  |
| } |  |
|  vui_parameters_present_flag | u(1) |
|  if( vui_parameters_present_flag ) |  |
|    vui_parameters( ) |  |
| sps_extension_flag | u(1) |
| if( sps_extension_flag ) |  |
|   while( more_rbsp_data( ) ) |  |
|     sps_extension_data_flag | u(1) |
|  rbsp_trailing_bits( ) |  |
| } |  |

With respect to Table 3, JVET-O2001 provides the following semantics:

An SPS RBSP shall be available to the decoding process prior to it being referred, included in at least one access unit with TemporalId equal to 0 or provided through external means, and the SPS NAL unit containing the SPS RBSP shall have nuh_layer_id equal to the nuh_layer_id of PPS NAL unit that refers to it.

All SPS NAL units with a particular value of sps_seq_parameter_set_id in a CVS shall have the same content.

sps_decoding_paramter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CVS referring to the SPS. The value of sps_decoding_parameter_set_id shall be the same in all SPSs that are referred to by coded pictures in a bitstream.

sps_video_parameter_set_id when greater than 0, specifies the value of vps_video_parameter_set_id for the VPS referred to by the SPS. When sps_video_parameter_set_id is equal to 0, the SPS does not refer to a VPS and no VPS is referred to when decoding each CVS referring to the SPS.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_reserved_zero_5bits shall be equal to 0 in bitstreams conforming to this version of this Specification. Other values for sps_reserved_zero5bits are reserved for future use by ITU-T|ISO/IEC.

gdr_enabled_flag equal to 1 specifies that GDR pictures may be present in CVSs referring to the SPS. gdr_enabled_flag equal to 0 specifies that GDR pictures are not present in CVSs referring to the SPS.

sps_seq_parameter_set_id provides an identifier for the SPS for reference by other syntax elements. The value of sps_seq_parameter_set_id shall be in the range of 0 to 15, inclusive.

chroma_format_idc specifies the chroma sampling relative to the luma sampling as specified in. The value of chroma_format_idc shall be in the range of 0 to 3, inclusive.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:

If separate_colour_plane_flag is equal to 0, ChromaArrayType is set equal to chroma_format_idc.

Otherwise (separate_colour_plane_flag is equal to 1), ChromaArrayType is set equal to 0.

pic_width_max_in_luma_samples specifies the maximum width, in units of luma samples, of each decoded picture referring to the SPS. pic_width_max_in_luma_samples shall not be equal to 0 and shall be an integer multiple of MinCbSizeY.

pic_height_max_in_luma_samples specifies the maximum height, in units of luma samples, of each decoded picture referring to the SPS. pic_height_max_in_luma_samples shall not be equal to 0 and shall be an integer multiple of MinCbSizeY.

subpics_present_flag equal to 1 indicates that subpicture parameters are present in the present in the SPS RBSP syntax. subpics_present_flag equal to 0 indicates that subpicture parameters are not present in the present in the SPS RBSP syntax.

NOTE—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

max_subpic_minus1 plus 1 specifies the maximum number of subpictures that may be present in the CVS. max_subpics_minus1 shall be in the range of 0 to 254. The value of 255 is reserved for future use by ITU-T|ISO/IEC.

subpie_grid_col_width_minus1 plus 1 specifies the width of each element of the subpicture identifier grid in units of 4 samples. The length of the syntax element is Ceil(Log 2(pic_width_max_in_luma_samples/4)) bits.

The variable NumSubPicGridCols is derived as follows:

```
NumSubPicGridCols =
( pic_width_max_in_luma_samples +
subpic_grid_col_width_minus1 * 4 + 3 ) /
( subpic_grid_col_width_minus1 * 4 + 4 )
``` subpic_grid_row_height_minus1 plus 1 specifies the height of each element of the subpicture identifier grid in units of 4 samples. The length of the syntax element is Ceil(Log 2(pic_height_max_in_luma_samples/4)) bits.

The variable NumSubPicGridRows is derived as follows:

```
NumSubPicGridRows =
( pic_height_max_in_luma_samples +
subpic_grid_row_height_minus1 * 4 + 3 ) /
( subpic_grid_row_height_minus1 * 4 + 4 )
``` subpic_grid_idx[i][j] specifies the subpicture index of the grid position (i, j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

```
NumSubPics = 0
for( i = 0; i. < NumSubPicGridRows; i++ ) {
  for( j = 0; j < NumSubPicGridCols; j++ ) {
    if ( i = = 0)
      SubPicTop[ subpic_grid_idx[ i ][ j ] ] = 0
    else if( subpic_grid_idx[ i ][ j ] != subpic_grid_idx[ i - 1 ][ j ] ) {
      SubPicTop[ subpic_grid_idx_[ i ][ j ] ] = i
      SubPicHeight[ subpic_grid_idx[ i - 1][ j ] ] =
i - SubPicTop[ subpic_grid_idx[ i - 1 ][ j ] ]
    }
    if ( j = = 0)
      SubPicLeft[ subpic_grid_idx[ i ][ j ] ] = 0
    else if (subpic_grid_idx[ i ][ j ] != subpic_grid_idx[ i ][ j - 1 ] ) {
      SubPicLeft[ subpic_grid_idx[ i ][ j ] ] = j
      SubPicWidth[ subpic_grid_idx[ i ][ j ] ] =
j - SubPicLeft[ subpic_grid_idx[ i ][ j - 1 ] ]
    }
    if ( i = = NumSubPicGridRows - 1)
      SubPicHeight[ subpic_grid_idx[ i ][ j ] ] =
i - SubPicTop[ subpic_grid_idx[ i - 1 ][ j ] ] + 1
    if (j = = NumSubPicGridRows - 1)
      SubPicWidth[ subpic_grid_idx[ i ][ j ] ] =
j - SubPicLeft[ subpic_grid_idx[ i ][ j - 1 ] ] + 1
    if( subpic_grid_idx[ i ][ j ] > NumSubPics)
      NumSubPics = subpic_grid_idx[ i ][ j ]
  }
}
``` subpic_treated_as_pic_flag[i] equal to 1 specifies that the i-th subpicture of each coded picture in the CVS is treated as a picture in the decoding process excluding in-loop filtering operations. subpic_treated_as_pic_flag[i] equal to 0 specifies that the i-th subpicture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CVS. loop_filter_across_subpic_enabled_flag[i] equal to 0 specifies that in-loop filtering operations are not performed across the boundaries of the i-th subpicture in each coded picture in the CVS. When not present, the value of loop_filter_across_subpic_enabled_pic_flag[i] is inferred to be equal to 1.

It is a requirement of bitstream conformance that the following constraints apply:

For any two subpictures subpicA and subpicB, when the index of subpicA is less than the index of subpicB, any coded NAL unit of subPicA shall succeed any coded NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

bit_depth_luma_minus8 specifies the bit depth of the samples of the luma array $BitDepth_Y$ and the value of the luma quantization parameter range offset $QpBdOffset_Y$ as follows:

$BitDepth_Y = 8 + bit\_depth\_luma\_minus8$ $QpBdOffset_Y = 6 * bit\_depth\_luma\_minus8$ bit_depth_luma_minus8 shall be in the range of 0 to 8, inclusive.

bit_depth_chroma_minus8 specifies the bit depth of the samples of the chroma arrays $BitDepth_C$ and the value of the chroma quantization parameter range offset $QpBdOffset_C$ as follows:

$BitDepth_C$=8+bit_depth_chroma_minus8

$QpBdOffset_C$=6*bit_depth_chroma_minus8 bit_depth_chroma_minus8 shall be in the range of 0 to 8, inclusive.

min_qp_prime_ts_minus4 specifies the minimum allowed quantization parameter for transform skip mode as follows:

QpPrimeTsMin=4+min_qp_prime_ts_minus4 log2_max_pic_order_cnt_lsb_minus4 specifies the value of the variable MaxPicOrderCntLsb that is used in the decoding process for picture order count as follows:

MaxPicOrderCntLsb=
$2^{(log\ 2\_max\_pic\_order\_cnt\_lsb\_minus4+4)}$

The value of log2_max_pic_order_cnt_Lsb_minus4 shall be in the range of 0 to 12, inclusive.

sps_sub_layer_ordering_info_present_flag equal to 1 specifies that sps_max_dec_pic_buffering_minus1[i], sps_max_num_reorder_pics[i], and sps_max_latency_increase_plus1[i] are present for sps_max_sub_layers_minus1+1 sub-layers. sps_sub_layer_ordering_info_present_flag equal to 0 specifies that the values of sps_max_dec_pic_buffering_minus1[sps_max_sub_layers_minus1], sps_max_num_reorder_pics[sps_max_sub_layers_minus1], and sps_max_latency_increase_plus1[sps_max_sub_layers_minus1] apply to all sub-layers. When not present, sps_sub_layer_ordering_info_present_flag is inferred to be equal to 0.

sps_max_dec_pic_buffering_minus1[i] plus 1 specifies the maximum required size of the decoded picture buffer for the CVS in units of picture storage buffers when HighestTid is equal to i. The value of sps_max_dec_pic_buffering_minus1[i] shall be in the range of 0 to MaxDpbSize−1, inclusive, where MaxDpbSize is as specified somewhere else. When i is greater than 0, sps_max_dec_pic_buffering_minus1[i] shall be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorder_pics[i] shall be in the range of 0 to sps_max_dec_pic_buffering_minus1[i], inclusive. When i is greater than 0, sps_max_num_reorder_pics[i] shall be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sp_max_num_reorder_pics[sps_max_sub_layers_minus1].

sps_max_latency_increase_plus1[i] not equal to 0 is used to compute the value of SpsMaxIatencyPictures[i], which specifies the maximum number of pictures that can precede any picture in the CVS in output order and follow that picture in decoding order when HighestTid is equal to i.

When sps_max_latency_increase_plus1[i] is not equal to 0, the value of SpsMaxLatencyPictures[i] is specified as follows:

SpsMaxLatencyPictures[i]=sps_max_num_reorder_pics[i]+sps_max_latency_increase_plus1[i]−1

When sps_max_latency_increase_plus1[i] is equal to 0, no corresponding limit is expressed. The value of sps_max_latency_increase_plus1[i] shall be in the range of 0 to $2^{32}-2$, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS.

inter_layer_ref_pics_present_flag equal to 0 specifies that no ILRP is used for inter prediction of any coded picture in the CVS. inter_layer_ref_pics_flag equal to 1 specifies that ILRPs may be used for inter prediction of one or more coded pictures in the CVS. When sps_video_parameter_set_id is equal to 0, the value of inter_layer_ref_pics_present_flag is inferred to be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax structures num_ref_pic_lists_in_sps[1] and ref_pic_list_struct(1, rplsIdx) are not present and the following applies:

The value of num_ref_pic_lists_in_sps[1] is inferred to be equal to the value of num_ref_Pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log2_ctu_size_minus5 plus 5 specifies the luma coding tree block size of each CTU. It is a requirement of bitstream conformance that the value of log2_ctu_size_minus5 be less than or equal to 2.

log2_min_luma_coding_block_size_minus2 plus 2 specifies the minimum luma coding block size.

The variables CtbLog 2SizeY, CtbSizeY, MinCbLog 2SizeY, MinCbSizeY, IbcBufWidthY, IbcBufWidthC and Vsize are derived as follows:

CtbLog 2SizeY=log2_ctu_size_minus5+5

CtbSizeY=1<<CtbLog 2SizeY

MinCbLog 2SizeY=log2_min_luma_coding_block_size_minus2+2

MinCbSizeY=1<<MinCbLog 2SizeY

IbcBufWidthY=128*128/CtbSizeY

IbcBufWidthC=IbcBufWidthY/SubWidthC

VSize=Min(64,CtbSizeY)

The variables CtbWidthC and CtbHeightC, which specify the width and height, respectively, of the array for each chroma CTB, are derived as follows:
  If chroma_format_idc is equal to 0 (monochrome) or separate_colour_plane_flag is equal to 1, CtbWidthC and CtbHeightC are both equal to 0.
  Otherwise, CtbWidthC and CtbHeightC are derived as follows:

CtbWidthC=CtbSizeY/SubWidthC

CtbHeightC=CtbSizeY/SubHeightC

For log2BlockWidth ranging from 0 to 4 and for log2BlockHeight ranging from 0 to 4, inclusive, the up-right diagonal and raster scan order array initialization process as specified is invoked with 1<<log2BlockWidth and 1<<log2BlockHeight as inputs, and the output is assigned to DiagScanOrder[log2BlockWidth][log2BlockHeight] and Raster2DiagScanPos[log2BlockWidth][log2BlockHeight].

For log2BlockWidth ranging from 0 to 6 and for log2BlockHeight ranging from 0 to 6, inclusive, the horizontal and vertical traverse scan order array initialization process as specified is invoked with 1<<log2BlockWidth and 1<<log2BlockHeight as inputs, and the output is assigned to HorTravScanOrder[log2BlockWidth][log2BlockHeight] and VerTravScanOrder[log2BlockWidth][log2BlockHeight].

partition_constraints_override_enabled_flag equal to 1 specifies the presence of partition_constraints_override_flag in the slice headers for slices referring to the SPS. partition_constraints_override_enabled_flag equal to 0 specifies the absence of partition_constraints_override_flag in the slice headers for slices referring to the SPS.

sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_flag is equal to 1, the default difference can be overridden by slice_log2_diff_min_qt_min_cb_luma present in the slice header of the slices referring to the SPS. The value of spc_log2_diff_min_qt_min_cb_intra_slice_luma shall be in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

MinQtLog 2SizeIntraY=sps_log2_diff_min_qt_min_cb_intra_slice_luma+MinCbLog 2SizeY sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1(P) referring to the SPS. When partition_constraints_override_flag is equal to 1, the default difference can be overridden by slice_log2_diff_min_qt_min_cb_luma present in the slice header of the slices referring to the SPS. The value of sps_log2_diff_min_qt_min_cb_inter_slice shall be in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

MinQtLog 2SizeInterY=sps_log2_diff_min_qt_min_cb_inter_slice+MinCbLog 2SizeY sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_inter_slice shall be in the range of 0 to CtbLog 2SizeY−MinCbLog 2SizeY, inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_intra_slice_luma shall be in the range of 0 to CtbLog 2SizeY−MinCbLog 2SizeY, inclusive.

sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_flag is equal to 1, the default difference can be overridden by slice_log2_diff_max_bt_min_qt_luma present in the slice header of the slices referring to the SPS. The value of sps_log2_diff_max_bt_min_qt_intra_slice_luma shall be in the range of 0 to CtbLog 2SizeY−MinQtLog 2SizeIntraY, inclusive. When sps_log2_diff_max_bt_min_qt_intra_slice_luma is not present, the value of sps_log2_diff_max_bt_min_qt_intra_slice_luma is inferred to be equal to 0.

sps_log2_diff_max_bt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_flag is equal to 1, the default difference can be overridden by slice_log2_diff_max_tt_min_qt_luma present in the slice header of the slices referring to the SPS. The value of sps_log2_diff_max_tt_min_qt_intra_slice_luma shall be in the range of 0 to CtbLog 2SizeY−MinQtLog 2SizeIntraY, inclusive. When sps_log2_dif_max_tt_min_qt_intra_slice_luma is not present, the value of sps_log2_diff_max_tt_min_qt_intra_slice_luma is inferred to be equal to 0.

sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log2_diff_max_bt_min_qt_luma present in the slice header of the slices referring to the SPS. The value of sps_log2_diff_max_bt_min_qt_inter_slice shall be in the range of 0 to CtbLog 2SizeY−MinQtLog 2SizeInterY, inclusive. When sps_log2_diff_max_bt_min_qt_inter_slice is not present, the value of sps_log2_diff_max_bt_min_qt_inter_slice is inferred to be equal to 0.

sps_log2_diff_max_bt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log2_diff_max_tt_min_qt_luma present in the slice header of the slices referring to the SPS. The value of sps_log2_diff_max_tt_min_qt_inter_slice shall be in the range of 0 to CtbLog 2SizeY−MinQtLog 2SizeInterY, inclusive. When sps_log2_diff_max_tt_min_qt_inter_slice is not present, the value of sps_log2_diff_max_tt_min_qt_inter_slice is inferred to be equal to 0.

sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (1) referring to the SPS. When partition_constraints_override_flag is equal to 1, the default difference can be overridden by slice_log2_diff_min_qt_min_cb_chroma present in the slice header of the slices referring to the SPS. The value of sps_log2_diff_min_qt_min_cb_intra_slice_chroma shall be in the range of 0 to CtbLog 2SizeY−MinCbLog 2SizeY, inclusive. When not present, the value of sps_log2_diff_min_qt_min_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$\text{MinQtLog 2SizeIntra}C = \text{sps\_log2\_diff\_min\_qt\_min\_cb\_intra\_slice\_chroma} + \text{MinCbLog 2Size}Y$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_flag is equal to 1, the default maximum hierarchy depth can be overridden by slice_max_mtt_hierarchy_depth_chroma present in the slice header of the slices referring to the SPS. The value of sps_max_mtt_hierarchy_depth_intra_slice_chroma shall be in the range of 0 to CtbLog 2SizeY−MinCbLog 2SizeY, inclusive. When not present, the value of sps_max_mtt_hierarchy_depth_intra_slice_chroma is inferred to be equal to 0.

sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log2_diff_max_bt_min_qt_chroma present in the slice header of the slices referring to the SPS. The value of sps_log2_diff_max_bt_min_qt_intra_slice_chroma shall be in the range of 0 to CtbLog 2SizeY−MinQtLog 2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.

sps_log2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log2_diff_max_tt_min_qt_chroma present in the slice header of the slices referring to the SPS. The value of sps_log2_diff_max_tt_min_qt_intra_slice_chroma shall be in the range of 0 to CtbLog 2SizeY−MinQtLog 2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

sps_max_luma_tranform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog 2SizeY, MaxTbLog 2SizeY, MinTbSizeY, and MaxTbSizeY are derived as follows:

MinTbLog 2SizeY=2

MaxTbLog 2SizeY=sps_max_luma_transform_size64_flag?6: 5

MinTbSizeY=1<<MinTbLog 2SizeY

MaxTbSizeY=1<MaxTbLog 2SizeY same_qp_table_for_chroma equal to 1 specifies that only one chroma QP mapping table is signalled and this table applies to Cb and Cr residuals as well as joint Cb-Cr residuals. same_qp_table_for_chroma equal to 0 specifies that three chroma QP mapping tables are signalled in the SPS. When same_qp_table_for_chroma is not present in the bitstream, the value of same_qp_table_for_chroma is inferred to be equal to 1.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset$_C$, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_out_val[i][j] specifies a delta value used to derive the output coordinate of the j-th pivot point of the i-th chroma QP mapping table. When delta_qp_out_val[0][j] is not present in the bitstream, the value of delta_qp_out_val[0][j] is inferred to be equal to 0.

The i-th chroma QP mapping table ChromaQpTable[i] for i=0 . . . same_qp_table_for_chroma?0:2 is derived as follows:

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax sps_bdpcm_enabled_flag equal to 1 specifies that intra_bdpcm_flag may be present in the coding unit syntax for intra coding units. sps_bdpcm_enabled_flag equal to 0 specifies that intra_bdpcm_flag is not present in the coding unit syntax for intra coding units. When not present, the value of sps_bdpcm_enabled_flag is inferred to be equal to 0.

sps_joint_cbcr_enabled_flag equal to 0 specifies that the joint coding of chroma residuals is disabled. sps_joint_cbcr_enabled_flag equal to 1 specifies that the joint coding of chroma residuals is enabled.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is less than or equal to (pic_width_in_luma_samples/MinCbSizeY−1), where pic_width_in_luma_samples is the value of

```
qpInVal[ i ][ 0 ] = −QpBdOffsetC + delta_qp_in_val_minus1[ i ][ 0 ]
qpOutVal[ i ][ 0 ] = −QpBdOffsetC + delta_qp_out_val[ i ][ 0 ]
for( j = 1; j <= num_points_in_qp_table_minus1[ i ]; j++ ) {
  qpInVal[ i ][ j ] = qpInVal[ i ][ j − 1 ] + delta_qp_in_val_minus1[ i ][ j ] + 1
  qpOutVal[ i ][ j ] = qpOutVal[ i ][ j − 1 ] + delta_qp_out_val[ i ][ j ]
}
ChromaQpTable[ i ][ qpInVal[ i ][ 0 ] ] = qpOutVal[ i ][ 0 ]
for( k = qpInVal[ i ][ 0 ] − 1; k >= −QpBdOffsetC; k− − )
  ChromaQpTable[ i ][ k ] = Clip3( −QpBdOffsetC, 63, ChromaQpTable[ i ][ k + 1 ] − 1 )
for( j = 0; j < num_points_in_qp_table_minus1[ i ]; j++ ) {
  sh = ( delta_qp_in_val_minus1[ i ][j + 1 ] + 2 ) >> 1
  for( k = qpInVal[ i ][ j ] + 1, m = 1; k <= qpInval[ i ][ j + 1 ]; k++, m++ )
    ChromaQpTable[ i ][ k ] = ChromaQpTable[ i ][ qpInVal[ i ][ j ] ] +
      ( delta_qp_out_val[ i ][j + 1] * m + sh ) /
      ( delta_qp_in_val_minus1[ i ][j + 1] + 1 )
}
for( k = qpInVal[ i ][ num_points_in_qp_table_minus1[ i ] ] + 1; k <= 63; k++ )
  ChromaQpTable[ i ][ k ] = Clip3( −QpBdOffsetC, 63, ChromaQpTable[ i ][ k − 1 ] + 1 )
When same_qp_table_for_chroma is equal to 1, ChromaQpTable[ 1 ][ k ] and
ChromaQpTable[ 2 ][ k ] are set equal to ChromaQpTable[ 0 ][ k ] for k = −QpBdOffsetC..63.
It is a requirement of bitstream conformance that the values of qpInVal[ i ][ j ] and
qpOutVal[ i ][ j ] shall be in the range of −QpBdOffsetC to 63, inclusive for i =
0..same_qp_table_for_chroma ? 0 : 2 and j = 0..num_points_in_qp_table_minus1[ i ].
``` sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

pic_width_in_luma_samples in any PPS that refers to the SPS, the value of sps_ref_wraparound_enabled_flag shall be equal to 0.

sps_ref_wraparound_offset_miinus1 plus 1 specifies the offset used for computing the horizontal wrap-around position in units of MinCbSizeY luma samples. The value of ref_wraparound_offset_minus1 shall be in the range of (CtbSizeY/MinCbSizeY)+1 to (pic_width_in_luma_samples/MinCbSizeY)−1, inclusive, where pic_width_in_luma_samples is the value of pic_width_in_luma_samples in any PPS that refers to the SPS.

sps_temporal_mvp_enabled_flag equal to 1 specifies that slice_temporal_mvp_enabled_flag is present in the slice headers of slices with slice_type not equal to I in the CVS. sps_temporal_mvp_enabled_flag equal to 0 specifies that slice_temporal_mvp_enabled_flag is not present in slice headers and that temporal motion vector predictors are not used in the CVS.

sps_amvr_enabled_flag equal to 1 specifies that subblock-based temporal motion vector predictors may be used in decoding of pictures with all slices having slice_type not equal to I in the CVS. sps_sbtmvp_enabled_flag equal to 0 specifies that subblock-based temporal motion vector predictors are not used in the CVS. When sps_sbtmvp_enabled_ flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_bdof_dmvr_slice_present_flag equal to 1 specifies that slice_disable_bdof_dmvr_flag is present in slice headers referring to the SPS. sps_bdof_dmvr_slice_present_flag equal to 0 specifies that slice_disable_bdof_dmvr_flag is not present in slice headers referring to the SPS. When sps_bdof_dmvr_slice_present_flag is not present, the value of sps_bdof_dmvr_slice_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_ flag equal to 1 specifies that the cross-component linear model intra prediction from luma component to chroma component is enabled. When sps_cclm_enabled_flag is not present, it is inferred to be equal to 0.

sps_cclm_colocated_chroma_flag equal to 1 specifies that the top-left downsampled luma sample in cross-component linear model intra prediction is collocated with the top-left luma sample. sps_cclm_colocated_chroma_flag equal to 0 specifies that the top-left downsampled luma sample in cross-component linear model intra prediction is horizontally co-sited with the top-left luma sample but vertically shifted by 0.5 units of luma samples relatively to the top-left luma sample.

sps_mts_enabled_flag equal to 1 specifies that sps_explicit_mts_intra_enabled_flag is present in the sequence parameter set RBSP syntax and that sps_explicit_mts_inter_ enabled_flag is present in the sequence parameter set RBSP syntax. sps_mts_enabled_flag equal to 0 specifies that sps_ explicit_mts_intra_enabled_flag is not present in the sequence parameter set RBSP syntax and that sps_explicit_mts_inter_enabled_flag is not present in the sequence parameter set RBSP syntax.

sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_sbt_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

sps_sbt_enabled_flag equal to 0 specifies that subblock transform for inter-predicted CUs is disabled. sps_sbt_enabled_flag equal to 1 specifies that subblock transform for inter-predicteds CU is enabled.

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize=Min(MaxTbSizeY, sps\_sbt\_max\_size\_64\_flag?64:32)$$

sps_affine_enabled_flag specifies whether affine model based motion compensation can be used for inter prediction. If sps_affine_enabled_flag is equal to 0, the syntax shall be constrained such that no affine model based motion compensation is used in the CVS, and inter_affine_flag and cu_affine_type_flag are not present in coding unit syntax of the CVS. Otherwise (sps_affine_enabled_flag is equal to 1), affine model based motion compensation can be used in the CVS.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CVS, and cu_affine_type_flag is not present in coding unit syntax in the CVS. Otherwise (sps_affine_type_flag is equal to 1), 6-parameter affine model based motion compensation can be used in the CVS. When not present, the value of sps_affine_type_flag is inferred to be equal to 0.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CVS, and bcw_idx is not present in coding unit syntax of the CVS. Otherwise (sps_bcw_enabled_flag is equal to 1), bi-prediction with CU weights can be used in the CVS.

sps_ibc_enabled_flag equal to 1 specifies that the IBC prediction mode may be used in decoding of pictures in the CVS. sps_ibc_enabled_flag equal to 0 specifies that the IBC prediction mode is not used in the CVS. When sps_ibc_enabled_flag is not present, it is inferred to be equal to 0.

sps_ciip_enabled_flag specifies that ciip_flag may be present in the coding unit syntax for inter coding units. ps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sp_triangle_enabled_flag specifies whether triangular shape based motion compensation can be used for inter prediction. sps_triangle_enabled_flag equal to 0 specifies that the syntax shall be constrained such that no triangular shape based motion compensation is used in the CVS, and merge_triangle_split_dir, merge_triangle_idx0, and merge_triangle_idx1 are not present in coding unit syntax of the CVS. sps_triangle_enabled_flag equal to 1 specifies that triangular shape based motion compensation can be used in the CVS.

sps_lmcs_enabled_flag equal to 1 specifies that luma mapping with chroma scaling is used in the CVS. sps_lmcs_enabled_flag equal to 0 specifies that luma mapping with chroma scaling is not used in the CVS.

sps_lfnst_enabled_flag equal to 1 specifies that lfnst_idx may be present in the residual coding syntax for intra coding units sps_lfnst_enabled_flag equal to 0 specifies that lfnst_idx is not present in the residual coding syntax for intra coding units.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_intrvals_qp_offset specifies the offset used to derive the variable qP as specified. The value of sps_ladf_lowest_interval_qp_offset shall be in the range of 0 to 63, inclusive.

sps_ladf_qp_offset[i] specifies the offset array used to derive the variable qP as specified. The value of sps_ladf_qp_offset[i] shall be in the range of 0 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepthY}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

SpsLadfIntervalLowerBound[*i*+1]=SpsLadfIntervalLowerBound[*i*]+sps_ladf_delta_threshold_minus1[*i*]+1 sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

general_hrd_parameters_present_flag equal to 1 specifies that the syntax elements num_units_in_tick and time_scale and the syntax structure general_hrd_parameters( ) are present in the SPS RBSP syntax structure. general_hrd_parameters_present_flag equal to 0 specifies that the syntax elements num_units_in_tick and time_scale and the syntax structure general_hrd_parameters( ) are not present in the SPS RBSP syntax structure.

num_units_in_tick is the number of time units of a clock operating at the frequency time_scale Hz that corresponds to one increment (called a clock tick) of a clock tick counter. num_units_in_tick shall be greater than 0. A clock tick, in units of seconds, is equal to the quotient of num_units_in_tick divided by time_scale. For example, when the picture rate of a video signal is 26 Hz, time_scale may be equal to 27 000 000 and num_units_in_tick may be equal to 1 080 000, and consequently a clock tick may be equal to 0.04 seconds.

time_scale is the number of time units that pass in one second. For example, a time coordinate system that measures time using a 27 MHz clock has a time_scale of 27 000 000. The value of time_scale shall be greater than 0.

sub_layer_cpb_parameter_present_flag equal to 1 specifies that the syntax structure general_hrd_parameters( ) is present in the SPS RBSP and includes HRD parameters for sub-layer representations with TemporalId in the range of 0 to sps_max_sub_layers_minus1, inclusive. sub_layer_cpb_parameters_present_flag equal to 0 specifies that the syntax structure general_hrd_parameters( ) is present in the SPS RBSP and includes HRD parameters for the sub-layer representation with TemporalId equal to sps_max_sub_layers_minus1.

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

As described above, in JVET-O2001 when hrd_parameters_present_flag is equal to 1 the syntax structure general_hrd_parameters( ) is present in the SPS RBSP syntax structure. Table 4 illustrates the general_hrd_parameters( ) syntax structure provided in JVET-O2001.

TABLE 4

|  | Descriptor |
|---|---|
| general_hrd_parameters( firstSubLayer, maxNumSubLayersMinus1 ) { |  |
|   general_nal_hrd_parameters_present_flag | u(1) |
|   general_vcl_hrd_parameters_present_flag | u(1) |
|   if( general_nal_hrd_parameters_present_flag \|\| |  |
|       general_vcl_hrd_parameters_present_flag ) { |  |
|     decoding_unit_hrd_params_present_flag | u(1) |
|     if( decoding_unit_hrd_params_present_flag ) { |  |
|       tick_divisor_minus2 | u(8) |
|       decoding_unit_cbp_params_in_pic_timing_sei_flag | u(1) |
|     } |  |
|     bit_rate_scale | u(4) |
|     cpb_size_scale | u(4) |
|     if( decoding_unit_hrd_params_present_flag ) |  |
|       cpb_size_du_scale | u(4) |
|   } |  |
|   for( i = firstSubLayer; i <= maxNumSubLayersMinus1; i++ ) { |  |
|     fixed_pic_rate_general_flag[ i ] | u(1) |
|     if( !fixed_pic_rate_general_flag[ i ] ) |  |
|       fixed_pic_rate_within_cvs_flag[ i ] | u(1) |
|     if( fixed_pic_rate_within_cvs_flag[ i ] ) |  |
|       elemental_duration_in_tc_minus1[ i ] | ue(v) |
|     else |  |
|       low_delay_hrd_flag[ i ] | u(1) |
|     if( !low_delay_hrd_flag[ i ] ) |  |
|       hrd_cpb_cnt_minus1[ i ] | ue(v) |
|     if( general_nal_hrd_parameters_present_flag ) |  |
|       sub_layer_hrd_parameters( i ) |  |
|     if( general_vcl_hrd_parameters_present_flag ) |  |
|       sub_layer_hrd_parameters( i ) |  |
|   } |  |
| } |  |

With respect to Table 4, JVET-O2001 provides the following semantics:

The general_hrd_parameters( ) syntax structure provides HRD parameters used in the HRD operations.

general_nal_hrd_parameters_present_flag equal to 1 specifies that NAL HRD parameters (pertaining to Type II bitstream conformance) are present in the general_hrd_parameters( ) syntax structure. general_nal_hrd_parameters_present_flag equal to 0 specifies that NAL HRD parameters are not present in the general_hrd_parameters( ) syntax structure.

NOTE—When general_nal_hrd_parameters_present_flag is equal to 0, the conformance of the bitstream cannot be verified without provision of the NAL HRD parameters and all buffering period and picture timing SEI messages, by some means not specified in this Specification.

The variable NalHrdBpPresentFlag is derived as follows:
If one or more of the following conditions are true, the value of NalHrdBpPresentFlag is set equal to 1:
  general_nal_hrd_parameters_present_flag is present in the bitstream and is equal to 1.
  The need for presence of buffering periods for NAL HRD operation to be present in the bitstream in buffering period SEI messages is determined by the application, by some means not specified in this Specification.

Otherwise, the value of NalHrdBpPresentFlag is set equal to 0.

general_vcl_hrd_parameters_present_flag equal to 1 specifies that VCL HRD parameters (pertaining to all bitstream conformance) are present in the general_hrd_parameters( ) syntax structure. general_vcl_hrd_parameters_present_flag equal to 0 specifies that VCL HRD parameters are not present in the general_hrd_parameters( ) syntax structure.

NOTE—When general_vcl_hrd_parameters_present_flag is equal to 0, the conformance of the bitstream cannot be verified without provision of the VCL HRD parameters and all buffering period and picture timing SEI messages, by some means not specified in this Specification.

The variable VclHrdBpPresentFlag is derived as follows:
If one or more of the following conditions are true, the value of VclHrdBpPresentFlag is set equal to 1:
  general_vcl_hrd_parameters_present_flag is present in the bitstream and is equal to 1.
  The need for presence of buffering periods for VCL HRD operation to be present in the bitstream in buffering period SEI messages is determined by the application, by some means not specified in this Specification.

Otherwise, the value of VclHrdBpPresentFlag is set equal to 0.

The variable CpbDpbDelaysPresentFlag is derived as follows:
If one or more of the following conditions are true, the value of CpbDpbDelaysPresentFlag is set equal to 1:
  general_nal_hrd_parameters_present_flag is present in the bitstream and is equal to 1.

general_vcl_hrd_parameters_present_flag is present in the bitstream and is equal to 1.

The need for presence of CPB and DPB output delays to be present in the bitstream in picture timing SEI messages is determined by the application, by some means not specified in this Specification.

Otherwise, the value of CpbDpbDelaysPresentFlag is set equal to 0.

decoding_unit_hrd_params_present_flag equal to 1 specifies that decoding unit level HRD parameters are present and the HRD may operate at access unit level or decoding unit level. decoding_unit_hrd_params_present_flag equal to 0 specifies that decoding unit level HRD parameters are not present and the HRD operates at access unit level. When decoding_unit_hrd_params_present_flag is not present, its value is inferred to be equal to 0.

tick_divisor_minus2 is used to specify the clock sub-tick. A clock sub-tick is the minimum interval of time that can be represented in the coded data when decoding_unit_hrd_params_present_flag is equal to 1.

decoding_unit_cpb_params_in_pic_timing_sei_flag equal to 1 specifies that decoding unit level CPB removal delay parameters are present in picture timing SET messages and no decoding unit information SEI message is available (in the CVS or provided through external means not specified in this Specification). decoding_unit_cpb_params_in_pic_timing_sei_flag equal to 0 specifies that decoding unit level CPB removal delay parameters are present in decoding unit information SET messages and picture timing SEI messages do not include decoding unit level CPB removal delay parameters. When the decoding_unit_cpb_params_in_pic_timing_sei_flag syntax element is not present, it is inferred to be equal to 0.

bit_rate_scale (together with bit_rate_value_minus1[i][j]) specifies the maximum input bit rate of the j-th CPB when HighestTid is equal to i.

cpb_size_scale (together with cpb_size_value_minus1[i][j]) specifies the CPB size of the j-th CPB when HighestTid is equal to i and when the CPB operates at the access unit level.

cpb_size_du_scale (together with cpb_size_du_value_minus1[i][j] specifies the CPB size of the j-th CPB when HighestTid is equal to i and when the CPB operates at decoding unit level.

fixed_pic_rate_gsneral_flag[i] equal to 1 indicates that, when HighestTid is equal to i, the temporal distance between the HRD output times of consecutive pictures in output order is constrained as specified below. fixed_pic_rate_general_flag[i] equal to 0 indicates that this constraint may not apply.

When fixed_pic_rate_general_flag[i] is not present, it is inferred to be equal to 0.

fixed_pic_rate_within_cvs_flag[i] equal to 1 indicates that, when HighestTid is equal to i, the temporal distance between the HRD output times of consecutive pictures in output order is constrained as specified below. fixed_pic_rate_within_cvs_flag[i] equal to 0 indicates that this constraint may not apply.

When fixed_pic_rate_general_flag[i] is equal to 1, the value of fixed_pic_rate_within_cvs_flag[i] is inferred to be equal to 1.

elemental_duration_in_tc_minus1[i] plus 1 (when present) specifies, when HighestTid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

When HighestTid is equal to i and fixed_pic_rate_general_flag[i] is equal to 1 for a CVS containing picture n, and picture n is a picture that is output and is not the last picture in the bitstream (in output order) that is output, the value of the variable DpbOutputElementalInterval[n] is specified by:

DpbOutputElementalInterval[$n$]=DpbOutputInterval[$n$]+ElementalOutputPeriods where DpbOutputInterval[n] is specified in the following Equation:

DpbOutputInterval[$n$]=DpbOutputTime[nextPicInOutputOrder]−DpbOutputTime[$n$]

where nextPicInOutputOrder is the picture that follows picture n in output order and has PictureOutputFlag equal to 1.

and ElementalOutputPeriods is specified as follows:
If a frame-field information SEI message is present for picture n that contains a display_elemental_periods_minus1 syntax element, ElementalOutputPeriods is equal to the value of display_elemental_periods_minus1+1.

Otherwise, ElementalOutputPeriods is equal to 1.

When HighestTid is equal to i and fixed_pic_rate_general_flag[i] is equal to 1 for a CVS containing picture n, and picture n is a picture that is output and is not the last picture in the bitstream (in output order) that is output, the value computed for DpbOutputElementalInterval[n] shall be equal to ClockTick*(elemental_duration_in_tc_minus1[i]+1), wherein ClockTick is as specified in Equation C-1 (using the value of ClockTick for the CVS containing picture n) when one of the following conditions is true for the following picture in output order nextPicInOutputOrder that is specified for use in the Equation above:

picture nextPicInOutputOrder is in the same CVS as picture n.

picture nextPicInOutputOrder is in a different CVS and fixed_pic_rate_general_flag[i] is equal to 1 in the CVS containing picture nextPicInOutputOrder, the value of ClockTick is the same for both CVSs, and the value of elemental_duration_in_tc_minus1[i] is the same for both CVSs.

When HighestTid is equal to i and fixed_pic_rate_within_cvs_flag[i] is equal to 1 for a CVS containing picture n, and picture n is a picture that is output and is not the last picture in the CVS (in output order) that is output, the value computed for DpbOutputElementalInterval[n] shall be equal to ClockTick*(elemental_duration_in_tc_minus1[i]+1), wherein ClockTick is as specified in Equation C-1 (using the value of ClockTick for the CVS containing picture n) when the following picture in output order nextPicInOutputOrder that is specified for use in the equation above is in the same CVS as picture n.

low_delay_hrd_flag[i] specifies the HRD operational mode, when HighestTid is equal to i, as specified. When not present, the value of low_delay_hrd_flag[i] is inferred to be equal to 0.

NOTE—When low_delay_hrd_flag[i] is equal to 1, "big pictures" that violate the nominal CPB removal times due to the number of bits used by an access unit are permitted. It is expected, but not required, that such "big pictures" occur only occasionally.

hrd_cpb_cut_minus1[i] plus 1 specifies the number of alternative CPB specifications in the bitstream of the CVS when HighestTid is equal to i. The value of hrd_cpb_cnt_minus1[i] shall be in the range of 0 to 31, inclusive. When not present, the value of hrd_cpb_cnt_minus1[i] is inferred to be equal to 0.

As described above, JVET-O2001 enables SEI messages to be signaled which assist in processes related to decoding, display or other purposes. Further, as provided above in the semantics for Table 4, a type of SEI message for VCL HRD operations includes picture timing SEI messages. Table 5 illustrates the picture timing syntax structure, pic_timing( ), provided in JVET-O2001.

TABLE 5

|  | Descriptor |
| --- | --- |
| pic_timing( payloadSize ) { |  |
|   pt_max_sub_layers_minus1 | u(3) |
|   cpb_removal_delay_minus1[ pt_max_sub_layers_minus1 ] | u(v) |
|   for( i = TemporalId; i < pt_max_sub_layers_minus1; i++ ) { |  |
|     sub_layer_delays_present_flag[ i ] | u(1) |
|     if( sub_layer_delays_present_flag[ i ] ) { |  |
|       cpb_removal_delay_delta_enabled_flag[ i ] | u(1) |
|       if( cpb_removal_delay_delta_enabled_flag[ i ] ) |  |
|         cpb_removal_delay_delta_idx[ i ] | u(v) |
|       else |  |
|         cpb_removal_delay_minus1[ i ] | u(v) |
|     } |  |
|   } |  |
|   dpb_output_delay | u(v) |
|   if( decoding_unit_hrd_params_present_flag ) |  |
|     pic_dpb_output_du_delay | u(v) |
|   if( decoding_unit_hrd_params_present_flag && |  |
|       decoding_unit_cpb_params_in_pic_timing_sei_flag ) { |  |
|     num_decoding_units_minus1 | ue(v) |
|     du_common_cpb_removal_delay_flag | u(1) |
|     if( du_common_cpb_removal_delay_flag ) |  |
|       du_common_cpb_removal_delay_increment_minus1 | u(v) |
|     for( i = 0; i <= num_decoding_units_minus1; i++ ) { |  |
|       num_nalus_in_du_minus1[ i ] | ue(v) |
|       if( !du_common_cpb_removal_delay_flag && i < num_decoding_units_minus1 ) |  |
|         du_cpb_removal_delay_increment_minus1[ i ] | u(v) |
|     } |  |
|   } |  |
| } |  |

With respect to Table 6, JVET-O2001 provides the following semantics:

The picture timing SEI message provides CPB removal delay and DPB output delay information for the access unit associated with the SEI message.

If bp_nal_hrd_parameters_present_flag or bp_vcl_hrd_parameters_present_flag of the buffering period SEI message applicable for the current access unit is equal to 1, the variable CpbDpbDelaysPresentFlag is set equal to 1. Otherwise, CpbDpbDelaysPresentFlag is set equal to 0.

The presence of picture timing SEI messages is specified as follows:
  If CpbDpbDelaysPresentFlag is equal to 1, a picture timing SEI message shall be associated with the current access unit.
  Otherwise (CpbDpbDelaysPresentFlag is equal to 0), there shall not be a picture timing SEI message associated with the current access unit.

pt_max_sub_layers_minus1 plus 1 specifies the maximum number of temporal sub-layers that may be present in the bitstream. The value of pt_max_sub_layers_minus1 shall be in the range of 0 to 6, inclusive.

It is a requirement of bitstream conformance that the value of pt_max_sub_layers_minus1 in the picture timing SEI message is equal to the value of sps_max_sub_layers_minus1 in the SPS.

cpb_removal_delay_minus1[i] plus 1 is used to calculate the number of clock ticks between the nominal CPB removal times of the access unit associated with the picture timing SEI message and the preceding access unit in decoding order that contains a buffering period SEI message when HighestTid is equal to i. This value is also used to calculate an earliest possible time of arrival of access unit data into the CPB for the HSS. The length of cpb_removal_delay_minus1[i] is cpb_removal_delay_length_minus1+1 bits.

The variable BpResetFlag of the current picture is derived as follows:
  If the current picture is associated with a buffering period SET message, BpResetFlag is set equal to 1.
  Otherwise, BpResetFlag is set equal to 0.

sub_layer_delay_present_flag[i] equal to 1 specifies that cpb_removal_delay_delta_idx[i] or cpb_removal_delay_minus1[i] is present for the sub-layer with TemporalId equal to i. sub_layer_delays_present_flag[i] equal to 0 specifies that neither cpb_removal_delay_delta_idx[i] nor cpb_removal_delay_minus1[i] is present for the sub-layer with TemporalId equal to i. When not present, the value of sub_layer_delays_present_flag[i] is inferred to be equal to 0.

cpb_removal_delay_delta_enabled[i] equal to 1 specifies that cpb_removal_delay_delta_idx[i] is present in the picture timing SET message. cpb_removal_delay_delta_enabled[i] equal to 0 specifies that cpb_removal_delay_delta_idx[i] is not present in the picture timing SET message. When not present, the value of cpb_removal_delay_delta_enabled[i] is inferred to be equal to 0.

cpb_removal_delay_deta_idx[i] specifies the index of the CPB removal delta that applies to HighestTid equal to i in the list of cpb_removal_delay_delta[j] for j ranging from 0 to num_cpb_removal_delay_deltas_minus1, inclusive.

The variables CpbRemovalDelayMsb[i] and CpbRemovalDelayVal[i] of the current picture are derived as follows:
  If the current access unit is the access unit that initializes the HRD, CpbRemovalDelayMsb[i] and CpbRemovalDelayVal[i] are both set equal to 0, and the value of cpbRemovalDelayValTmp[i] is set equal to cpb_removal_delay_minus1[i]+1.

Otherwise, let the picture prevNonDiscardablePic be the previous picture in decoding order that has TemporalId equal to 0 that is not a RASL or RADL, let prevCpbRemovalDelayMinus1[i], prevCpbRemovalDelayMsb[i], and prevBpResetFlag be set equal to the values of cpbRemovalDelayValTmp[i]−1, CpbRemovalDelayMsb[i], and BpResetFlag, respectively, for the picture prevNonDiscardablePic, and the following applies:

CpbRemovalDelayMsb[i] is derived as follows:

cpbRemovalDelayValTmp[$i$]=cpb_removal_delay_delta_enabled_flag[$i$]?cpb_removal_delay_minus1[sps_max_sub_layers_minus1]+1+cpb_removal_delay_delta[cpb_removal_delay_delta_idx[$i$]]:

cpb_removal_delay_minus1[i]+1 if(prevBpResetFlag)

CpbRemovalDelayMsb[$i$]=0 else    if(cpbRemovalDelayValTmp[i]<prevCpbRemovalDelayMinus1[i])

CpbRemovalDelayMsb[$i$]=prevCpbRemovalDelayMsb[$i$]+$2^{cpb\_removal\_delay\_length\_minus1+1}$ else CpbRemovalDelayMsb[$i$]=prevCpbRemovalDelayMsb[$i$]

CpbRemovalDelayVal is derived as follows:

CpbRemovalDelayVal[$i$]=CpbRemovalDelayMsb[$i$]+cpbRemovalDelayValTmp[$i$]

The value of CpbRemovalDelayVal[i] shall be in the range of 1 to $2^{32}$, inclusive.

The variable picDpbOutputDelta[i] is derived as follows:
If sub_layer_delays_present_flag[i] is equal to 0, picDpbOutputDelta[i] is set equal to 0.
Otherwise (sub_layer_delays_present_flag[i] is equal to 1), picDpbOutputDelta[i] is set equal to CpbRemovalDelayVal[i]−(cpb_removal_delay_minus1[sps_max_sub_layers_minus1]+1).

dpb_output_delay is used to compute the DPB output time of the picture. It specifies how many clock ticks to wait after removal of an access unit from the CPB before the decoded picture is output from the DPB.

NOTE—A picture is not removed from the DPB at its output time when it is still marked as "used for short-term reference" or "used for long-term reference".

The length of dpb_output_delay is dpb_output_delay_length_minus1+1 bits. When sps_max_dec_pic_buffering_minus1 is equal to 0, the value of pic_dpb_output_delay shall be equal to 0.

The output time derived from the dpb_output_delay of any picture that is output from an output timing conforming decoder shall precede the output time derived from the dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from dpb_output_delay shall be increasing with increasing value of PicOrderCntVal relative to all pictures within the same CVS.

pic_dph_output_du_delay is used to compute the DPB output time of the picture when DecodingUnitHrdFlag is equal to 1. It specifies how many sub clock ticks to wait after removal of the last decoding unit in an access unit from the CPB before the decoded picture is output from the DPB.

The length of the syntax element pic_dpb_output_du_delay is given in bits by dpb_output_delay_du_length_minus1+1.

The output time derived from the pic_dpb_output_du_delay of any picture that is output from an output timing conforming decoder shall precede the output time derived from the pic_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

num_decoding_units_minus1 plus 1 specifies the number of decoding units in the access unit the picture timing SEI message is associated with. The value of num_decoding_units_minus1 shall be in the range of 0 to PicSizeInCtbsY−1, inclusive.

du_common_cpb_removal_delay_flag equal to 1 specifies that the syntax element du_common_cpb_removal_delay_increment_minus1 is present. du_common_cpb_removal_delay_flag equal to 0 specifies that the syntax element du_common_cpb_removal_delay_increment_minus1 is not present.

du_common_cpb_removal_delay_increment_minus1 plus 1 specifies the duration, in units of clock sub-tick (provided below), between the nominal CPB removal times of any two consecutive decoding units in decoding order in the access unit associated with the picture timing SEI message. This value is also used to calculate an earliest possible time of arrival of decoding unit data into the CPB for the HSS, as specified. The length of this syntax element is du_cpb_removal_delay_increment_length_minus1+1.

num_nalus_in_du_minus1[i] plus 1 specifies the number of NAL units in the i-th decoding unit of the access unit the picture timing SEI message is associated with. The value of num_nalus_in_du_minus1[i] shall be in the range of 0 to PicSizeInCtbsY−1, inclusive.

The first decoding unit of the access unit consists of the first num_nalus_in_du_minus1[0]+1 consecutive NAL units in decoding order in the access unit. The i-th (with i greater than 0) decoding unit of the access unit consists of the num_nalus_in_du_minus1[i]+1 consecutive NAL units immediately following the last NAL unit in the previous decoding unit of the access unit, in decoding order. There shall be at least one VCL NAL unit in each decoding unit. All non-VCL NAL units associated with a VCL NAL unit shall be included in the same decoding unit as the VCL NAL unit.

du_cpb_removal_delay_increment_minus1[i] plus 1 specifies the duration, in units of clock sub-ticks, between the nominal CPB removal times of the (i+1)-th decoding unit and the i-th decoding unit, in decoding order, in the access unit associated with the picture timing SEI message. This value is also used to calculate an earliest possible time of arrival of decoding unit data into the CPB for the HSS, as specified. The length of this syntax element is du_cpb_removal_delay_increment_length_minus1+1.

It should be noted that a clock sub-tick may be derived as follows:

The variable ClockTick is derived as follows and is called a clock tick:

ClockTick=num_units_in_tick+time_scale

The variable ClockSubTick is derived as follows and is called a clock sub-tick:

ClockSubTick=ClockTick+(tick_divisor_minus2+2)

Further, it should be noted that an HRD may contain a coded picture buffer (CPB), an instantaneous decoding process, a decoded picture buffer (DPB), and output cropping and may operate as follows:

The HRD is initialized at decoding unit 0, with both the CPB and the DPB being set to be empty (the DPB fullness is set equal to 0).

NOTE—After initialization, the HRD is not initialized again by subsequent buffering period SEI messages.

Data associated with decoding units that flow into the CPB according to a specified arrival schedule are delivered by the hypothetical stream scheduler (HSS).

The data associated with each decoding unit are removed and decoded instantaneously by the instantaneous decoding process at the CPB removal time of the decoding unit.

Each decoded picture is placed in the DPB.

A decoded picture is removed from the DPB when it becomes no longer needed for inter prediction reference and no longer needed for output.

Further, as provided above in the semantics for Table 4, a type of SEI message for VCL HRD operations includes decoding unit information SET messages. Table 6 illustrates the decoding unit information syntax structure, decoding_unit_info( ), provided in JVET-O2001.

TABLE 6

| | Descriptor |
|---|---|
| decoding_unit_info( payloadSize ) { | |
|   decoding_unit_idx | ue(v) |
|   if( | |
|   !decoding_unit_cpb_params_in_pic_timing_sei_flag ) | |
|     du_spt_cpb_removal_delay_increment | u(v) |
|   dpb_output_du_delay_present_flag | u(1) |
|   if( dpb_output_du_delay_present_flag ) | |
|     pic_spt_dpb_output_du_delay | u(v) |
| } | |

With respect to Table 6, JVET-N1001 provides the following semantics:

The decoding unit information SEI message provides CPB removal delay information for the decoding unit associated with the SEI message.

The following applies for the decoding unit information SEI message syntax and semantics:

The syntax Clements decoding_unit_hrd_params_present_flag, decoding_unit_cpb_params_in_pic_timing_sei_flag and dpb_output_delay_du_length_minus1, and the variable CpbDpbDelaysPresentFlag are found in or derived from syntax elements in the general_hrd_parameters( ) syntax structure that is applicable to at least one of the operation points to which the decoding unit information SEI message applies.

The bitstream (or a part thereof) refers to the bitstream subset (or a part thereof) associated with any of the operation points to which the decoding unit information SE message applies.

The presence of decoding unit information SEI messages for an operation point is specified as follows:

If CpbDpbDelaysPresentFlag is equal to I, decoding_unit_hrd_params_present_flag is equal to 1 and decoding_unit_cpb_params_in_pic_timing_sei_flag is equal to 0, one or more decoding unit information SEI messages applicable to the operation point shall be associated with each decoding unit in the CVS.

Otherwise, if CpbDpbDelaysPresentFlag is equal to 1, decoding_unit_hrd_params_present_flag is equal to 1 and decoding_unit_cpb_params_in_pic_timing_sei_flag is equal to 1, one or more decoding unit information SEI messages applicable to the operation point may or may not be associated with each decoding unit in the CVS.

Otherwise (CpbDpbDelaysPresentFlag is equal to 0 or decoding_unit_hrd_params_present_flag is equal to 0), in the CVS there shall be no decoding unit that is associated with a decoding unit information SEI message applicable to the operation point.

The set of NAL units associated with a decoding unit information SEI message consists, in decoding order, of the SEI NAL unit containing the decoding unit information SEI message and all subsequent NAL units in the access unit up to but not including any subsequent SEI NAL unit containing a decoding unit information SEI message with a different value of decoding_unit_idx. Each decoding unit shall include at least one VCL NAL unit. All non-VCL NAL units associated with a VCL NAL unit shall be included in the decoding unit containing the VCL NAL unit.

decoding_unit_idx specifies the index, starting from 0, to the list of decoding units in the current access unit, of the decoding unit associated with the decoding unit information SEI message. The value of decoding_unit_idx shall be in the range of 0 to PicSizeInCtbsY−1, inclusive.

A decoding unit identified by a particular value of duIdx includes and only includes all NAL units associated with all decoding unit information SEI messages that have decoding_unit_idx equal to duIdx. Such a decoding unit is also referred to as associated with the decoding unit information SEI messages having decoding_unit_idx equal to duIdx.

For any two decoding units duA and duB in one access unit with decoding_unit_idx equal to duIdxA and duIdxB, respectively, where duIdxA is less than duIdxB, duA shall precede duB in decoding order.

A NAL unit of one decoding unit shall not be present, in decoding order, between any two NAL units of another decoding unit.

du_spt_cpb_removal_delay_increment specifies the duration, in units of clock sub-ticks, between the nominal CPB times of the last decoding unit in decoding order in the current access unit and the decoding unit associated with the decoding unit information SEI message. This value is also used to calculate an earliest possible time of arrival of decoding unit data into the CPB for the HSS, as specified. The length of this syntax element is du_cpb_removal_delay_increment_length_minus1+1. When the decoding unit associated with the decoding unit information SEI message is the last decoding unit in the current access unit, the value of du_spt_cpb_removal_delay_increment shall be equal to 0.

dpb_output_du_delay_present_flag equal to 1 specifies the presence of the pic_spt_dpb_output_du_delay syntax element in the decoding unit information SEI message. dpb_output_du_delay_present_flag equal to 0 specifies the absence of the pic_spt_dpb_output_du_delay syntax element in the decoding unit information SEI message.

pic_spt_dpb_output_du_delay is used to compute the DPB output time of the picture when DecodingUnitHrdFlag is equal to 1. It specifies how many sub clock ticks to wait after removal of the last decoding unit in an access unit from the CPB before the decoded picture is output from the DPB. When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.

It is a requirement of bitstream conformance that all decoding unit information SEI messages that are associated with the same access unit, apply to the same operation point, and have dpb_output_du_delay_present_flag equal to 1 shall have the same value of pic_spt_dpb_output_du_delay.

The output time derived from the pic_spt_dpb_output_du_delay of any picture that is output from an output timing conforming decoder shall precede the output time derived from the pic_spt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_spt_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

As described above, in JVET-2001, a slice may contain either an integer number tiles or an integer number of bricks. Table 7 illustrates the relevant portion of the syntax structure of the picture parameter set and Table 8 illustrates the relevant portion of the syntax structure of the slice header provided in JVET-O2001 including syntax indicating how a picture and slices thereof are partitioned into one or more bricks.

TABLE 7

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     if( uniform_tile_spacing_flag && brick_splitting_present_flag ) | |
|       num_tiles_in_pic_minus1 | ue(v) |
|     for( i = 0; brick_splitting_present_flag && i <= num_tiles_in_pic_minus1 + 1; i++ ) { | |
|       if( RowHeight[ i ] > 1 ) | |
|         brick_split_flag[ i ] | u(1) |
|       if( brick_split_flag[ i ] ) { | |
|         if( RowHeight[ i ] > 2 ) | |
|           uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus2[ i ] | ue(v) |
|           for( j = 0; j <= num_brick_rows_minus2[ i ]; j++ ) | |
|             brick_row_height_minus1[ i ][ j ] | ue(v) |
|         } | |
|       } | |
|     } | |

TABLE 7-continued

| | Descriptor |
|---|---|
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
|   loop_filter_across_bricks_enabled_flag | u(1) |
|   if( loop_filter_across_bricks_enabled_flag ) | |
|     loop_filter_across_slices_enabled_flag | u(1) |
|   } | |
|  if( rect_slice_flag ) { | |
|   signalled_slice_id_flag | u(1) |
|   if( signalled_slice_id_flag ) { | |
|     signalled_slice_id_length_minus1 | ue(v) |
|     for( i = 0; i <= num_slices_in_pic_minus1; i++ ) | |
|       slice_id[ i ] | u(v) |
|   } | |
|  } | |
| ... | |

TABLE 8

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
| ... | |
|   if( nal_unit_type = = IDR_W_RADL \|\| nal_unit_type = = IDR_N_LP \|\| | |
|     nal_unit_type = = CRA_NUT \|\| NalUnitType = = GDR_NUT ) | |
|     no_output_of_prior_pics_flag | u(1) |
|   if( output_flag_present_flag ) | |
|     pic_output_flag | u(1) |
| } | |

JVET-O2001 provides the following definitions for the respective syntax elements illustrated in Table 7.

A PPS RBSP shall be available to the decoding process prior to it being referred, included in at least one access unit with TemporalId less than or equal to the TemporalId of the PPS NAL unit or provided through external means, and the PPS NAL unit containing the PPS RBSP shall have nuh_layer_id equal to the nuh_layer_id of the coded slice NAL unit that refers it. All PPS NAL units with a particular value of pps_pic_parameter_set_id within an access unit shall have the same content.

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CVS.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

The variables PicWidthInCtbsY, PicHeightInCtbhY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

PicWidthInCtbsY=Ceil(pic_width_in_luma_samples+CtbSizeY)

PicHeightInCtbsY=Ceil(pic_height_in_luma_samples+CtbSizeY)

PicSizeInCtbsY=PicWidthInCtbsY*PicHeightInCtbsY

PicWidthInMinCbsY=pic_width_in_luma_samples/MinCbSizeY

PicHeightInMinCbsY=pic_height_in_luma_samples/MinCbSizeY

PicSizeInMinCbsY=PicWidthInMinCbsY*PicHeightInMinCbsY

PicSizeInSamplesY=pic_width_in_luma_samples*pic_height_in_luma samples

PicWidthInSamplesC=pic_width_in_luma samples/SubWidthC

PicHeightInSamplesC=pic_height_in_luma samples/SubHeightC conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

PicOutputWidthL=pic_width_in_luma samples−SubWidthC*(conf_win_right_offset+conf_win_left_offset)

PicOutputHeightL=pic_height_in_pic_size_units−SubHeightC*(conf_win_bottom_offset+conf_win_top_offset)

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of conf_win_left_offset, conf_win_right_offset, conf_win_top_offset, and conf_win_bottom_offset, respectively.

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

single_tile_in_pic_flag equal to 1 specifies that there is only one tile in each picture referring to the PPS. single_tile_in_pic_flag equal to 0 specifies that there is more than one tile in each picture referring to the PPS.

NOTE—In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are referred to by coded pictures within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified below.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY−1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in clause 6.5.1.

The variable NumTilesInPic is set equal to (num_tile_columns_minus1+1)*(num_tile_rows_minus1+1).

When single_tile_in_pic_flag is equal to 0, NumTilesInPic shall be greater than 1.

tile_columns_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

num_tiles_in_pic_minus1 plus 1 specifies the number of tiles in each picture referring to the PPS. The value of num_tiles_in_pic_minus1 shall be equal to NumTilesInPic−1. When not present, the value of num_tiles_in_pic_minus1 is inferred to be equal to NumTilesInPic−1.

brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus2[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus2[i] plus 2 specifies the number of bricks partitioning the i-th tile when uniform_brick_spacing_flag[i] is equal to 0. When present, the value of num_brick_rows_minus2[i] shall be in the range of 0 to RowHeight[i]−2, inclusive. If brick_split_flag[i] is equal to 0, the value of num_brick_rows_minus2[i] is inferred to be equal to −1. Otherwise, when uniform_brick_spacing_flag[i] is equal to 1, the value of num_brick_rows_minus2[i] is inferred as specified below.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic−1, inclusive, when uniform_brick_spacing_flag[i] is equal to 1, the value of num_brick_rows_minus2[i] is inferred, by invoking the CTB raster and brick scanning conversion process as specified below:

the list RowHeight[j] for j ranging from 0 to num_tile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When brick_splitting_present_flag is equal to 1, the value of rect_slice_flag shall be equal to 1. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksIanPic−1, inclusive. When not present and single_brick_per_slice_flag is equal to 1, the value of num_slices_in_pic_minus1 is inferred to be equal to NumBricksInPic−1.

bottom_right_brick_idx_length_minus1 plus 1 specifies the number of bits used to represent the syntax element bottom_right_brick_idx_delta[i]. The value of bottom_right_brick_idx_length_minus1 shall be in the range of 0 to Ceil(Log 2(NumBricksInPic))−1, inclusive.

bottom_right_brick_idx_delta[i] when i is greater than 0 specifies the difference between the brick index of the brick located at the bottom-right corner of the i-th slice and the brick index of the bottom-right corner of the (i−1)-th slice. bottom_right_brick_idx_delta[0] specifies the brick index of the bottom right corner of the 0-th slice. When single_brick_per_slice_flag is equal to 1, the value of bottom_right_brick_idx_delta[i] is inferred to be equal to 1. The value of the BottomRightBrickIdx[num_slices_in_pic_minus1] is inferred to be equal to NumBricksInPic−1. The length of the bottom_right_brick_idx_delta[i] syntax element is bottom_right_brick_idx_length_minus1+1 bits.

brick_idx_delta_sign_flag[i] equal to 1 indicates a positive sign for bottom_right_brick_idx_delta[i]. sign_bottom_right_brick_idx_delta[i] equal to 0 indicates a negative sign for bottom_right_brick_idx_delta[i].

It is a requirement of bitstream conformance that a slice shall include either a number of complete tiles or only a consecutive sequence of complete bricks of one tile.

The variable TopLeftBrickIdx[i], BottomRightBrickIdx[i], NumBricksInSlice[i] and BricksToSliceMap[j], which specify the brick index of the brick located at the top left corner of the i-th slice, the brick index of the brick located at the bottom right corner of the i-th slice, the number of bricks in the i-th slice and the mapping of bricks to slices, are derived as follows:

```
for( j = 0; i = = 0 && j < NumBricksInPic; j++ )
    BricksToSliceMap[ j ] = −1
NumBricksInSlice[ i ] = 0
BottomRightBrickIdx[ i ] = bottom_right_brick_idx_delta[ i ] ] +( (
i = = 0 ) ? 0 :
        ( brick_idx_delta_sign_flag[ i ] ? BottomRightBrickIdx[
        i − 1 ] :
−BottomRightBrickIdx[ i−1 ] )
for( j = BottomRightBrickIdx[ i ]; j >= 0; j− − ) {
    if( BrickColBd[ j ] <= BrickColBd[ BottomRightBrickIdx[ i ] ] &&
        BrickRowBd[ j ] <= BrickRowBd[ BottomRightBrickIdx[
        i ] ] &&
    TopLeftBrickIdx[ i ] = j
    NumBricksInSlice[ i ]++
    BricksToSliceMap[ j ] = i
    }
}
``` loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

signalled_slice_id_flag equal to 1 specifies that the slice ID for each slice is signalled. signalled_slice_id_flag equal to 0 specifies that slice IDs are not signalled. When rect_slice_flag is equal to 0, the value of signalled_slice_id_flag is inferred to be equal to 0.

NOTE—For a bitstream that is a result of a sub-bitstream extraction, when each picture in the bitsream contains a true subset of the slices included in the picture of the "original" bitstream, and the subset of the included slices does not included the top-left corner slice of the pictures in the "original" bitstream, the value of signalled_slice_id_flag in the PPSs in the extracted bitstreams has to be equal to 1.

signall_slice_id_length_minus1 plus 1 specifies the number of bits used to represent the syntax element slice_id[i] when present, and the syntax element slice_address in slice headers. The value of signalled_slice_id_length_minus1 shall be in the range of 0 to 15, inclusive. When not present, the value of signalled_slice_id_length_minus1 is inferred to be equal to Ceil(Log 2(Max(2, num_slices_in_pic_minus1+1)))−1.

slice_id[i] specifies the slice ID of the i-th slice. The length of the slice_id[i] syntax element is signalled_slice_id_length_minus1+1 bits. When not present, the value of slice_id[i] is inferred to be equal to i, for each i in the range of 0 to num_slices_in_pic_minus1, inclusive.

JVET-O2001 provides the following definitions for the respective syntax elements illustrated in Table 8.

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id.

slice_address specifies the slice address of the slice. When not present, the value of slice_address is inferred to be equal to 0.

If rect_slice_flag is equal to 0, the following applies:
The slice address is the brick ID as specified below.
The length of slice_address is Ceil(Log 2 (NumBricksInPic)) bits.
The value of slice_address shall be in the range of 0 to NumBricksInPic−1, inclusive.
Otherwise (rect_slice_flag is equal to 1), the following applies:
The slice address is the slice ID of the slice.
The length of slice_address is signalled_slice_id_length_minus1+1 bits.
If signalled_slice_id_flag is equal to 0, the value of slice_address shall be in the range of 0 to num_slices_in_pic_minus1, inclusive. Otherwise, the value of slice_address shall be in the range of 0 to $2^{(signalled\_slice\_id\_length\_minus1+1)}-1$, inclusive.

It is a requirement of bitstream conformance that the following constraints apply:
The value of slice_address shall not be equal to the value of slice_address of any other coded slice NAL unit of the same coded picture.
When rect_slice_flag is equal to 0, the slices of a picture shall be in increasing order of their slice_address values.
The shapes of the slices of a picture shall be such that each brick, when decoded, shall have its entire left boundary and entire top boundary consisting of a picture boundary or consisting of boundaries of previously decoded brick(s).

num_bricks_in_slice_minus1, when present, specifies the number of bricks in the slice minus 1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
    if( rect_slice_flag ) {
        sliceIdx = 0
        while( slice_address != slice_id[ sliceIdx ] )
            sliceIdx++
        NumBricksInCurrSlice = NumBricksInSlice[ sliceIdx ]
        brickIdx = TopLeftBrickIdx[ sliceIdx ]
        for( bIdx = 0; brickIdx <= BottomRightBrickIdx[ sliceIdx ];
            brickIdx++ )
            if( BricksToSliceMap[ brickIdx ] = = sliceIdx )
                SliceBrickIdx[ bIdx++ ] = brickIdx
    } else {
        NumBricksInCurrSlice = num_bricks_in_slice_minus1 + 1
        SliceBrickIdx[ 0 ] = slice_address
        for( i = 1; i < NumBricksInCurrSlice; i++ )
            SliceBrickIdx[ i ] = SliceBrickIdx[ i – 1 ] + 1
    }
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
    SubPicLeftBoundaryPos =
        SubPicLeft[ SubPicIdx ] * ( subpic_grid_col_width_minus1 + 1 ) * 4
    SubPicRightBoundaryPos = ( SubPicLeft[ SubPicIdx ] + SubPicWidth[ SubPicIdx ] ) *
        ( subpic_grid_col_width_minus1 + 1 ) * 4
    SubPicTopBoundaryPos =
        SubPicTop[ SubPicIdx ] * ( subpic_grid_row_height_minus1 + 1 )* 4
    SubPicBotBoundaryPos = ( SubPicTop[ SubPicIdx ] + SubPicHeight[ SubPicIdx ] ) *
        ( subpic_grid_row_height_minus1 + 1 ) * 4
}
``` no_output_of_prior_pics_flag affects the output of previously-decoded pictures in the decoded picture buffer after the decoding of a CLVSS picture that is not the first picture in the bitstream.

pic_output_flag affects the decoded picture output and removal processes. When pic_output_flag is not present, it is inferred to be equal to 1.

JVET-O2001 provides the following with respect to CTB raster scanning, tile scanning, brick scanning, and subpicture scanning processes:

The list colWidth[i] for i ranging from 0 to num_tile_columns_minus1, inclusive, specifying the width of the i-th tile column in units of CTBs, is derived, and when uniform_tile_spacing_flag is equal to 1, the value of num_tile_columns_minus1 is inferred, as follows:

```
if( uniform_tile_spacing_flag ) {
    remainingWidthInCtbsY = PicWidthInCtbsY
    i = 0
    while( remainingWidthInCtbsY > ( tile_cols_width_minus1 + 1 ) ) {
        colWidth[ i++ ] = tile_cols_width_minus1 + 1
        remainingWidthInCtbsY –= ( tile_cols_width_minus1 + 1 )
    }
    colWidth[ i ] = remainingWidthInCtbsY
    num_tile_columns_minus1 = i
} else {
    colWidth[ num_tile_columns_minus1 ] = PicWidthInCtbsY
    for( i = 0; i < num_tile_columns_minus1; i++ ) {
        colWidth[ i ] = tile_column_width_minus1[ i ] + 1
        colWidth[ num_tile_columns_minus1 ] –= colWidth[ i ]
    }
}
```

The list RowHeight[j] for j ranging from 0 to num_tile_rows_minus1, inclusive, specifying the height of the j-th tile row in units of CTBs, is derived, and when uniform_tile_spacing_flag is equal to 1, the value of num_tile_rows_minus1 is inferred, as follows:

```
if( uniform_tile_spacing_flag ) {
    remainingHeightInCtbsY = PicHeightInCtbsY
    i = 0
    while( remainingHeightInCtbsY > ( tile_rows_height_minus1 +
        1 ) ) {
        RowHeight[ i++ ] = tile_rows_height_minus1 + 1
        remainingHeightInCtbsY –= ( tile_rows_height_minus1 + 1 )
    }
    RowHeight[ i ] = remainingHeightInCtbsY
    num_tile_rows_minus1 = i
} else {
    RowHeight[ num_tile_rows_minus1 ] = PicHeightInCtbsY
    for( j = 0; j < num_tile_rows_minus1; j++ ) {
```

-continued

```
        RowHeight[ j ] = tile_row_height_minus1[ j ] + 1
        RowHeight[ num_tile_rows_minus1 ] –= RowHeight[ j ]
    }
}
```

The list tileColBd[i] for i ranging from 0 to num_tile_columns_minus1+1, inclusive, specifying the location of the i-th tile column boundary in units of CTBs, is derived as follows:

for(tileColBd[0]=0, i=0; i<=num_tile_columns_minus1; i++) tileColBd[i+1]=tileColBd[i]+colWidth[i]

The list tileRowBd[j] for j ranging from 0 to num_tile_rows_minus1+1, inclusive, specifying the location of the j-th tile row boundary in units of CTBs, is derived as follows:

for(tileRowBd[0]=0, j=0; j<=num_tile_rows_minus1; j++) tileRowBd[j+1]=tileRowBd[j]+RowHeight[j]

The variable NumBricksInPic, specifying the number of bricks in a picture referring to the PPS, and the lists BrickColBd[brickIdx], BrickRowBd[brickIdx], BrickWidth[brickIdx], and BrickHeight[brickIdx] for brickIdx ranging from 0 to NumBrickInPic−1, inclusive, specifying the locations of the vertical brick boundaries in units of CTBs, the locations of the horizontal brick boundaries in units of CTBs, the widths of the bricks in units of CTBs, and the heights of bricks in units of CTBs, are derived, and for each i ranging from 0 to NumTilesInPic−1, inclusive, when uniform_brick_spacing_flag[i] is equal to 1, the value of num_brick_rows_minus2[i] is inferred, as follows:

```
for ( brickIdx = 0, i = 0; i < NumTilesInPic; i++ ) {
    tileX = i % ( num_tile_columns_minus1 + 1 )
```

```
  tileY = i / ( num_tile_columns_minus1 + 1 )
  if( !brick_split_flag[ i ] ) {
    BrickColBd[ brickIdx ] = tileColBd[ tileX ]
    BrickRowBd[ brickIdx ] = tileRowBd[ tileY ]
    BrickWidth[ brickIdx ] = colWidth[ tileX ]
    BrickHeight[ brickIdx ] = RowHeight[ tileY ]
    brickIdx++
  } else {
    if( uniform_brick_spacing_flag[ i ] ) {
      remainingHeightInCtbsY = RowHeight[ tileY ]
      j = 0
      while( remainingHeightInCtbsY > ( brick_height_minus1[ i ] + 1 ) ) {
        rowHeight2[ j++ ] = brick_height_minus1[ i ] + 1
        remainingHeightInCtbsY -= ( brick_height_minus1[ i ] + 1 )
      }
      rowHeight2[ j ] = remainingHeightInCtbsY
      num_brick_rows_minus2[ i ] = j - 1
    } else {
      rowHeight2[ num_brick_rows_minus2[ i ] + 1 ] = RowHeight[ tileY ]
      for( j = 0; j <= num_brick_rows_minus2[ i ]; j++ ) {
        rowHeight2[ j ] = brick_row_height_minus1[ i ][ j ]+ 1
        rowHeight2[ num_brick_rows_minus2[ i ] + 1 ] -= rowHeight2[ j ]
      }
    }
      for( rowBd2[ 0 ] = 0, j = 0; j <= num_brick_rows_minus2[ i ] + 1;
j++ )
        rowBd2[ j + 1 ] = rowBd2[ j ] + rowHeight2[ j ]
      for( j = 0; j <= num_brick_rows_minus2[ i ] + 1; j++ ) {
        BrickColBd[ brickIdx ] = tileColBd[ tileX ]
        BrickRowBd[ brickIdx ] = tileRowBd[ tileY ] + rowBd2[ j ]
        BrickWidth[ brickIdx ] = colWidth[ tileX ]
        BrickHeight[ brickIdx ] = rowHeight2[ j ]
        brickIdx++
      }
   }
 }
NumBricksInPic = brickIdx
```

The list CtbAddrRsTobBs[ctbAddrRs] for ctbAddrRs ranging from 0 to PicSizeInCtbsY−1, inclusive, specifying the conversion from a CTB address in CTB raster scan of a picture to a CTB address in brick scan, is derived as follows:

```
for( ctbAddrRs = 0; ctbAddrRs < PicSizeInCtbsY; ctbAddrRs++ ) {
  tbX = ctbAddrRs % PicWidthInCtbsY
  tbY = ctbAddrRs / PicWidthInCtbsY
  brickFound = FALSE
  for( bkIdx = NumBricksInPic - 1, i = 0; i < NumBricksInPic - 1 && !brickFound; i++ ) {
    brickFound = tbX < ( BrickColBd[ i ] + BrickWidth[ i ] ) &&
          tbY < ( BrickRowBd[ i ] + BrickHeight[ i ] )
    if( brickFound )
      bkIdx = i
  }
  CtbAddrRsToBs[ ctbAddrRs ] = 0
  for( i = 0; i < bkIdx; i++ )
    CtbAddrRsToBs[ ctbAddrRs ] += BrickHeight[ i ] * BrickWidth[ i ]
  CtbAddrRsToBs[ ctbAddrRs ] +=
      ( tbY - BrickRowBd[ bkIdx ] ) * BrickWidth[ bkIdx ] + tbX - BrickColBd[ bkIdx ]
}
```

The list CtbAddrBdToRs[ctbAddrBs] for ctbAddrBs ranging from 0 to PicSizeInCtbsY−1, inclusive, specifying the conversion from a CTB address in brick scan to a CTB address in CTB raster scan of a picture, is derived as follows:

for(ctbAddrRs=0; ctbAddrRs<PicSizeInCtbsY; ctbAddrRs++) CtbAddrBsToRs[CtbAddrRsToBs[ctbAddrRs]]=ctbAddrRs The list BrickId[ctbAddrBs] for ctbAddrBs ranging from 0 to PicSizeInCtbsY−1, inclusive, specifying the conversion from a CTB address in brick scan to a brick ID, is derived as follows:

```
for( i = 0, i < NumBricksInPic; i++ )
  for( y = BrickRowBd[ i ]; y < BrickRowBd[ i ] + BrickHeight[
      i ]; y++ )
    for( x = BrickColBd[ i ]; x < BrickColBd[ i ] + BrickWidth[ i ];
        x++ )
      BrickId[ CtbAddrRsToBs[ y * PicWidthInCtbsY+ x ] ] = i
```

The list NumCtusInBrick[brickIdx] for brickIdx ranging from 0 to NumBricksInPic−1, inclusive, specifying the conversion from a brick index to the number of CTUs in the brick, is derived as follows:

```
for( i = 0; i < NumBricksInPic; i++ )
   NumCtusInBrick[ i ] = BrickWidth[ i ] * BrickHeight[ i ]
```

The list FirstCtbAddrBs[brickIdx] for brickIdx ranging from 0 to NumBricksInPic−1, inclusive, specifying the conversion from a brick ID to the CTB address in brick scan of the first CTB in the brick are derived as follows:

```
for( ctbAddrBs = 0, brickIdx = 0, brickStartFlag = 1; ctbAddrBs < PicSizeInCtbsY; ctbAddrBs++ )
{
  if( brickStartFlag ) {
     FirstCtbAddrBs[ brickIdx ] = ctbAddrBs
     brickStartFlag = 0
  }
  brickEndFlag = ( ctbAddrBs = = PicSizeInCtbsY − 1 ) | |
       ( BrickId[ ctbAddrBs + 1 ] != BrickId[ ctbAddrBs ] )
  if( brickEndFlag ) {
     brickIdx++
     brickStartFlag = 1
  }
}
```

The list CtbToSubPicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
  posX = ctbAddrRs % PicWidthInCtbsY * CtbSizeY
  posY = ctbAddrRs / PicWidthInCtbsY * CtbSizeY
  CtbToSubPicIdx[ ctbAddrRs ] = −1
  for( i = 0; CtbToSubPicIdx[ ctbAddrRs ] < 0 && i < NumSubPics; i++ ) {
     if( ( posX >= SubPicLeft[ i ] * ( subpic_grid_col_width_minus1 + 1 ) * 4 ) &&
         ( posX < ( SubPicLeft[ i ] + SubPicWidth[ i ] ) *
            ( subpic_grid_col_width_minus1 + 1 ) * 4 ) &&
         ( posY >= SubPicTop[ i ] *
            ( subpic_grid_row_height_minus1 + 1 ) * 4 ) &&
         ( posY < ( SubPicTop[ i ] + SubPicHeight[ i ] ) *
            ( subpic_grid_row_height_minus1 + 1 ) * 4 ) )
        CtbToSubPicIdx[ ctbAddrRs ] = i
  }
}
```

It should be noted that in JVET-O2001 does not provide a mechanism for indicating whether a subpicture is a decoding unit. Further, the signaling in picture timing message related to decoding unit CPB removal delay information and the signaling in the decoding unit information message provided in JVET-O2001 may be less than ideal. This disclosure describes techniques for efficiently indicating whether a subpicture is a decoding unit. Further, this disclosure describes techniques for efficiently signaling picture timing message and decoding unit information message provided.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
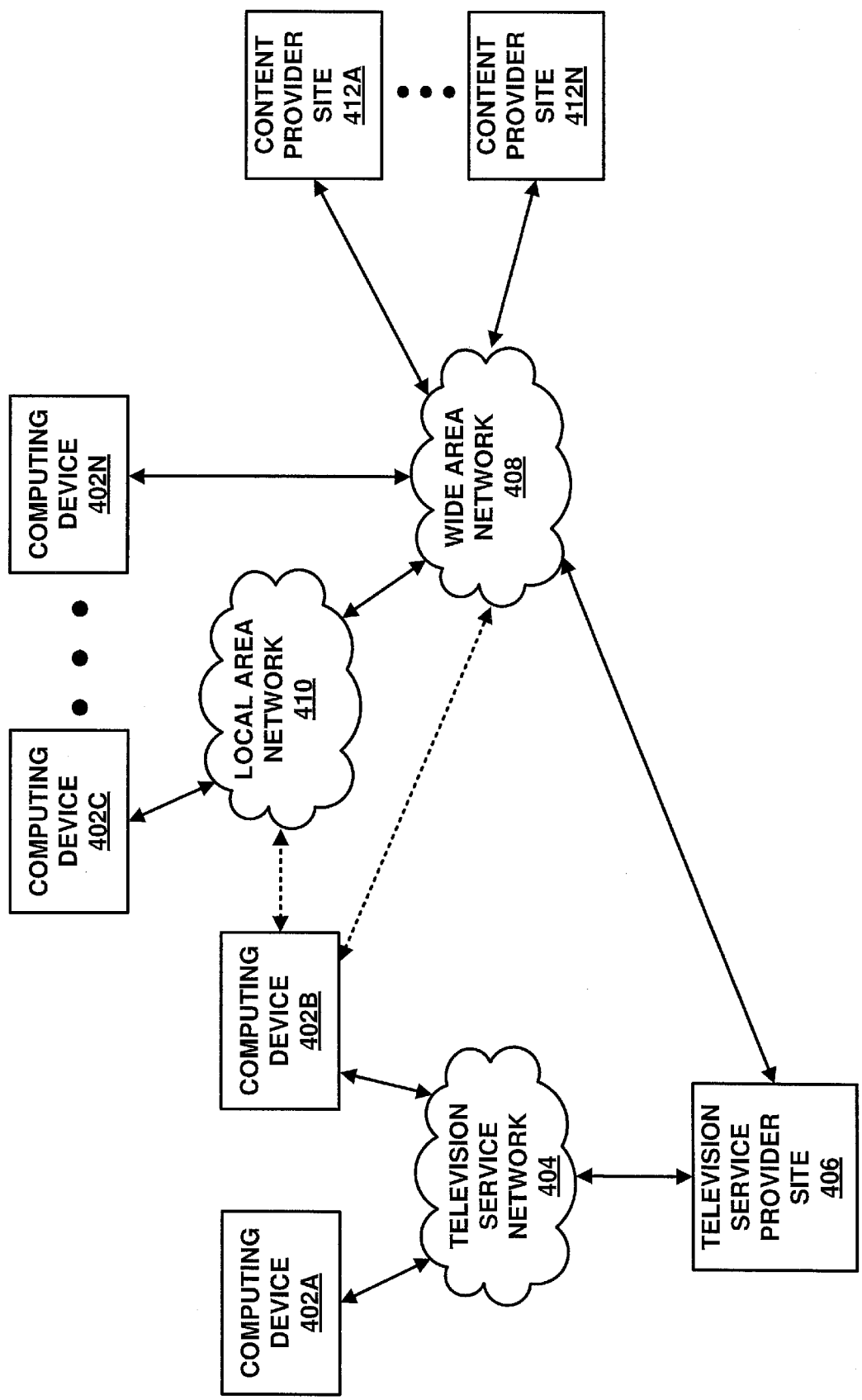
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like.

Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
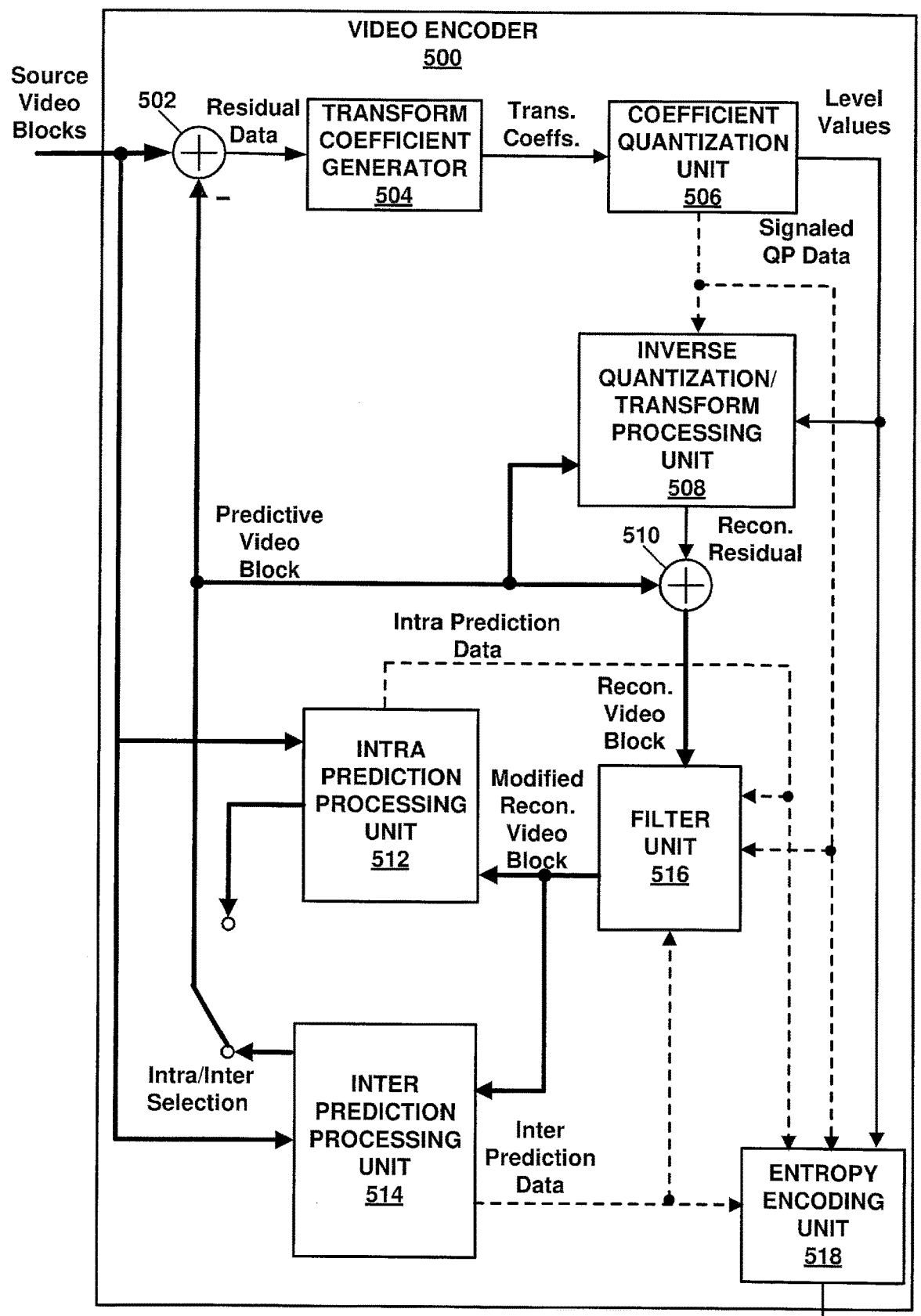
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional subdivisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, JVET-O2001 does not provide a mechanism for indicating whether a subpicture is a decoding unit and the signaling in picture timing message the decoding unit information message may be less than ideal. In one example, according to the techniques herein, a flag may be signaled indicating the each subpicture is a decoding unit. In one example, the flag may be included in an SPS. Table 9 illustrates an example of the relevant syntax in the syntax structure seq_parameter_set_rbsp( ) for signaling a flag indicating that each subpicture is a decoding unit.

TABLE 9

|  | Descriptor |
| --- | --- |
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   gdr_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { |  |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) |  |
|       for( j = 0; j < NumSubPicGridCols; j++ ) |  |
|         subpic_grid_idx[ i ][ j ] | u(v) |
|     for( i = 0; i <= NumSubPics; i++ ) { |  |
|       subpic_treated_as_pic_flag[ i ] | u(1) |
|       loop_filter_across_subpic_enabled_flag[ i ] | u(1) |
|     } |  |
|     subpic_is_du_flag | u(1) |
|   } |  |
| ... |  |

With respect to Table 9, the semantics may be based on the semantics provided above with respect to Table 3. For syntax element subpic_is_du_flag in one example, the semantics may be based on the following:

subpic_is_du_flag equal to 1 specifies that each subpicture is a decoding unit. subpic_is_du_flag equal to 0 specifies that a subpicture may or may not be a decoding unit. When not present subpic_is_du_flag is inferred to be equal to 0.

In another example, syntax element subpic_is_du flag may be signalled in a PPS, VPS, DPS, or at another location in SPS, or some other parameter set or in a SEI message (e.g. in picture timing SEI), or delivered via an external means.

In another example, other names may be used for the subpic_is_du_flag syntax element. For example, it may be called each_subpic_is_du_flag or each_du_is_subpic_flag or du_is_subpic_flag or the like.

In another example subpic_is_du_flag may be signalled separately for each sub picture. For example, as provided in Table 10:

TABLE 10

| for( i = 0; i <= NumSubPics; i++ ) { |  |
| --- | --- |
|   subpic_treated_as_pic_flag[ i ] | u(1) |
|   loop_filter_across_subpic_enabled_flag[ i ] | u(1) |
|   subpic_is_du_flag[ i ] | u(1) |
| } |  |

In this case, in one example, the semantics of syntax element subpic_is_du_flag[i] may be based on the following:

subpic_is_du_flag[i] equal to 1 specifies that i-th subpicture is a decoding unit. subpic_is_du_flag[i] equal to 0 specifies that i-th subpicture may or may not be a decoding unit. When not present subpic_is_du_flag[i] is inferred to be equal to 0.

In another example, subpic_is_du_flag[i] may be conditionally signalled only when subpic_treated_as_pic_flag[i] is equal to 1 (or equal to 0).

In one example, when syntax element subpic_is_du flag is signaled, according to the techniques herein, the corresponding syntax structure of a picture timing message may be as provided in Table 11. It should be noted that in Table 11, information related to the number of decoding units in the picture (num_decoding_units_minus1) and related to the number of NAL units in each decoding unit (num_nalus_in_du_minus1[i]) is not signaled when each subpicture is a decoding unit (and the subpic_is_du_flag flag is equal to 1). This saves bits compared to the signaling provided in JVET-O2001.

In one example, SubPicIdx of the i-th sub-picture is equal to i.

In one example, When subpic_is_du_flag is equal to 1, num_nalus_in_du_minus1[i] is inferred to be equal to number of VCL NAL units in the i-th sub-picture. When subpic_is_du flag is equal to 0, the value of num_nalus_in_du_minus1[i] shall be in the range of 0 to PicSizeInCtbsY−1, inclusive.

In another example, The value of num_nalus_in_du_minus1[i] shall be in the range of 0 to PicSizeInCtbsY−1, inclusive.

In another example, The value of num_nalus_in_du_minus1[i] shall be in the range of 0 to PicSizeInCtbsY−num_decoding_units_minus1−1, inclusive.

TABLE 11

| | Descriptor |
|---|---|
| pic_timing( payloadSize ) { | |
|   pt_max_sub_layers_minus1 | u(3) |
|   cpb_removal_delay_minus1[ pt_max_sub_layers_minus1 ] | u(v) |
|   for( i = TemporalId; i < pt_max_sub_layers_minus1; i++ ) { | |
|     sub_layer_delays_present_flag[ i ] | u(1) |
|     if( sub_layer_delays_present_flag[ i ] ) { | |
|       cpb_removal_delay_delta_enabled_flag[ i ] | u(1) |
|       if( cpb_removal_delay_delta_enabled_flag[ i ] ) | |
|         cpb_removal_delay_delta_idx[ i ] | u(v) |
|       else | |
|         cpb_removal_delay_minus1[ i ] | u(v) |
|     } | |
|   } | |
|   dpb_output_delay | u(v) |
|   if( decoding_unit_hrd_params_present_flag ) | |
|     pic_dpb_output_du_delay | u(v) |
|   if( decoding_unit_hrd_params_present_flag && | |
|       decoding_unit_cpb_params_in_pic_timing_sei_flag ) { | |
|     if(!subpic_is_du_flag) | |
|     num_decoding_units_minus1 | ue(v) |
|     du_common_cpb_removal_delay_flag | u(1) |
|     if( du_common_cpb_removal_delay_flag ) | |
|       du_common_cpb_removal_delay_increment_minus1 | u(v) |
|     for( i = 0; i <= num_decoding_units_minus1; i++ ) { | |
|         if(!subpic_is_du_flag) | |
|       num_nalus_in_du_minus1[ i ] | ue(v) |
|       if( !du_common_cpb_removal_delay_flag && i < num_decoding_units_minus1 ) | |
|         du_cpb_removal_delay_increment_minus1[ i ] | u(v) |
|     } | |
|   } | |
| } | |

With respect to Table 11, the semantics may be based on the semantics provided above with respect to Table 5. In one example, according to the techniques herein, the semantics of syntax elements num_decoding_units_minus1 and num_nalus_in_du_minus1[i] may be based on the following:

num_decoding_units_minus1 plus 1 specifies the number of decoding units in the access unit the picture timing SEI message is associated with. When subpic_is_du flag is equal to 1 num_decoding_units_minus1 is inferred to be equal to NumSubPics−1. When subpic_is_du flag is equal to 0, the value of num_decoding_units_minus1 shall be in the range of 0 to PicSizeInCtbsY−1, inclusive. When subpic_is_du flag is equal to 1, the value of num_decoding_units_minus1 shall be in the range of 0 to max_subpics_minus1, inclusive.

num_nalus_in_du_minus1[i] plus 1 specifies the number of NAL units in the i-th decoding unit of the access unit the picture timing SEI message is associated with. When subpic_is_du_flag is equal to 1, num_nalus_in_du_minus1[i] is inferred to be equal to NumSlicesofSubPic[SubPicIdx] where SubPicIdx is the subpicture index of the i-th sub-picture.

It should be noted that in the semantics above, the number of decoding units in the picture (num_decoding_units_minus1) and number of NAL units in each decoding unit (num_nalus_in_du_minus1[i] are derived during the decoding process in the case where subpic_is_du_flag is equal to 1. Further, it should be noted that in one example of the semantics above, the constraint on num_nalus_in_du_minus1[i] is updated. It should be noted that according to the techniques herein, the constraint may be updated independent of whether subpic_is_du flag is signaled.

In one example, when syntax element subpic_is_du flag is signaled, according to the techniques herein, the corresponding semantics of syntax element decoding_unit_idx in a decoding unit information set message may be based on the following:

decoding_unit_idx specifies the index, starting from 0, to the list of decoding units in the current access unit, of the decoding unit associated with the decoding unit information SEI message. When subpic_is_du_flag is equal to 1, the decoding_unit_idx specifies the subpicture index for the subpicture that corresponds to the decoding unit.

When subpic_is_du_flag is equal to 0, the value of decoding_unit_idx shall be in the range of 0 to PicSizeInCtbY−1, inclusive. When subpic_is_du_flag is equal to 1, the value of decoding_unit_idx shall be in the range of 0 to max_subpics_minus1, inclusive (or shall be equal to one of the signalled value of sub-picture indices for the subpicture of the picture). A decoding unit identified by a particular value of duIdx includes and only includes all NAL units associated with all decoding unit information SEI messages that have decoding_unit_idx equal to duIdx. Such a decoding unit is also referred to as associated with the decoding unit information SEI messages having decoding_unit_idx equal to duIdx.

For any two decoding units duA and duB in one access unit with decoding_unit_idx equal to duIdxA and duIdxB, respectively, where duIdxA is less than duIdxB, duA shall precede duB in decoding order.

A NAL unit of one decoding unit shall not be present, in decoding order, between any two NAL units of another decoding unit.

It should be noted that in the decoding unit information message semantics above, the semantics result in using shorter decoding unit indices when subpictures are used, which saves bits.

In one example, when syntax element subpic_is_du flag is signaled, according to the techniques herein, the corresponding semantics of syntax element num_bricks_in_slices_minus1 in a slice header message may be based on the following:

num_bricks_in_slices_minus1, when present, specifies the number of bricks in the slice minus 1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
    sliceIdx = 0
    while( slice_address != slice_id[ sliceIdx ] )
        sliceIdx++
    NumBricksInCurrSlice = NumBricksInSlice[ sliceIdx ]
    brickIdx = TopLeftBrickIdx[ sliceIdx ]
    for( bIdx = 0; brickIdx <= BottomRightBrickIdx[ sliceIdx ]; brickIdx++ )
        if( BricksToSliceMap[ brickIdx ] = = sliceIdx )
            SliceBrickIdx[ bIdx++ ] = brickIdx
} else {
    NumBricksInCurrSlice = num_bricks_in_slice_minus1 + 1
    SliceBrickIdx[ 0 ] = slice_address
```

```
    for( i = 1; i < NumBricksInCurrSlice; i++ )
        SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
    SubPicLeftBoundaryPos =
    SubPicLeft[ SubPicIdx ] * ( subpic_grid_col_width_minus1 + 1 ) * 4
    SubPicRightBoundaryPos = ( SubPicLeft[ SubPicIdx ] + SubPicWidth[ SubPicIdx ] ) *
        ( subpic_grid_col_width_minus1 + 1 ) * 4
    SubPicTopBoundaryPos =
    SubPicTop[ SubPicIdx ] * ( subpic_grid_row_height_minus1 + 1 )* 4
    SubPicBotBoundaryPos = ( SubPicTop[ SubPicIdx ] + SubPicHeight[ SubPicIdx ] ) *
        ( subpic_grid_row_height_minus1 + 1 ) * 4
}
```

The variable NumSlicesofSubPic[[SubPicIdx] which specifies the number of slices which belong to a subpicture with subpicture index SubPicIdx is derived and updated as follows. NumSlicesofSubPic[SubPicIdx]=NumSlicesofSubPic[SubPicIdx]+1

In one example, according to the techniques herein, a subpicture scanning process may be as follows:

The list CtbToSubPicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * CtbSizeY
    CtbToSubPicIdx[ ctbAddrRs ] = −1
    for( i = 0; CtbToSubPicIdx[ ctbAddrRs ] < 0 && i < NumSubPics; i++ ) {
        if( ( posX >= SubPicLeft[ i ] * ( subpic_grid_col_width_minus1 + 1 ) * 4 ) &&
            ( posX < ( SubPicLeft[ i ] + SubPicWidth[ i ] ) *
              ( subpic_grid_col_width_minus1 + 1 ) * 4 ) &&
            ( posY >= SubPicTop[ i ] *
              ( subpic_grid_row_height_minus1 + 1 ) * 4 ) &&
            ( posY < ( SubPicTop[ i ] + SubPicHeight[ i ] ) *
              ( subpic_grid_row_height_minus1 + 1 ) * 4 ) )
            CtbToSubPicIdx[ ctbAddrRs ] = i
    }
}
```

The list NumSlicesofSubPic[SubPicIdx] for SubPicIdx ranging from 0 to NumSubPics−1, inclusive, specifying the number of slices which belong to a subpicture with subpicture index SubPicIdx is initialized as follows:

```
for( i = 0; i < NumSubPics; i++ )
    NumSlicesofSubPic[ [ SubPicIdx ] = 0
```

The above modifications compared to JVET-O2001 for the derivation of NumSlicesofSubPic[SubPicIdx] count how many slices (and thus VCL NAL units) are in each subpicture. It should be noted that there may be other ways of doing this calculation. Mainly, tracked is how many subpictures are in the picture and how many slices and thus VCL NAL units are in each subpicture. It should be noted that the term "subpicture" may instead be called "sub-picture" or "sub picture" or the like.

Referring to Table 7, in JVET-O2001, if the picture includes a single tile signaled via single_tile_in_pic_flag equal to 1, the syntax does not allow signaling brick splitting information and slice information for this single tile. This is because the syntax for brick splitting and rectangular slice layout is allowed to be signaled only if(!single_tile_in_pic_flag), i.e., only if single_tile_in_pic_flag is not equal to 1. Also, JVET-O2001, includes a constraint "when single_tile_in_pic_flag is equal to 0, NumTilesInPic shall be greater than 1." Thus, a case of single tile in picture cannot be signaled with alternative syntax of explicitly signaling number of tile rows and columns. According to the techniques herein, a picture parameter set syntax structure for allowing a single tile in the picture and allowing that tile to be further split in bricks is provided. Table 12A illustrates an example picture parameter set syntax structure according to the technique herein. With respect to Table 12A, the semantics may be based on the semantics provided above with respect to Table 7.

TABLE 12A

|  | Descriptor |
|---|---|
| pic_parameter_set_rbsp( ) { |  |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { |  |
|     conf_win_left_offset | ue(v) |
|     conf_win_right_offset | ue(v) |
|     conf_win_top_offset | ue(v) |
|     conf_win_bottom_offset | ue(v) |
|   } |  |
|   output_flag_present_flag | u(1) |
|   single_tile_in_pic_flag | u(1) |
|   if( !single_tile_in_ pic_flag ) { |  |
|     uniform_tile_spacing_flag | u(1) |
|     if( uniform_tile_spacing_flag ) { |  |
|       tile_cols_width_minus1 | ue(v) |
|       tile_rows_height_minus1 | ue(v) |
|     } else { |  |
|       num_tile_columns_minus1 | ue(v) |
|       num_tile_rows_minus1 | ue(v) |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|   } |  |
|   brick_splitting_present_flag | u(1) |
|   if( uniform_tile_spacing_flag && brick_splitting_present_flag ) |  |
|     num_tiles_in_pic_minus1 | ue(v) |
|   for( i = 0; brick_splitting_present_flag && i <= num_tiles_in_pic_minus1 + 1; i++ ) { |  |
|     if( RowHeight[ i ] > 1 ) |  |
|       brick_split_flag[ i ] | u(1) |
|     if( brick_split_flag[ i ] ) { |  |
|       if( RowHeight[ i ] > 2 ) |  |
|         uniform_brick_spacing_flag[ i ] | u(1) |
|       if( uniform_brick_spacing_flag[ i ] ) |  |
|         brick_height_minus1[ i ] | ue(v) |
|       else { |  |
|         num_brick_rows_minus2[ i ] | ue(v) |
|         for( j = 0; j <= num_brick_rows_minus2[ i ]; j++ ) |  |
|           brick_row_height_minus1[ i ][ j ] | ue(v) |
|       } |  |
|     } |  |
|   } |  |
|   single_brick_per_slice_flag | u(1) |
|   if( !single_brick_per_slice_flag ) |  |
|     rect_slice_flag | u(1) |
|   if( rect_slice_flag && !single_brick_per_slice_flag ) { |  |
|     num_slices_in_pic_minus1 | ue(v) |
|     bottom_right_brick_idx_length_minus1 | ue(v) |
|     for( i = 0; i < num_slices_in_pic_minus1; i++ ) { |  |
|       bottom_right_brick_idx_delta[ i ] | u(v) |
|       brick_idx_delta_sign_flag[ i ] | u(1) |
|     } |  |
|   } |  |
|   loop_filter_across_bricks_enabled_flag | u(1) |
|   if( loop_filter_across_bricks_enabled_flag ) |  |
|     loop_filter_across_slices_enabled_flag | u(1) |
|   if( rect_slice_flag ) { |  |

TABLE 12A-continued

| | Descriptor |
|---|---|
|   signalled_slice_id_flag | u(1) |
|   if( signalled_slice_id_flag ) { | |
|     signalled_slice_id_length_minus1 | ue(v) |
|     for( i = 0; i <= num_slices_in_pic_minus1; i++ ) | |
|       slice_id[ i ] | u(v) |
|     } | |
|   } | |
|   entropy_coding_sync_enabled_flag | u(1) |
|   if( !single_tile_in_pic_flag \|\| entropy_coding_sync_enabled_flag ) | |
|     entry_point_offsets_present_flag | u(1) |
|   cabac_init_present_flag | u(1) |
|   ... | |
| } | |

Additionally, in JVET-O2001, in the case single_tile_in_pic_flag is equal to 1 and brick_splitting_flag is equal to 0, it is required that there is only one brick and one slice. In one example according to the techniques herein, single_brick_per_slice_flag may be conditionally signaled in this case and its value may be inferred to 1 when not present. This conditional signaling saves bits (by not having to signal single_brick_per_slice_flag). Table 12B illustrates an example picture parameter set syntax structure according to the technique herein.

TABLE 12B

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|   } | |
|   brick_splitting_present_flag | u(1) |
|   if( uniform_tile_spacing_flag && brick_splitting_present_flag ) | |
|     num_tiles_in_pic_minus1 | ue(v) |
|   for( i = 0; brick_splitting_present_flag && i <= num_tiles_in_pic_minus1 + 1; i++ ) { | |
|     if( RowHeight[ i ] > 1 ) | |
|       brick_split_flag[ i ] | u(1) |
|     if( brick_split_flag[ i ] ) { | |
|       if( RowHeight[ i ] > 2 ) | |
|         uniform_brick_spacing_flag[ i ] | u(1) |
|       if( uniform_brick_spacing_flag[ i ] ) | |
|         brick_height_minus1[ i ] | ue(v) |
|       else { | |
|         num_brick_rows_minus2[ i ] | ue(v) |
|         for( j = 0; j <= num_brick_rows_minus2[ i ]; j++ ) | |
|           brick_row_height_minus1[ i ][ j ] | ue(v) |
|       } | |
|     } | |
|   } | |
|   if( !single_tile_in_pic_flag \|\| brick_splitting_present_flag ) | |
|     single_brick_per_slice_flag | u(1) |
|   if( !single_brick_per_slice_flag ) | |

TABLE 12B-continued

| | Descriptor |
|---|---|
|   rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
|   loop_filter_across_bricks_enabled_flag | u(1) |
|   if( loop_filter_across_bricks_enabled_flag ) | |
|     loop_filter_across_slices_enabled_flag | u(1) |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   entropy_coding_sync_enabled_flag | u(1) |
|   if( !single_tile_in_pic_flag \|\| entropy_coding_sync_enabled_flag ) | |
|     entry_point_offsets_present_flag | u(1) |
|   cabac_init_present_flag | u(1) |
|   ... | |
| } | |

It should be noted that part of the above syntax could be instead written as

| | |
|---|---|
| if( single_tile_in_pic_flag && | |
| brick_splitting_present_flag = = 0) | |
| { } | |
| else | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | | where empty bracket { } means no syntax element is signalled and in this case the value of single_brick_per_slice_flag is inferred to be equal to 1.

With respect to Table 12B, the semantics may be based on the semantics provided above with respect to Table 7 with the semantics of syntax element single_brick_per_slice_flag as follows:

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

Alternatively, a conformance constraint may be as follows:

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1. When single_tile_in_pic_flag is equal to 1 and brick_splitting_flag is equal to 0, single_brick_per_slice_flag shall be equal to 1.

Additionally, in this case, (or also otherwise) syntax element loop_filter_across_bricks_enabled_flag may be signaled only when NumBricksInPic is greater than 1. Table 12C illustrates an example picture parameter set syntax structure according to the technique herein.

TABLE 12C

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   output_flag_present_flag | u(1) |
|   single_tile_in_pic_flag | u(1) |

TABLE 12C-continued

| | Descriptor |
|---|---|
| if( !single_tile_in_pic_flag ) { | |
|   uniform_tile_spacing_flag | u(1) |
|   if( uniform_tile_spacing_flag ) { | |
|     tile_cols_width_minus1 | ue(v) |
|     tile_rows_height_minus1 | ue(v) |
|   } else { | |
|     num_tile_columns_minus1 | ue(v) |
|     num_tile_rows_minus1 | ue(v) |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
| } | |
|   brick_splitting_present_flag | u(1) |
|   if( uniform_tile_spacing_flag && brick_splitting_present_flag ) | |
|     num_tiles_in_pic_minus1 | ue(v) |
|   for( i = 0; brick_splitting_present_flag && i <= num_tiles_in_pic_minus1 + 1; i++ ){ | |
|     if( RowHeight[ i ] > 1 ) | |
|       brick_split_flag[ i ] | u(1) |
|     if( brick_split_flag[ i ] ) { | |
|       if( RowHeight[ i ] > 2 ) | |
|         uniform_brick_spacing_flag[ i ] | u(1) |
|       if( uniform_brick_spacing_flag[ i ] ) | |
|         brick_height_minus1[ i ] | ue(v) |
|       else { | |
|         num_brick_rows_minus2[ i ] | ue(v) |
|         for( j = 0; j <= num_brick_rows_minus2[ i ]; j++ ) | |
|           brick_row_height_minus1[ i ][ j ] | ue(v) |
|       } | |
|     } | |
|   } | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
|   if( NumBricksInPic > 1) | |
|       loop_filter_across_bricks_enabled_flag | u(1) |
|   if( loop_filter_across_bricks_enabled_flag ) | |
|     loop_filter_across_slices_enabled_flag | u(1) |
| if( rect_slice_flag ) { | |
|   signalled_slice_id_flag | u(1) |
|   if( signalled_slice_id_flag ) { | |
|     signalled_slice_id_length_minus1 | ue(v) |
|     for( i = 0; i <= num_slices_in_pic_minus1; i++ ) | |
|       slice_id[ i ] | u(v) |
|   } | |
| } | |
| entropy_coding_sync_enabled_flag | u(1) |
| if( !single_tile_in_pic_flag \|\| entropy_coding_sync_enabled_flag ) | |
|   entry_point_offsets_present_flag | u(1) |
| cabac_init_present_flag | u(1) |
| ... | |
| } | |

With respect to Table 12C, the semantics may be based on the semantics provided above with the semantics of syntax element single_brick_per_slice_flag as follows:

loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 0.

In a variant: When not present, the value of loop_filter_across_bricks_enabled_flag is inferred to be equal to 1.

Alternatively, (or also otherwise) in this case, syntax element loop_filter_across_bricks_enabled_flag may be signaled only if (!single_tile_in_pic_flag\|\|brick_splitting_present_flag) condition is satisfied. Table 12D illustrates an example picture parameter set syntax structure according to the technique herein.

TABLE 12D

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_lef_toffset | ue(v) |
|     conf_win_right_offset | ue(v) |
|     conf_win_top_offset | ue(v) |
|     conf_win_bottom_offset | ue(v) |
|   } | |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|   } | |
|     brick_splitting_present_flag | u(1) |
|     if( uniform_tile_spacing_flag && brick_splitting_present_flag ) | |
|       num_tiles_in_pic_minus1 | ue(v) |
|     for( i = 0; brick_splitting_present_flag && i <= num_tiles_in_pic_minus1 + 1; i++ ) { | |
|       if( RowHeight[ i ] > 1 ) | |
|         brick_split_flag[ i ] | u(1) |
|       if( brick_split_flag[ i ] ) { | |
|         if( RowHeight[ i ] > 2 ) | |
|           uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus2[ i ] | ue(v) |
|           for( j = 0; j <= num_brick_rows_minus2[ i ]; j++ ) | |
|             brick_row_height_minus1[ i ][ j ] | ue(v) |
|         } | |
|       } | |
|     } | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
|   if( !single_tile_in_pic_flag | | brick_splitting_present_flag) | |
|       loop_filter_across_bricks_enabled_flag | u(1) |
|   if( loop_filter_across_bricks_enabled_flag ) | |
|     loop_filter_across_slices_enabled_flag | u(1) |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   entropy_coding_sync_enabled_flag | u(1) |
|   if( !single_tile_in_pic_flag | | entropy_coding_sync_enabled_flag ) | |
|     entry_point_offsets_present_flag | u(1) |
|   cabac_init_present_flag | u(1) |
|   ... | |
| } | |

With respect to Table 12D, the semantics may be based on the semantics provided above. Further, in any of the example syntax above, the semantics of syntax element single_brick_per_slice_flag may be based on the following:

```
if( i = = num_slices_in_pic_minus1-1 ) {
    NumBricksInSlice[ num_slices_in_pic_minus1 ]= NumBricksInPic− TotalBricksCount
    for( j = 0, TopLeftBrickIdx[ num_slices_in_pic_minus1 ]= NumBricksInPic − 1; j <
    NumBricksInPic; j++ )
        if((BricksToSliceMap[ j ] = = -1) && (TopLeftBrickIdx[ num_slices_in_pic_minus1 ]
        > j))
            TopLeftBrickIdx[ num_slices_in_pic_minus1 ] = j
}
``` single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1. When single_tile_in_pic_flag is equal to 1 and brick_splitting_flag is equal to 0, loop_filter_across_bricks_enabled_flag shall be equal to 0.

OR

When NumBricksInPic is equal to 1, loop_filter_across_bricks_enabled_flag shall be equal to 0. Alternatively:

When single_tile_in_pic_flag is equal to 1 and brick_splitting_flag is equal to 0, loop_filter_across_bricks_enabled_flag shall be equal to 1.

OR

When NumBricksInPic is equal to 1, loop_filter_across_bricks_enabled_flag shall be equal to 1.

It should be noted that in the derivation of number of bricks in the last (i.e., (num_slices_in_pic_minus1+1)-th) slice in the picture is missing in JVET-O2001. In one example, according to the techniques herein, the derivation of variables TopLeftBrickIdx[i], BottomRightBrickIdx[i], NumBricksInSlice[i] and BricksToSliceMap[j] may be as follows:

The variable TopLeftBrickIdx[i], BottomRightBrickIdx[i], NumBricksInSlice[i] and BricksToSliceMap[j], which specify the brick index of the brick located at the top left corner of the i-th slice, the brick index of the brick located at the bottom right corner of the i-th slice, the number of bricks in the i-th slice and the mapping of bricks to slices, are derived as follows:

```
for( j = 0, TotalBricksCount=0; i = = 0 && j < NumBricksInPic; j++ )
    BricksToSliceMap[ j ] = −1
NumBricksInSlice[ i ] = 0
BottomRightBrickIdx[ i ] = bottom_right_brick_idx_delta[ i ] ] +( (
i = = 0 ) ? 0 :
        ( brick_idx_delta_sign_flag[ i ] ? BottomRightBrickIdx[
        i − 1 ] :
−BottomRightBrickIdx[ i−1 ] )
for( j = BottomRightBrickIdx[ i ]; j >= 0; j− − ) {
    if( BrickColBd[ j ] <= BrickColBd[ BottomRightBrickIdx[ i ] ] &&
        BrickRowBd[ j ] <= BrickRowBd[ BottomRightBrickIdx[
        i ] ] &&
        TopLeftBrickIdx[ i ] = j
        NumBricksInSlice[ i ]++
        TotalBricksCount++
        BricksToSliceMap[ j ] = i
    }
}
```

The variable TopLeftBrickIdx[num_slices_in_pic_minus1], NumBricksInSlice[num_slices_in_pic_minus1], which specify the brick index of the brick located at the top left corner of the (num_slices_in_pic_minus1)-th slice, and the number of bricks in the (num_slices_in_pic_minus1)-th slice, are derived as follows:

```
if( i = = num_slices_in_pic_minus1-1 ) {
    NumBricksInSlice[ num_slices_in_pic_minus1 ]= NumBricksInPic− TotalBricksCount
    for( j = 0, TopLeftBrickIdx[ num_slices_in_pic_minus1 ]= NumBricksInPic − 1; j <
    NumBricksInPic; j++ )
        if((BricksToSliceMap[ j ] = = −1) && (TopLeftBrickIdx[ num_slices_in_pic_minus1 ]
        > j))
            TopLeftBrickIdx[ num_slices_in_pic_minus1 ] = j
}
```

In a variant example:

```
for( j = NumBricksInPic − 1; j >= 0; j− − ) {
    if( BrickColBd[ j ] <= BrickColBd[ NumBricksInPic − 1 ] &&
        BrickRowBd[ j ] <= BrickRowBd[ NumBricksInPic − 1 ] &&
        TopLeftBrickIdx[ num_slices_in_pic_minus1 ] = j
        NumBricksInSlice[ num_slices_in_pic_minus1 ]++
        BricksToSliceMap[ j ] = num_slices_in_pic_minus1
    }
}
```

In a variant example, the derivation may included the following:

For i in the range of 0 to num_slices_in_pic_minus1, inclusive, the variable TopLeftBrickIdx[i], BottomRightBrickIdx[i], NumBricksInSlice[i] and BricksTobSliceMap[j], which specify the brick index of the brick located at the top left corner of the i-th slice, the brick index of the brick located at the bottom right corner of the i-th slice, the number of bricks in the i-th slice and the mapping of bricks to slices, are derived as follows:

```
for( j = 0, TotalBricksCount=0; i = = 0 && j < NumBricksInPic; j++ )
    BricksToSliceMap[ j ] = −1
NumBricksInSlice[ i ] = 0
if( i < num_slices_in_pic_minus1 )
    BottomRightBrickIdx[ i ] = bottom_right_brick_idx_delta[
        i ] ] +( ( i = = 0 ) ? 0 :
        ( brick_idx_delta_sign_flag[ i ] ? BottomRightBrickIdx[
        i − 1 ] :
−BottomRightBrickIdx[ i−1 ] )
else
    BottomRightBrickIdx[ i ] = NumBricksInPic − 1
for( j = BottomRightBrickIdx[ i ]; j >= 0; j− − ) {
    if( BrickColBd[ j ] <= BrickColBd[ BottomRightBrickIdx[ i ] ] &&
        BrickRowBd[ j ] <= BrickRowBd[ BottomRightBrickIdx[
        i ] ] &&
        TopLeftBrickIdx[ i ] = j
        NumBricksInSlice[ i ]++
        TotalBricksCount++
        BricksToSliceMap[ j ] = i
    }
}
```

It should be noted that in JVET-O2001, the syntax element brick_row_height_minus1[i][j] is coded as ue(v) for j in the range of 0 to num_brick_rows_minus2[i], inclusive and for i in the range of 0 to (num_tiles_in_pic_minus1+1). However, no valid range of values is specified for brick_row_height_minus1[i][j]. Not knowing a valid value range for a syntax element that is ue(v) coded means that the decoder may need to assign very high number of bits of storage for parsing this ue(v) coded syntax element, which is not desirable as it wastes memory or storage. In one example, according to the techniques herein the semantics of syntax element brick_row_height_minus1[i][j] may be based on the following:

brick_row_height_minus1[i][j] plus 1 specifies the height of the j-th brick in the i-th tile in units of CTBs when uniform_tile_spacing_flag is equal to 0. brick_row_height_minus1[i][j] shall be in the range of 0 to RowHeight[i]−2, inclusive.

In another example, other valid value range may be defined for brick_row_height_minus1[i][j].

For example:

brick_row_height_minus1[i][j] shall be in the range of 0 to RowHeight[i]−1, inclusive. OR brick_row_height_minus1[i][j] shall be in the range of 0 to RowHeight[i], inclusive. OR brick_row_height_minus1[i][j] shall be in the range of 0 to pic_width_in_luma_samples−2, inclusive. OR brick_row_height_minus1[i][j] shall be in the range of 0 to pic_width_in_luma_samples−1, inclusive.

brick_row_height_minus1[i][j] shall be in the range of 0 to pic_width_in_luma_samples, inclusive.

brick_row_height_minus1[i][ ] shall be in the range of 0 to pic_width_in_luma_samples−num_tile_rows_minus1, inclusive.
OR brick_row_height_minus1[i][j] shall be in the range of 0 to pic_width_in_luma_samples−num_tile_rows_minus1−1, inclusive.
OR brick_row_height_minus1[i][j] shall be in the range of 0 to pic_width_in_luma_samples−num_tile_rows_minus1−2, inclusive.
OR brick_row_height_minus1[i][j] shall be in the range of 0 to pic_width_in_luma_samples−num_tile_rows_minus11, inclusive.

In one example, according to the techniques herein, the loop index for signaling brick_split_flag and related syntax elements may be as follows.

for(i=0;   brick_splitting_present_flag   && i<num_tiles_in_pic_minus1+1; i++) { . . . }

In another example the loop index for signaling brick_split_flag and related syntax elements may be as follows.

for(i=0;   brick_splitting_present_flag   && i<NumTilesInPic; i++) { . . . }

In one example, according to the techniques herein, a flag which indicates that each slice contains a sub-picture may be signaled. In one example, this flag may be signaled as a syntax element in a parameter set (e.g., a PPS or SPS). In the example where the flag is signaled as a syntax element in a PPS, the syntax element may be referred to as single_slices_per_subpic_flag or the like, may be coded as u(1), may be based on the following semantics, and/or may immediately precede the syntax element num_slices_in_pic_minus1. In another example, syntax element single_slice_per_subpic_flag may be signaled at a different location within a PPS. Further, in one example, syntax element single_slice_per_subpic_flag may be signaled for rectangular slices and/or for raster scan slices. That is, for example, the location syntax element single_slice_per_subpic_flag may be such that the presence of syntax element single_slice_per_subpic_flag not be conditioned on rect_slice_flag being equal to 1. In another example, syntax element single_slice_per_subpic_flag may be signaled only when subpics_present_flag is equal to 1.

single_slice_per_subpic_flag equal to 1 specifies that if subpictures are present in the CVS, each slice referring to this PPS contains one complete subpicture. single_slice_per_ subpic_flag equal to 0 specifies that if subpictures are present in the CVS, for slices referring to this PPS, a subpicture may consist of one or more slices.

In another example:

single_slice_per_subpic_flag equal to 1 specifies that if subpictures are present in the CVS, each subpicture contains one and only one slice referring to this PPS. single_slice_per_subpic_flag equal to 0 specifies that if subpictures are present in the CVS, for slices referring to this PPS, a subpicture may consist of one or more slices.

In another example:

single_slice_per_subpic_flag equal to 1 specifies that if subpictures are present in the CVS, each slice referring to this PPS contains one complete subpicture. single_slice_per_ subpic_flag equal to 0 specifies that if subpictures are present in the CVS, for slices referring to this PPS, a slice includes part of a subpicture.

In one example, the "if subpictures are present in the CVS" condition may be checked by checking if the subpics_present_flag is equal to 1 in the SPS with sps_seq_parameter_set_id value equal to pps_seq_parameter_set_id.

In the example where the flag is signaled as a syntax element in a SPS, the syntax element may be referred to as single_slice_per_subpic_flag or the like, may be coded as u(1), may be based on the following semantics, and/or may be included in the if(subpics_present_flag) { . . . } structure, for example, as the last syntax element in the structure. In another example, syntax element single_slice_per_subpic_flag may be signaled at a different location within SPS. In another example, a separate single_slice_in_subpic_flag[i] may be signalled for each subpicture (for i in the range of 0 to NumSubPics−1, inclusive). That is, single_slice_in_supbic_flag[i] may be included in the for(i=0; i<=NumSubPics; i++) { . . . } loop of a seq_parameter_set_rbsp( ) syntax structure.

single_slice_per_subpic_flag equal to 1 specifies that each slice in the CVS contains one complete subpicture. single_slice_per_subpic_flag equal to 0 specifies that in the CVS, a subpicture may be split in one or more slices.

It should be noted that in JVET-O2001, a general constraint information syntax structure, general_constraint_info( ) may be included in a VPS or within the profile_tier_level( ) syntax structure of the SPS. In one example, according to the techniques herein, a flag which indicates that each slice contains a sub-picture may be signaled in a general_constraint_info( ) syntax structure. Table 13 illustrates an example of a general_constraint_info( ) including a flag which indicates that each slice contains a sub-picture.

TABLE 13

|  | Descriptor |
| --- | --- |
| general_constraint_info( ) { |  |
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| single_slice_subpic_only_constraint_flag | u(1) |
| no_qtbtt_dual_tree_intra_constraint_flag | u(1) |
| no_partition_constraints_override_constraint_flag | u(1) |
| no_sao_constraint flag | u(1) |
| no_alf_constraint_flag | u(1) |

TABLE 13-continued

| | Descriptor |
|---|---|
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
|    gci_alignment_zero_bit | f(1) |
| } | |

With respect to Table 13, in one example, the semantics may be based on the following:

general_progressive_source_flag and general_interlaced_source_flag are interpreted as follows:

If general_progressive_source_flag is equal to 1 and general_interlaced_source_flag is equal to 0, the source scan type of the pictures in BitstreamInScope should be interpreted as progressive only.

Otherwise, if general_progressive_source flag is equal to 0 and general_interlaced_source_flag is equal to 1, the source scan type of the pictures in BitstreamInScope should be interpreted as interlaced only.

Otherwise, if general_progressive_source_flag is equal to 0 and general_interlaced_source_flag is equal to 0, the source scan type of the pictures in BitstreamInScope should be interpreted as unknown or unspecified.

Otherwise (general_progressive_source_flag is equal to 1 and general_interlaced_source_flag is equal to 1), the source scan type of each picture in BitstreamInScope should be interpreted as unknown or unspecified.

NOTE—Decoders may ignore the values of general_progressive_source_flag and general_interlaced_source_flag. Moreover, the actual source scan type of the pictures is outside the scope of this Specification and the method by which the encoder selects the values of general_progressive_source_flag and general_interlaced_source_flag is unspecified.

general_non_packed_constraint_flag equal to 1 indicates that the cropped output pictures of the decoded bitstream are suitable to be displayed. general_non_packed_constraint_flag equal to 0 indicates that the cropped output pictures of the decoded bitstream may require further processing to be suitable for displaying.

NOTE—Examples for content that requires additional processing before displaying are bitstreams containing one or more frame packing arrangement SEI messages, equirectangular projection SEI messages, or cubemap projection SEI messages.

general_frame_only_constraint_flag equal to 1 specifies that BitstreamInScope conveys pictures that represent frames. general_frame_only_constraint_flag equal to 0 specifies that BitatreamInScope conveys pictures that may or may not represent frames.

NOTE—Decoders may ignore the value of general_frame_only_constraint_flag, as there are no decoding process requirements associated with it.

intra_only_constraint_flag equal to 1 specifies that slice_type shall be equal to I. intra_only_constraint_flag equal to 0 does not impose a constraint.

max_bitdepth_constraint_idc specifies that bit_depth_luma_minus8 and bit_depth_chroma_minus8 shall be in the range of 0 to max_bitdepth_constraint_idc, inclusive.

max_chroma_format_constraint_idc specifies that chroma_format_idc shall be in the range of 0 to max_chroma_format_constraint_idc, inclusive.

frame_only_constraint_flag equal to 1 specifies that the CVS conveys pictures that represent frames. frame_only_constraint_flag equal to 0 does not impose a constraint.

no_qtbtt_dual_tree_intra_constraint_flag equal to 1 specifies that qtbtt_dual_tree_intra_flag shall be equal to 0. no_qtbtt_dual_tree_intra_constraint_flag equal to 0 does not impose a constraint.

no_partition_conatraints_override_constraint_flag equal to 1 specifies that partition_constraints_override_enabled_flag shall be equal to 0. no_partition_constraints_override_constraint_flag equal to 0 does not impose a constraint.

no_sao_constraint_flag equal to 1 specifies that sps_sao_enabled_flag shall be equal to 0. no_sao_constraint_flag equal to 0 does not impose a constraint.

no_alf_constraint_flag equal to 1 specifies that sps_alf_enabled_flag shall be equal to 0. no_alf_constraint_flag equal to 0 does not impose a constraint.

no_joint_cbcr_contraint_flag equal to 1 specifies that sps_joint_cbcr_enabled_flag shall be equal to 0. no_joint_cbcr_constraint_flag equal to 0 does not impose a constraint.

no_ref_wraparound_constraint_flag equal to 1 specifies that sps_ref_wraparound_enabled_flag shall be equal to 0. no_ref_wraparound_constraint_flag equal to 0 does not impose a constraint.

no_tempral_mvp_constraint_flag equal to 1 specifies that sps_temporal_mvp_enabled_flag shall be equal to 0. no_temporal_mvp_constraint_flag equal to 0 does not impose a constraint.

no_sbtmvp_constraint_flag equal to 1 specifies that sps_sbtmvp_enabled_flag shall be equal to 0. no_sbtmvp_constraint_flag equal to 0 does not impose a constraint.

no_amvr_constraint_flag equal to 1 specifies that sps_amvr_enabled_flag shall be equal to 0. no_amvr_constraint_flag equal to 0 does not impose a constraint.

no_bdof_constraint_flag equal to 1 specifies that sps_bdof_enabled_flag shall be equal to 0. no_bdof_constraint_flag equal to 0 does not impose a constraint.

no_dmvr_constraint_flag equal to 1 specifies that sps_dmvr_enabled_flag shall be equal to 0. no_dmvr_constraint_flag equal to 0 does not impose a constraint.

no_cclm_constraint_flag equal to 1 specifies that sps_cclm_enabled_flag shall be equal to 0. no_cclm_constraint_flag equal to 0 does not impose a constraint.

no_mts_constraint_flag equal to 1 specifies that sps_mts_enabled_flag shall be equal to 0. no_mts_constraint_flag equal to 0 does not impose a constraint.

no_sbt_constraint_flag equal to 1 specifies that sps_sbt_enabled_flag shall be equal to 0. no_sbt_constraint_flag equal to 0 does not impose a constraint.

no_affine_motion_constraint_flag equal to 1 specifies that sps_affine_enabled_flag shall be equal to 0. no_affine_motion_constraint_flag equal to 0 does not impose a constraint.

no_bcw_constraint_flag equal to 1 specifies that sps_bcw_enabled_flag shall be equal to 0. no_bcw_constraint_flag equal to 0 does not impose a constraint.

no_ibc_constraint_flag equal to 1 specifies that sps_ibc_enabled_flag shall be equal to 0. no_ibc_constraint_flag equal to 0 does not impose a constraint.

no_ciip_constraint_flag equal to 1 specifies that sps_ciip_enabled_flag shall be equal to 0. no_cipp_constraint_flag equal to 0 does not impose a constraint.

no_fpel_mmvd_constraint_flag equal to 1 specifies that sps_fpel_mmvd_enabled_flag shall be equal to 0. no_fpel_mmvd_constraint_flag equal to 0 does not impose a constraint.

no_triangle_contraint_flag equal to 1 specifies that sps_triangle_enabled_flag shall be equal to 0. no_triangle_constraint_flag equal to 0 does not impose a constraint.

no_ladf_constraint_flag equal to 1 specifies that sps_ladf_enabled_flag shall be equal to 0. no_ladf_constraint_flag equal to 0 does not impose a constraint.

no_transform_skip_constraint_flag equal to 1 specifies that sps_transfrom_skip_enabled_flag shall be equal to 0. no_transform_skip_constraint_flag equal to 0 does not impose a constraint.

no_bdpcm_constraint_flag equal to 1 specifies that sps_bdpcm_enabled_flag shall be equal to 0. no_bdpcm_constraint_flag equal to 0 does not impose a constraint.

no_qp_delta_constraint_flag equal to 1 specifies that it is a requirement of bitstream conformance that cu_qp_delta_enabled_flag shall be equal to 0. no_qp_delta_constraint_flag equal to 0 does not impose a constraint.

no_dep_quant_constraint_flag equal to 1 specifies that it is a requirement of bitstream conformance that dep_quant_enabled_flag shall be equal to 0. no_dep_quant_constraint_flag equal to 0 does not impose a constraint.

no_sign_data_hiding_constraint_flag equal to 1 specifies that it is a requirement of bitstream conformance that sign_data_hiding_enabled_flag shall be equal to 0. no_sign_data_hiding_constraint_flag equal to 0 does not impose a constraint.

gci_alignment_zero_bits shall be equal to 0.

single_slice_subpic_only_constraint_flag equal to 1 specifies that CVS includes one complete subpicture per slice. single_slice_subpic_only_constraint_flag equal to 0 does not impose a constraint.

In another example, according to the techniques herein, a subpicture index may be explicitly signaled for subpictures. In one example, a flag may be signaled to indicate if the subpicture indices are explicitly signaled or implicitly derived for subpictures. In one example, when single_slice_per_subpic_flag equal to 1, a sub-picture index value may be inferred for each sub-picture implicitly. Table 14A illustrates an example of the relevant syntax of a picture parameter set syntax structure in which a subpicture index may be explicitly signaled for subpictures, according to the techniques herein.

TABLE 14A

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |

TABLE 14A-continued

| | Descriptor |
|---|---|
|   pic_height_in_luma_samples | ue(v) |
|   ... | |
|   single_brick_per_slice_flag | u(1) |
|   if( !single_brick_per_slice_flag ) | |
|     rect_slice_flag | u(1) |
|   if( rect_slice_flag && | |
|   !single_brick_per_slice_flag ) { | |
|     single_subpic_per_slice_flag | u(1) |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|     signalled_subpicture_id_flag | u(1) |
|     if(signalled_subpicture_id_flag ) { | |
|       signalled_subpicture_id_length_minus1 | ue(v) |
|       for( i = 0; i <= num_slices_in_pic_minus1; i++ ) | |
|         subpicture_id[ i ] | u(v) |
|       } | |
|   } | |
|   loop_filter_across_bricks_enabled_flag | u(1) |
|   if( loop_filter_across_bricks_enabled_flag ) | |
|     loop_filter_across_slices_enabled_flag | u(1) |
| } | |
| ... | |
| } | |

With respect to Table 14A, the semantics may be based on the semantics provided above and the following semantics:

signalled_subpicture_id_flag equal to 1 specifies that the subpicture ID specifying which subpicture each slice belongs to is signalled. signalled_subpicture_id_flag equal to 0 specifies that subpicture IDs are not signalled. When rect_slice_flag is equal to 0, the value of signalledLsubpicture_id_flag is inferred to be equal to 0.

signal_subpicture_id_length_minus1 plus 1 specifies the number of bits used to represent the syntax element subpicture_id[i] when present, and the syntax element subpicture_id_val in slice headers. The value of signalled_subpicture_id_length_minus1 shall be in the range of 0 to 15, inclusive. When not present, and when single_subpic_per_slice_flag is equal to 1, the value of signalled_subpicture_id_length_minus1 is inferred to be equal to Ceil(Log 2(Max(2, num_slices_in_pic_minus1+1)))−1.

subpicture_id[i] specifies the subpicture ID of the subpicture the i-th slice belongs to. The length of the subpicture_id[i] syntax element is signalled_subpicture_id_length_minus1+1 bits. When not present, and when single_subpic_per_slice_flag is equal to 1, the value of subpicture_id[i] is inferred to be equal to i, for each i in the range of 0 to num_slices_in_pic_minus1, inclusive.

With respect to Table 14A, in another example, instead of inside the if(rect_slice_flag && !single_brick_per_slice_flag){ . . . } structure, the subpicture ID related syntax elements may be signalled outside the structure. In another example, the subpicture ID related syntax elements may be signaled at a different location within PPS. Also, these syntax element may be signalled for rectangular slices and/or for raster scan slices. In another example, the subpicture ID related syntax elements may be signaled only when subpics_present_flag is equal to 1.

Table 14B illustrates another example of the relevant syntax of a picture parameter set syntax structure in which a subpicture index may be explicitly signaled for subpictures, according to the techniques herein.

TABLE 14B

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   pps_subpics_present_flag | u(1) |
|   if( pps_subpics_present_flag ) | |
|     num_subpics_minus1 | ue(v) |
|     ... | |
|     single_brick_per_slice_flag | u(1) |
|     if( !single_brick_per_slice_flag ) | |
|       rect_slice_flag | u(1) |
|     if( rect_slice_flag && | |
|     !single_brick_per_slice_flag ) { | |
|       single_subpic_per_slice_flag | u(1) |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|     if( pps_subpics_present_flag ) { | |
|       pps_signalled_subpic_id_flag | u(1) |
|       if( pps_signalled_subpic_id_flag ) { | |
|         pps_signalled_subpic_id_length_minus1 | ue(v) |
|         for( i = 0; i <= num_subpics_minus1; i++ ) | |
|           pps_subpic_id[ i ] | u(v) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
| ... | |
| } | |

With respect to Table 14B, the semantics may be based on the semantics provided above and the following semantics:

pps_subpics_present_flag equal to 1 indicates that subpicture parameters are present in the PPS RBSP syntax. pps_subpics_present_flag equal to 0 indicates that subpicture parameters are present in the PPS RBSP syntax. The value of pps_subpics_present_flag shall be equal to subpics_present_flag.

num_subpics_minus1 plus 1 indicates the number of subpictures present in the picture referring to this PPS. num_subpics_minus1 shall be equal to number of subpictures signalled in SPS (e.g. shall be equal to NumSubPics or NumSubPicsMinus1+1).

pps_signalled_subpic_id_flag equal to 1 specifies that the subpicture ID for subpicture is signalled in PPS. pps_signalled_subpic_id_flag equal to 0 specifies that subpicture IDs are not signalled in PPS. If signalled_subpic_id_flag is 0 or subpic_id_signalled_in_sps_flag is equal to 1, pps_signalled_subpic_id_flag shall be equal to 0.

pps_signalled_subpicture_id_length_minus1 plus 1 specifies the number of bits used to represent the syntax element pps_subpic_id[i] when present, and the syntax element subpic_id_val in slice headers. The value of pps_signalled_subpic_id_length_minus1 shall be in the range of 0 to 15, inclusive.

pps_subpic_id[i] specifies the subpicture ID of the i-th subpicture. The length of the pps_subpic_id[i] syntax element is pps_signalled_subpic_id_length_minus1+1 bits.

Table 14B illustrates another example of the relevant syntax of a picture parameter set syntax structure in which a subpicture index may be explicitly signaled for subpictures, according to the techniques herein.

In another example, a subpicture index may be explicitly signaled or implicitly derived for each subpicture based on syntax in an SPS. Table 15A illustrates an example of the relevant syntax of a sequence parameter set syntax structure in which a subpicture index may be explicitly signaled for subpictures, according to the techniques herein.

TABLE 15A

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|         signalled_subpicture_id_flag | u(1) |
|         if(signalled_subpicture_id_flag ) | |
|           signalled_subpicture_id_length_minus1 | ue(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|       if(signalled_subpicture_id_flag ) { | |
|         subpicture_id[ i ] | u(v) |
|       } | |
|     } | |
|   } | |
|   bit_depth_luma_minus8 | ue(v) |
|   bit_depth_chroma_minus8 | ue(v) |

With respect to Table 15A, the semantics may be based on the semantics provided above and the following semantics:

signalled_subpicture_id_flag equal to 1 specifies that the subpicture ID for each subpicture is signalled. signalled_subpicture_id_flag equal to 0 specifies that subpicture ID are not signalled and are inferred.

signalled_subpicture_id_length_minu1 plus 1 specifies the number of bits used to represent the syntax element subpicture_id[i] when present, and the syntax element subpicture_id_val in slice headers. The value of signalled_subpicture_id_length_minus1 shall be in the range of 0 to 15, inclusive. When not present, the value of signalled_subpicture_id_length_minus1 is inferred to be equal to Ceil(Log 2(Max(2, NumSubPics)))−1.

subpicture_id[i] specifies the subpicture ID of the i-th subpicture. The length of the subpicture_id[i] syntax element is signalled_subpicture_id_length_minus1+1 bits. When not present, the value of subpicture_id[i] is inferred to be equal to i, for each i in the range of 0 to NumSubPics−1, inclusive.

Table 15B illustrates another example of the relevant syntax of a sequence parameter set syntax structure in which a subpicture index may be explicitly signaled for subpictures, according to the techniques herein.

TABLE 15B

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     signalled_subpic_id_flag | u(1) |
|     if( signalled_subpic_id_flag ) | |
|       subpic_id_signalled_in_sps_flag | u(1) |
|     if( subpic_id_signalled_in_sps_flag ) | |
|       sps_signalled_subpic_id_length_minus1 | ue(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|       if( subpic_id_signalled_in_sps_flag ) | |
|         sps_subpic_id[ i ] | u(v) |
|     } | |
|   } | |
|   bit_depth_luma_minus8 | ue(v) |
|   bit_depth_chroma_minus8 | ue(v) | sps_subpic_id[i] specifies the subpicture ID of the i-th subpicture. The length of the sps_subpic_id[i] syntax element is sps_signalled_subpic_id_length_minus1+1 bits. When not present, and when signalled_subpic_id_flag is equal to 0, the value of sps_subpic_id[i] is inferred to be equal to i, for each i in the range of 0 to NumSubPics−1, inclusive.

In one example, according to the techniques herein, a subpicture ID may be signaled in a picture header. A picture header may be signaled in a non-VCL NAL unit (e.g., NAL unit with type PH_NUT) or in a VCL NAL unit. Picture header may be included before the VCL NAL units for a picture. It may be required that parameter sets, e.g. SPS and/or PPS must precede a picture header. An APS may not need to precede picture header. SEI messages for a picture may follow it. A picture header may be repeated in an access unit. In one example, the maximum number of repeated picture headers in a picture may be equal to number of slices in the picture. In one example, a picture header may not be included following the last VCL NAL unit in the access unit.

Table 15C illustrates an example of the relevant syntax of a picture header syntax structure in which a subpicture ID. It should be noted that the syntax illustrated in Table 15C may in one example be used in conjunction with the syntax illustrated in Table 14B and Table 15B.

TABLE 15C

| | Descriptor |
|---|---|
| pic_header_rbsp( ) { | |
|   pic_header_pic_parameter_set_id | ue(v) |
|   ... | |
|   if(sps_subpics_present_flag && signalled_subpic_id_flag | |
|   && !subpic_id_signalled_in_sps_flag && !pps_signalled_subpic_id_flag) { | |
|     pic_signalled_subpic_id_flag | u(1) |
|     if(pic_signalled_subpic_id_flag ) { | |
|       pic_signalled_subpic_id_length_minus1 | ue(v) |
|       for( i = 0; i < NumSubpics; i++ ) | |
|         pic_subpic_id[ i ] | u(v) |
|     } | |

With respect to Table 15B, the semantics may be based on the semantics provided above and the following semantics:

signalled_subpic_id_flag equal to 1 specifies that the subpicture ID for each subpicture is signalled. signalled_subpic_id_flag equal to 0 specifies that subpicture IDs are not signalled and are inferred.

subpic_id_signalled_in_sps_flag equal to 1 specifies that the subpicture ID for each subpicture is signalled in SPS. signalled_subpic_id_flag equal to 0 specifies that subpicture IDs are not signalled in SPS. When not present, signalled_subpic_id_length_minus1 is inferred to be equal to 0.

sps_signalled_subpic_id_length_minus1 plus 1 specifies the number of bits used to represent the syntax element sps_subpic_id[i] when present, and the syntax element subpic_id_val in slice headers. The value of sps_signalled_subpic_id_length_minus1 shall be in the range of 0 to 15, inclusive. In another example When not present, the value of signalled_subpicture_id_length_minus1 is inferred to be equal to Ceil(Log 2(Max(2, NumSubPics)))−1.

With respect to Table 16C, in one example, the semantics may be based on the following:

pic_header_pic_parameter_set_id specifies the value of pps_pic_parameter_set_id for the PPS in use. The value of pic_header_pic_parameter_set_id shall be in the range of 0 to 63, inclusive.

pic_signalled_subpic_id_flag equal to 1 specifies that the subpicture ID for each subpicture is signalled in the picture header. pic_signalled_subpic_id_flag equal to 0 specifies that subpicture IDs are not signalled in picture header.

pic_signalled_subpic_id_length_minus1 plus 1 specifies the number of bits used to represent the syntax element pic_subpic_id[i] when present, and the syntax element subpic_id_val in slice headers. The value of pic_signalled_subpic_id_length_minus1 shall be in the range of 0 to 15, inclusive.

pic_subpic_id[i] specifies the subpicture ID of the i-th subpicture in the picture associated with the picture header. The length of the pic_subpic_id[i] syntax element is pic_signalled_subpic_id_length_minus1+1 bits.

In one example, according to the techniques herein, a subpicture ID may be signaled in a slice header. Table 16 illustrates an example of the relevant syntax of a slice header syntax structure in which a subpicture ID.

TABLE 16

|  | Descriptor |
|---|---|
| slice_header( ) { |  |
|   slice_pic_parameter_set_id | ue(v) |
|   if( rect_slice flag \|\| NumBricksInPic > 1 ) |  |
|     slice_address | u(v) |
|   if( subpics_present_flag ) |  |
|     subpic_id_val | u(v) |
|   if( !rect_slice_flag && !single_brick_per_slice_flag ) |  |
|     num_bricks_in_slice_minus1 | ue(v) |
|   ... |  |
|   if( nal_unit_type = = IDR_W_RADL \|\| nal_unit_type = = IDR_N_LP \|\| |  |
|     nal_unit_type = = CRA_NUT \|\| NalUnitType = = GDR_NUT ) |  |
|     no_output_of_prior_pics_flag | u(1) |
|   if( output_flag_present_flag ) |  |
|     pic_output_flag | u(1) |
| } |  |

With respect to Table 16, the semantics may be based on the semantics provided above and the following semantics:

subpic_id_val specifies the subpicture ID of the subpicture the slice belongs to. The length of the subpic_id_val is signalled_subpicture_id_length_minus1+1 bits. If signalled_ subpicture_id_flag is equal to 0, the value of subpic_id_val shall be in the range of 0 to NumSubPics−1, inclusive. Otherwise, the value of subpic_id_val shall be in the range of 0 to 2(signalled_subpicture_id_length_minus1+1)−1, inclusive.

With respect to Table 16, in one example, the semantics may be based on the following, for example, in an example where Table 16 is used in conjunction with Table 14B, Table 15B and Table 15C:

The variable SignalledSubpictureIdLength is derived as follows:
  if(subpic_id_signalled_in_sps_flag)
  SignalledSubpictureIdLength=sps_signalled_subpic_id_length_minus1+1 else if(pps_signalled_subpic_id_flag)
  SignalledSubpictureIdLength=pps_signalled_subpic_id_length_minus1+1 else if(pic_signalled_subpic_id_flag)
  SignalledSubpictureIdLength=pic_signalled_subpic_id_length_minus1+1 else
  SignalledSubpictureIdLength=Ceil(Log 2(Max(2, NumSubPics)))−1 subpic_id_val specifies the subpicture ID of the subpicture the slice belongs to. The length of the subpic_id_val is SignalledSubpictureIdLength bits. The value of subpic_id_val shall be in the range of 0 to $2^{(SignalledSubpictureIdLength)}-1$, inclusive.

In one example, according to the techniques herein, the following syntax in a PPS:

|  |  |
|---|---|
| if( rect_slice_flag ) { |  |
|   signalled_slice_id_flag | u(1) |
|   if( signalled_slice_id_flag ) { |  |
|     signalled_slice_id_length_minus1 | ue(v) |
|     for( i = 0; i <= num_slices_in_pic_minus1; i++ ) { |  |
|       slice_id[ i ] | u(v) |
|     } |  |
|   } |  |
| } |  |

May be modified as follows:

|  |  |
|---|---|
| if( rect_slice_flag ) { |  |
|   signalled_slice_id_flag | u(1) |
|   if( signalled_slice_id_flag ) |  |
|     signalled_slice_id_length_minus1 | ue(v) |
|   for( i = 0; i <= num_slices_in_pic_minus1; i++ ) { |  |
|     if( max_subpics_minus1 > 0 ) |  |
|       sub_pic_idx[ i ] | u(v) |
|     if( signalled_slice_id_flag ) |  |
|       slice_id[ i ] | u(v) |
|   } |  |
| } |  |

In one example, the semantics of syntax element sub_pic_idx may be based on the following semantics:

subpic_pic_idx[i] specifies the subpicture ID of the subpicture the i-th slice belongs to. The length of the subpicture_id[i] syntax element is Ceil(Log 2(Max(2, max_subpics_minus1+1)))−1

In another example the for loop which signals subpic_treated_as_pic_flag[i], loop_filter_across_subpic_enabled_flag[i] syntax elements may be modified.

It is asserted that the for loop should be changed from
for(i=0; i<=NumSubPics; i++) {subpic_treated_as_pic_flag[i], loop_filter_across_subpic_enabled_flag[i]}
to
for(i=0; i<NumSubPics; i++) {subpic_treated_as_pic_flag[i], loop_filter_across_subpic_enabled_flag[i]}
This is shown in Table 17 below.

TABLE 17

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   gdr_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_max_in_luma_samples | ue(v) |

TABLE 17-continued

| | Descriptor |
|---|---|
| pic_height_max_in_luma_samples | ue(v) |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i < NumSubPics; i++ ) { | |
|     subpic_treated_as_pic_flag[ i ] | u(1) |
|     loop_filter_across_subpic_enabled_flag[ i ] | u(1) |
|   } | |
| } | |
| bit_depth_luma_minus8 | ue(v) |
| bit_depth_chroma_minus8 | ue(v) |

In one example, according to the techniques herein, a flag may be signaled for each subpicture to specify if cropping information is signaled for a subpicture. And when not signaled the coded subpicture size is inferred to be equal to cropped subpicture size. In one example, the cropping information may be only signaled for subpictures which have at least one of the (top, left, right, bottom) boundary which coincides with a picture boundary. In this case, in one example, a flag may be signaled only for each subpicture which has at least a boundary which coincides with a picture boundary. In one example, cropping information in this case may be specified and applied only to each subpicture boundary which coincides with a picture boundary.

Additionally, in one example, according to the techniques herein, cropping information may be signaled for the overall picture and the presence of the cropping information for a picture may be controlled by a flag and when not signaled the cropping information for the picture may be derived from the cropping information for subpictures. In another example, the cropping information may not be signaled for the full picture and maybe only allowed to be signaled for subpictures and the cropping information for the full picture is always derived based on the cropping information for the subpictures. In another example, if cropping information is not provided for subpictures, only then cropping information may be allowed to be signaled for overall picture.

Table 18 illustrates an example of a SPS including syntax indicating whether conformance cropping window offset parameters are present for subpictures.

TABLE 18

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |

TABLE 18-continued

| | Descriptor |
|---|---|
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i < NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   subpics_cropping_info_present_flag | u(1) |
|   if( subpics_cropping_info_present_flag ) { | |
|     for( i = 0; i < NumSubPics; i++ ) { | |
|       subpic_conformance_window_flag[ i ] | u(1) |
|       if( subpic_conformance_window flag ) { | |
|         subpic_conf_win_left_offset[ i ] | ue(v) |
|         subpic_conf_win_right_offset[ i ] | ue(v) |
|         subpic_conf_win_top_offset[ i ] | ue(v) |
|         subpic_conf_win_bottom_offset[ i ] | ue(v) |
|       } | |
|     } | |
|   } | |
| ... | |
| } | |

With respect to Table 18, the semantics may be based on the semantics provided above and the following:

subpics_cropping_info_present_flag equal to 1 indicates that the conformance cropping window offset parameters are present for subpictures and follow next in the SPS. subpics_cropping_info_present_flag equal to 0 indicates that the explicit conformance cropping window offset parameters are not present for subpictures.

subpic_conformance_window_flag[i] equal to 1 indicates that the conformance cropping window offset parameters for i-th subpicture for each coded picture in the CVS follow next in the SPS. subpic_conformance_window_flag[i] equal to 0 indicates that the conformance cropping window offset parameters are not present for i-th subpicture for each coded picture in the CVS and cropping parameters if present for the overall picture may apply to the subpicture.

subpic_conf_win_left_offset[i], subpic_conf_win_right_offet[i], subpic_conf_win_top_offset[i], and subpic_conf_win_bottom_offset[i] specify the samples of the i-th subpicture for each coded picture in the CVS that are output from the decoding process, in terms of a rectangular region specified in picture coordinates for output. When subpic_conformance_window_flag[i] is equal to 0, the values of subpic_conf_win_left_offset[i], subpic_conf_win_right_offset[i], subpic_conf_win_top_offset[i], and subpic_conf_win_bottom_offset[i] are inferred to be equal to 0.

The conformance cropping window for i-th subpicture for each coded picture in the CVS contains the luma samples with horizontal picture coordinates from SubWidthC*subpic_conf_win_left_offset[i] to SubPicWidth[i]−(SubWidthC*subpic_conf_win_right_offset[i]+1) and vertical picture coordinates from SubHeightC*subpic_conf_win_top_offset[i] to SubPicHeight[i]−(SubHeightC*subpic_conf_win_bottom_offset[i]+1), inclusive.

The value of SubWidthC*(subpic_conf_win_left_offset[i]+subpic_conf_win_right_offset[i]) shall be less than SubPicWidth[i], and the value of SubHeightC*(subpic_conf_win_top_offset[i]+subpic_conf_win_bottom_offset[i]) shall be less than SubPicHeight[i].

The variables SubPicOutputWidthL[i] and SubPicOutputHeightL[i] are derived as follows:

SubPicOutputWidth$L$[$i$]=SubPicWidth[$i$]−SubWidth$C$*(subpic_conf_win_right_offset[$i$]+subpic_conf_win_left_offset[$i$])

SubPicOutputHeight$L$[$i$]=SubPicHeight[$i$]−

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The subpicture conformance cropping window offset parameters are only applied at the output. All internal decoding processes are applied to the uncropped picture size.

Table 19 illustrates another example of a SPS including syntax indicating whether conformance cropping window offset parameters are present for subpictures. That is in Table 19, the conformance window information is signaled in the same for loop as the subpic_treated_as_pic_flag[i] and loop_filter_across_subpic_enabled_flag[i] as With respect to Table 19, the semantics may be based on the semantics provided above for Table 18.

TABLE 19

|  | Descriptor |
|---|---|
| seq_parameter_set_rbsp( ) { |  |
|   sps_decoding_parameter_set_id | u(4) |
|   ... |  |
|   pic_width_max_in_luma_samples | ue(v) |
|   pic_height_max_in_luma_samples | ue(v) |
|   subpics_present_flag | u(1) |
|   if( subpics_present_flag ) { |  |
|     max_subpics_minus1 | u(8) |
|     subpic_grid_col_width_minus1 | u(v) |
|     subpic_grid_row_height_minus1 | u(v) |
|     subpics_cropping_info_present_flag | u(1) |
|     for( i = 0; i < NumSubPicGridRows; i++ ) |  |
|       for( j = 0; j < NumSubPicGridCols; j++ ) |  |
|         subpic_grid_idx[ i ][ j ] | u(v) |
|     for( i = 0; i <= NumSubPics; i++ ) { |  |
|       subpic_treated_as_pic_flag[ i ] | u(1) |
|       loop_filter_across_subpic_enabled_flag[ i ] | u(1) |
|       if( subpics_cropping_info_present_flag ) { |  |
|         subpic_conformance_window_flag[ i ] | u(1) |
|         if( subpic_conformance_window_flag ) { |  |
|           subpic_conf_win_left_offset[ i ] | ue(v) |
|           subpic_conf_win_right_offset[ i ] | ue(v) |
|           subpic_conf_win_top_offset[ i ] | ue(v) |
|           subpic_conf_win_bottom_offset[ i ] | ue(v) |
|         } |  |
|       } |  |
|     } |  |
|   } |  |
| } |  |

In another example, indicating whether conformance cropping window offset parameters are present for subpictures may be included in a PPS. Table 20 illustrates an example of a SPS including syntax indicating whether conformance cropping window offset parameters are present for subpictures.

TABLE 20

|  | Descriptor |
|---|---|
| pic_parameter_set_rbsp( ) { |  |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   subpics_cropping_info_present_flag | u(1) |
|   if( subpics_cropping_info_present_flag ) { |  |
|     for( i = 0; i < NumSubPics; i++ ) { |  |
|       subpic_conformance_window_flag[ i ] | u(1) |
|       if( subpic_conformance_window_flag ) { |  |
|         subpic_conf_win_left_offset[ i ] | ue(v) |
|         subpic_conf_win_right_offset[ i ] | ue(v) |
|         subpic_conf_win_top_offset[ i ] | ue(v) |
|         subpic_conf_win_bottom_offset[ i ] | ue(v) |
|       } |  |
|     } |  |
|   } |  |
|   conformance_window_flag | u(1) |
|   if( conformance_window_flag ) { |  |
|     conf_win_left_offset | ue(v) |
|     conf_win_right_offset | ue(v) |
|     conf_win_top_offset | ue(v) |
|     conf_win_bottom_offset | ue(v) |
|   } |  |
| } |  |

With respect to Table 20, the semantics may be based on the semantics provided above and the following:

subpics_cropping_info_present_flag equal to 1 indicates that the conformance cropping window offset parameters are present for subpictures and follow next in the PPS. subpics_cropping_info_present_flag equal to 0 indicates that the explicit conformance cropping window offset parameters are not present for subpictures.

subpic_conformance_window_flag[i] equal to 1 indicates that the conformance cropping window offset parameters for i-th subpicture for each coded picture referring to the PPS follow next in the PPS. subpic_conformance_window_flag[i] equal to 0 indicates that the conformance cropping window offset parameters are not present for i-th subpicture for each coded picture referring to the PPS S and cropping parameters if present for the overall picture may apply to the subpicture.

subpic_conf_win_left_offset[i], subpic_conf_win_right_offet[i], subpic_conf_win_top_offset[i], and subpic_conf_win_bottom_offset[i] specify the samples of the i-th subpicture for each coded picture referring to the PPS that are output from the decoding process, in terms of a rectangular region specified in picture coordinates for output. When subpic_conformance_window_flag[i] is equal to 0, the values of subpic_conf_win_left_offset[i], subpic_conf_win_right_offset[i], subpic_conf_win_top_offset[i], and subpic_conf_win_bottom_offset[i] are inferred to be equal to 0.

The conformance cropping window for i-th subpicture for each coded picture referring to the PPS contains the luma samples with horizontal picture coordinates from SubWidthC*subpic_conf_win_left_offset[i] to SubPicWidth[i]−(SubWidthC*subpic_conf_win_right_offset[i]+1) and vertical picture coordinates from SubHeightC*subpic_conf_win_top_offset[i] to SubPicHeight[i]−(SubHeightC*subpic_conf_win_bottom_offset[i]+1), inclusive.

The value of SubWidthC*(subpic_conf_win_left_offset[i]+subpic_conf_win_right_offset[i]) shall be less than SubPicWidth[i], and the value of SubHeightC*(subpic_conf_win_top_offset[i]+subpic_conf_win_bottom_offset[i]) shall be less than SubPicHeight[i].

The variables SubPicOutputWidthL[i] and SubPicOutputHeightL[i] are derived as follows:

SubPicOutputWidth$L$[$i$]=SubPicWidth[$i$]−SubWidth$C$*(subpic_conf_win_right_offset[$i$]+subpic_conf_win_left_offset[$i$])

SubPicOutputHeight$L$[$i$]=SubPicHeight[$i$]−

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The subpicture conformance cropping window offset parameters are only applied at the output. All internal decoding processes are applied to the uncropped picture size.

In one example following constraint may be required to be satisfied:

Let ppsA and ppsB be any two PPSs referring to the same SPS. It is a requirement of bitstream conformance that, for each i-th subpicture for each coded picture in the CVS, for i in the range of 0 to NumSubPics-1, inclusive, ppsA and ppsB shall have the same values of subpic_conf_win_left_offset[i], subpic_conf_win_right_offset[i], subpic_conf_win_top_offset[i], and subpic_conf_win_bottom_offset[i], respectively.

In one example it may be a requirement of conformance that when subpics_cropping_info_present_flag is equal to 1, conformance_window_flag shall be equal to 0.

conformance_window_flag equal to 1 indicates that the conformance cropping window offset parameters follow next in the SPS. conformance_window_flag equal to 0 indicates that the conformance cropping window offset parameters are not present. It is requirement of bitstream conformance that if subpics_cropping_info_present_flag is equal to 1, conformance_window_flag shall be equal to 0.

In one example conformance_window_flag may be conditionally signalled only when subpics_cropping_info_present_flag is equal to 0.

In another example information about overall picture cropping may be sent before the information about subpicture cropping. In this case:

In one example it may be a requirement of conformance that when conformance_window_flag is equal to 1, subpics_cropping_info_present_flag is equal to 0.

In one example subpics_cropping_info_present_flag may be conditionally signalled only when conformance_window_flag is equal to 0.

It is allowed to signal subpics_cropping_info_present_flag is equal to 0 and conformance_window_flag equal to 0 to indicate that each i-th subpicture and the overall picture has no cropping applied.

In another example the information about subpicture cropping may be signaled in another parameter set (e.g. VPS or DPS), and/or in slice header, and/r or in a SEI message. Also, in another example the exact location of where the information about subpicture cropping is signalled in a parameter set or slice header or SEI may be changed.

It should be noted that the following example of subpicture cropping may be useful:

4 subpictures each of which have a true resolution of Full HD (1920×1080) may be encoded with CtbSizeY equal to 32. In this case, each subpicture may be as 1920×1088 and cropping information may be specified for each subpicture. This will allow easy extraction of each subpicture from the bitstream and then allow cropping each subpicture to a Full HD resolution. In this case, the overall picture which is composed of 4 subpictures is coded with a picture size of 3840×2176. In this example, the cropping information for the overall picture can be derived from the cropping information for each subpicture. In this case, in another example, CtbSizeY may be set equal to 128, which provided different cropping information values for each subpicture.

It should be noted that the following example of subpicture cropping may be useful:

6 subpictures each of which have a true resolution of 1440×1440, may be encoded with CtbSizeY equal to 128. Each subpicture represent a cubemap face for a 360 cubemap projection. This encoding may be suitable for a QuadHD (2560×1440) HMD (e.g. Oculus Rift S, Samsung Gear VR, Oculus Go, etc.). In this case, each subpicture cubemap face may be coded as 1536×1536 and cropping information may be specified for each subpicture. This will allow easy extraction of each subpicture from the bitstream. In this case, the overall picture which is composed of 6 subpictures is coded with a picture size of 4608×3072. In this example, the cropping information for the overall picture can be derived from the cropping information for each subpicture.

It should be noted that the following example of subpicture cropping may be useful:

6 subpictures each of which have a true resolution of 1200×1200, are encoded with CtbSizeY equal to 32. Each subpicture represents a cubemap face for a 360 cubemap projection. This encoding may be suitable for a 2160×1200 resolution HMDs (e.g. HTC VIVE, Oculus Rift, etc.). In this case, code each subpicture-cubemap face is coded as 1216×1216 and cropping information is specified for each subpicture. This will allow easy extraction of each subpicture from the bitstream. In this case, the overall picture which is composed of 6 subpictures is coded with a picture size of 3648×2432. In this example, the cropping information for the overall picture can be derived from the cropping information for each subpicture.

It should be noted that the following example of subpicture cropping may be useful:

16 subpictures each of which have a true resolution of Full HD (1920×1080), may be encoded with CtbSizeY equal to 32. Such a layout could for example be used in a surveillance application where videos feeds from 16 different cameras are composed into one large video feed. Another example is a sports event or a concert where multiple videos are put together in a video mosaic to be edited further and/or consumed differently by different devices. In this case, each subpicture may be coded as 1920×1088 and cropping information may be specified for each subpicture. This will allow easy extraction of each subpicture from the bitstream and then allow cropping each subpicture to a Full HD resolution. In this case, the overall picture which is composed of 16 subpictures is coded with a picture size of 7680×4352. In this example the cropping information for the overall picture can be derived from the cropping information for each subpicture. In another example, in this case the CtbSizeY is set equal to 128. In this case the cropping information values for each subpicture are different Additionally following examples are possible which would benefit from subpicture based cropping information signaling:

Non-360: 5K resolution: 4×4 subpictures each with 720p resolution, using CtbSizeY=128;

Non-360: 4K resolution: 3×3 subpictures each with 720p resolution, using CtbSizeY=128

As described above the term 360 may relate to a 360 degree or omnidirectional video.

With respect to the subpicture cropping described above, the picture output process may be as described below:

The output of the current picture is specified as follows:

If PictureOutputFlag is equal to 1 and DpbOutputTime[n] is equal to CpbRemovalTime[n], the current picture is output.

Otherwise, if PictureOutputFlag is equal to 0, the current picture is not output, but will be stored in the DPB as specified.

Otherwise (PictureOutputFlag is equal to 1 and DpbOutputTime[n] is greater than CpbRemovalTime[n]), the current picture is output later and will be stored in the DPB (as specified) and is output at time DpbOutputTime[n] unless indicated not to be output by the decoding or inference of no_output_of_prior_pics_flag equal to 1 at a time that precedes DpbOutputTime[n].

When output, the picture is cropped, using the conformance cropping information specified in the SPS or PPS for the picture and/or for the subpictures.

When picture n is a picture that is output and is not the last picture of the bitstream that is output, the value of the variable DpbOutputInterval[n] is derived as follows:

DpbOutputInterval[*n*]=DpbOutputTime[nextPicInOutputOrder]−DpbOutputTime[*n*]

where nextPicInOutputOrder is the picture that follows picture n in output order and has PictureOutputFlag equal to 1.

With respect to the subpicture cropping described above, the "bumping" process may be as described below:

The "bumping" process consists of the following ordered steps:
1. The picture that is first for output is selected as the one having the smallest value of PicOrderCntVal of all pictures in the DPB marked as "needed for output".
2. The picture is cropped, using the conformance cropping information specified in the SPS or PPS for the picture and/or for the subpictures, the cropped picture is output, and the picture is marked as "not needed for output".
3. When the picture storage buffer that included the picture that was cropped and output contains a picture marked as "unused for reference", the picture storage buffer is emptied.

NOTE—For any two pictures picA and picB that belong to the same CVS and are output by the "bumping process", when picA is output earlier than picB, the value of PicOrderCntVal of picA is less than the value of PicOrderCntVal of picB.

When cropping as described above using subpicture cropping information, in one example areas within the picture might also be cropped away as an effect of the subpicture cropping. Also, in this case non-adjacent regions in the picture may be concatenated to form the final output picture.

In this manner, source device 102 represents an example of a device configured to signal a flag indicating if a subpicture is a decoding unit.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or subcomponents thereof. For example, video decoder 124 may be configured to output video data to any communication medium, as described herein.

Figure 6:
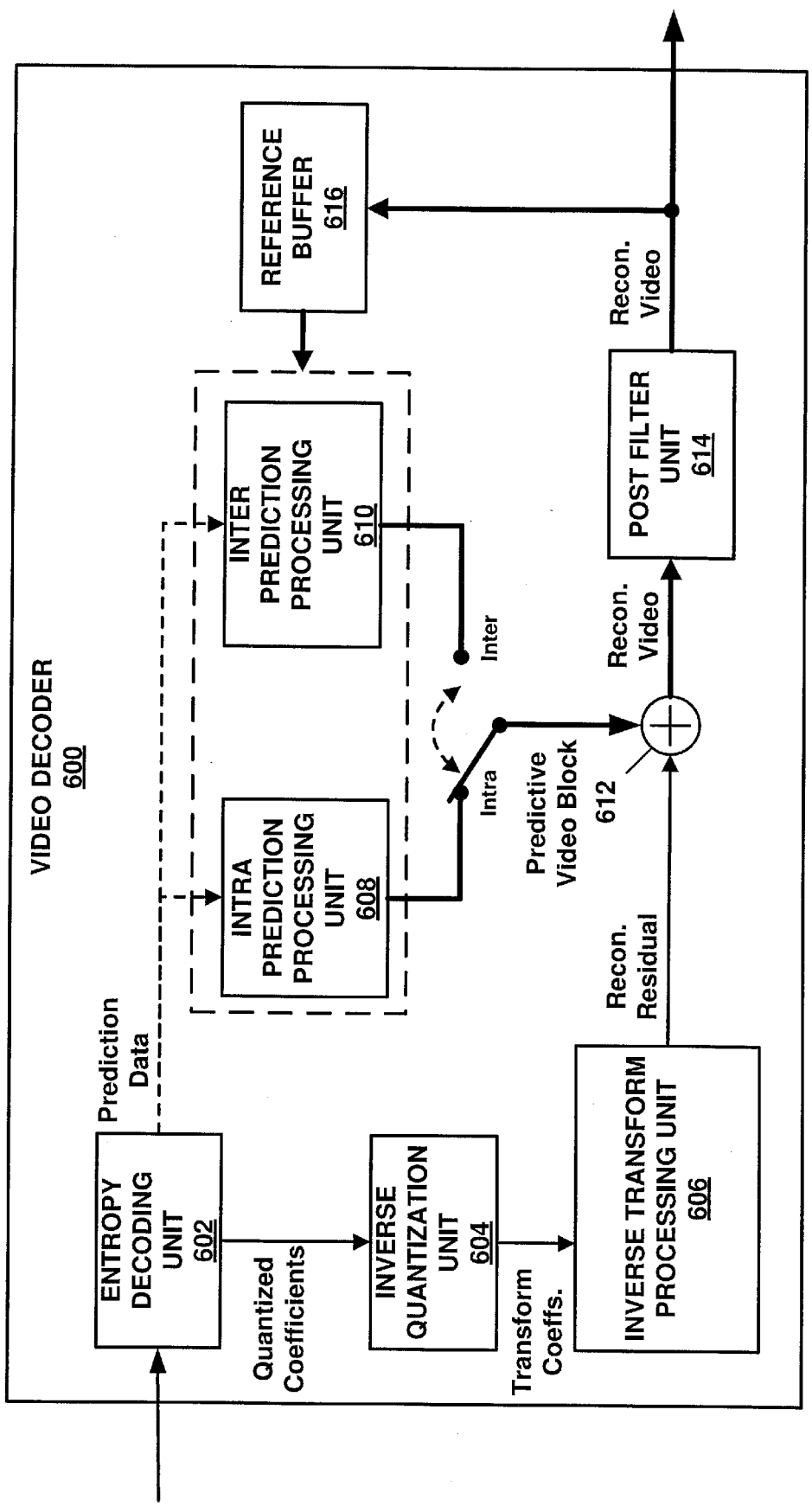
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-20. Video decoder 600 may decode a picture based on or according to the processes described above, and further based on parsed values in Tables 1-20.

In the example illustrated in FIG. 6, video decoder 600 includes an entropy decoding unit 602, inverse quantization unit 604, transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and transform coefficient processing unit 606 receives a quantization parameter, quantized coefficient values, transform data, and prediction data from entropy decoding unit 602 and outputs reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a flag indicating if a subpicture is a decoding unit and determine whether a subpicture is a decoding unit based on a value of the parsed flag.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Summary>

In one example, a method of signaling subpicture information for decoding video data, the method comprising: signaling a flag indicating if a subpicture is a decoding unit.

In one example, the method, wherein signaling a flag indicating if a subpicture is a decoding unit includes signaling a flag for each respective subpicture.

In one example, a method of decoding video data, the method comprising: parsing a flag indicating if a subpicture is a decoding unit; and determining whether a subpicture is a decoding unit based on a value of the parsed flag.

In one example, the method, wherein the flag indicating if a subpicture is a decoding unit is included in a sequence parameter set.

In one example, the method, wherein a first value of the flag indicates a subpicture is a decoding unit and a second value of the flag indicates a subpicture may or may not be a decoding unit.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of decoding video data, the method comprising: receiving a general constraint information syntax elements; parsing a first syntax element from the general constraint information syntax elements specifying whether a constraint is imposed on the number of slices that being contained in each subpicture; receiving a picture parameter set syntax elements; and parsing a second syntax element from the picture parameter set syntax elements specifying that each subpicture contains one and only one slice, wherein a value of the second syntax element is constrained according to the first syntax element parsed from the general constraint information syntax elements.

In one example, the method, further comprising parsing a third syntax element from the picture parameter set syntax elements specifying a mode used for slices included in a picture and wherein the presence of the second syntax element specifying that each subpicture contains one and only one slice is determined based on the third syntax element.

In one example, a device comprising one or more processors configured to: receive a general constraint information syntax elements; parse a first syntax element from the general constraint information syntax elements specifying whether a constraint is imposed on the number of slices that being contained in subpictures; receive a picture parameter set syntax elements; and parse a second syntax element from the picture parameter set syntax elements specifying that each subpicture contains one and only one slice, wherein a value of the second syntax element is constrained according to the first syntax element parsed from the general constraint information syntax elements.

In one example, the device, wherein the one or more processors are further configured to parse a third syntax element from the picture parameter set syntax elements specifying a mode used for slices included in a picture and wherein the presence of the second syntax element specifying that each subpicture contains one and only one slice is determined based on the third syntax element.

In one example, the device, wherein the device is a video decoder.

The invention claimed is:

1. A method of decoding video data, the method comprising:
   receiving general constraint information syntax elements;
   parsing a first syntax element, from the general constraint information syntax elements, specifying whether a constraint is imposed on a number of slices that are contained in each subpicture;
   receiving picture parameter set syntax elements; and
   parsing a second syntax element, from the picture parameter set syntax elements, having a first value specifying that each subpicture contains only one slice and having a second value specifying that each subpicture consists of a set of one or more slices, wherein a value of the second syntax element is constrained to be equal to the first value according to the first syntax element specifying that the constraint is imposed.

2. A device comprising one or more processors configured to:
   receive general constraint information syntax elements;
   parse a first syntax element, from the general constraint information syntax elements, specifying whether a constraint is imposed on a number of slices that are contained in each subpicture;
   receive picture parameter set syntax elements; and
   parse a second syntax element, from the picture parameter set syntax elements, having a first value specifying that each subpicture contains only one slice and having a second value specifying that each subpicture consists of a set of one or more slices, wherein a value of the second syntax element is constrained to be equal to the first value according to the first syntax element specifying that the constraint is imposed.

* * * * *